US012812197B2

(12) United States Patent
Pezeshki et al.

(10) Patent No.: US 12,812,197 B2
(45) Date of Patent: Nov. 24, 2026

(54) METHODS AND APPARATUS TO MANAGE MEDIA STREAMS AMONGST LOCAL NETWORKS

(71) Applicant: DIRECTV, LLC, El Segundo, CA (US)

(72) Inventors: Reza Pezeshki, Chevy Chase, MD (US); Richard Bradley Tatem, Middletown, MD (US); Horia-Mihai Popa, Iasi (RO); Ionut-Andrei Luncanu, Iasi (RO); Wassim Daccache, Ellicott City, MD (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

(21) Appl. No.: 19/022,793

(22) Filed: Jan. 15, 2025

(65) Prior Publication Data

US 2026/0113500 A1 Apr. 23, 2026

Related U.S. Application Data

(60) Provisional application No. 63/710,850, filed on Oct. 23, 2024.

(51) Int. Cl.

*H04N 21/2662* (2011.01)
*H04N 21/24* (2011.01)
*H04N 21/84* (2011.01)

(52) U.S. Cl.

CPC ..... *H04N 21/2662* (2013.01); *H04N 21/2402* (2013.01); *H04N 21/84* (2013.01)

(58) Field of Classification Search

None

See application file for complete search history.

(56) References Cited

U.S. PATENT DOCUMENTS

| | | | |
|---|---|---|---|
| 8,341,255 B2 | 12/2012 | Gopalakrishnan | |
| 8,661,472 B1 | 2/2014 | Kardatzke | |
| 9,235,941 B2 | 1/2016 | Ricci et al. | |
| 9,361,373 B1 | 6/2016 | Price | |
| 9,369,654 B2 | 6/2016 | Shoyker et al. | |
| 9,591,339 B1 | 3/2017 | Christie et al. | |
| 10,433,023 B1 * | 10/2019 | Joliveau | H04N 21/2385 |
| 12,032,650 B2 | 7/2024 | Epstein | |
| 2009/0019178 A1 | 1/2009 | Melnyk et al. | |

(Continued)

OTHER PUBLICATIONS

Luby et al., "The Use of Forward Error Correction (FEC) in Reliable Multicast," The Internet Society, Dec. 2002, 18 pages.

(Continued)

*Primary Examiner* — William J Kim

(74) *Attorney, Agent, or Firm* — Hanley, Flight & Zimmerman, LLC

(57) ABSTRACT

Systems, apparatus, articles of manufacture, and methods are disclosed to provide media streams to client devices. An example local manager device within a streaming environment edits manifest files to remove the ability for client devices to perform adaptive bitrate resolution (ABR), thereby forcing the client devices within the streaming environment to stream media at specific resolutions. The local manager device assigns resolutions to the various client devices based on policies and client device groupings that are set globally by a managing organization.

20 Claims, 23 Drawing Sheets

(56) References Cited

U.S. PATENT DOCUMENTS

| | | | | |
|---|---|---|---|---|
| 2013/0036234 | A1 | 2/2013 | Pazos et al. | |
| 2013/0286879 | A1* | 10/2013 | ElArabawy | H04W 28/0231 370/252 |
| 2013/0339529 | A1* | 12/2013 | Rizzo | H04L 67/1074 709/226 |
| 2014/0130097 | A1 | 5/2014 | Londero | |
| 2015/0128170 | A1 | 5/2015 | Fu et al. | |
| 2015/0134847 | A1 | 5/2015 | Fu et al. | |
| 2015/0312301 | A1* | 10/2015 | Dasher | H04L 1/0014 709/217 |
| 2016/0234125 | A1* | 8/2016 | Phillips | H04L 65/80 |
| 2016/0360278 | A1 | 12/2016 | Moskowitz | |
| 2016/0366202 | A1* | 12/2016 | Phillips | H04N 21/23439 |
| 2018/0020036 | A1* | 1/2018 | Ramamurthy | H04N 21/23439 |
| 2018/0123810 | A1 | 5/2018 | Luby et al. | |
| 2018/0248806 | A1* | 8/2018 | Burnley | H04L 1/0002 |
| 2019/0020910 | A1* | 1/2019 | Panje | H04N 21/23406 |
| 2019/0069038 | A1* | 2/2019 | Phillips | H04N 21/64769 |
| 2019/0069039 | A1* | 2/2019 | Phillips | H04N 21/64738 |
| 2019/0223194 | A1* | 7/2019 | Arrobo Vidal | H04N 21/43637 |
| 2019/0281522 | A1* | 9/2019 | Wong | H04W 28/0268 |
| 2022/0095166 | A1* | 3/2022 | Nunna | H04L 47/22 |
| 2022/0272413 | A1* | 8/2022 | Hallmarker | H04N 21/44209 |
| 2022/0358943 | A1* | 11/2022 | So | H04N 21/439 |
| 2023/0412479 | A1* | 12/2023 | Liu | H04L 43/026 |
| 2024/0251128 | A1* | 7/2024 | Wright | H04N 21/43076 |
| 2025/0330865 | A1* | 10/2025 | Römer | H04W 28/0268 |

OTHER PUBLICATIONS

Luby et al., "Wave and Equation Based Rate Control (WEBRC) Building Block," The Internet Society, Apr. 2004, 32 pages.

Luby et al., "Layered Coding Transport (LCT) Building Block," IETF Trust, Oct. 2009, 34 pages.

Luby et al., "Asynchronous Layered Coding (ALC) Protocol Instantiation," IETF Trust, Apr. 2010, 24 pages.

Paila et al., "FLUTE—File Delivery over Unidirectional Transport," IETF Trust, Nov. 2012, 46 pages.

* cited by examiner

700

```
{
    702A PROFILE_A: { VIDEO_PROFILE = 4K; AUDIO_PROFILE = FLAC};

    702B PROFILE_B: { VIDEO_PROFILE = 1440p; AUDIO_PROFILE = FLAC};

    702C PROFILE_C: { VIDEO_PROFILE = 1080p; AUDIO_PROFILE = WAV};

    702D PROFILE_D: { VIDEO_PROFILE = 720p; AUDIO_PROFILE = MP3};

                                ...
    702-n PROFILE-n: { VIDEO_PROFILE = ###; AUDIO_PROFILE = ###};

    704 MAXIMUM_BANDWITDTH = 1250000;

    CLIENT_GROUP_A.TYPE( ) = FIXED;                                  } 706A
    CLIENT_GROUP_A.SET( ) = PROFILE_A;
    CLIENT_GROUP_A.ASSIGN( ) = <CD_204B, CD_204D>;

    CLIENT_GROUP_B.TYPE( ) = VARIABLE;                               } 706B
    CLIENT_GROUP_B.TARGET( ) = PROFILE_C;
    CLIENT_GROUP_B.PRIORITY( ) = 1;
    CLIENT_GROUP_B.ASSIGN( ) = <CD_204A, CD_204C>;

    CLIENT_GROUP_C.ISDEFAULT( ) = TRUE;                              } 706C
    CLIENT_GROUP_C.TYPE( ) = VARIABLE;
    CLIENT_GROUP_C.PRIORITY( ) = 2;
    CLIENT_GROUP_C.TARGET( ) = PROFILE_B;
    CLIENT_GROUP_C.ASSIGN( ) = < >;

                       ...
    CLIENT_GROUPn.ISDEFAULT( ) = FALSE;                              } 706-n
    CLIENT_GROUPn.TYPE( ) = ###;
    CLIENT_GROUPn.PRIORITY( ) = ###;
    CLIENT_GROUPn.TARGET( ) = ###;
    CLIENT_GROUPn.ASSIGN( ) = ###;

    708 POLICY_LIST = < CG_PRIORITY, BALANCED, LPMO, ... >;

    710 POLICY_APPLICATION = { // INSERT LOGIC HERE };

}
```

FIG. 7A

AVAILABLE PROFILES: AP1 (HIGHEST), AP2, ..., AP10 (LOWEST)

| TIME | NETWORK STATUS | STREAM QUALITY | CG1 TARGET PROFILE | CG1 ACTUAL PROFILE | CG2 TARGET PROFILE | CG2 ACTUAL PROFILE | CG3 TARGET PROFILE | CG3 ACTUAL PROFILE |
|---|---|---|---|---|---|---|---|---|
| T1 | THESE ARE THE INTIIAL STREAMING CONDITIONS | | AP1 | AP1 | AP3 | AP3 | AP6 | AP6 |
| T2 | THERE IS NOT ENOUGH BANDWIDTH TO ACCOMMODATE THE CURRENT STREAMING CONDITIONS | **(LOWER)** | AP1 | AP1 | AP3 | AP3 | AP6 | **AP7** |
| T3 | THERE IS NOT ENOUGH BANDWIDTH TO ACCOMMODATE THE CURRENT STREAMING CONDITIONS | **(LOWER)** | AP1 | AP1 | AP3 | **AP4** | AP6 | AP7 |
| T4 | THERE IS NOT ENOUGH BANDWIDTH TO ACCOMMODATE THE CURRENT STREAMING CONDITIONS | **(LOWER)** | AP1 | **AP2** | AP3 | AP4 | AP6 | AP7 |
| T5 | THERE IS NOT ENOUGH BANDWIDTH TO ACCOMMODATE THE CURRENT STREAMING CONDITIONS | **(LOWER)** | AP1 | AP2 | AP3 | AP4 | AP6 | **AP8** |
| T6 | THERE IS NOT ENOUGH BANDWIDTH TO ACCOMMODATE THE CURRENT STREAMING CONDITIONS | **(LOWER)** | AP1 | AP2 | AP3 | **AP5** | AP6 | AP8 |
| T7 | THERE IS ENOUGH BANDWIDTH TO ACCOMMODATE THE INCREASE | **(INCREASE)** | AP1 | **AP1** | AP3 | AP5 | AP6 | AP8 |
| T8 | THERE IS NOT ENOUGH BANDWIDTH TO ACCOMMODATE THE CURRENT STREAMING CONDITIONS | **(LOWER)** | AP1 | **AP2** | AP3 | AP5 | AP6 | AP8 |
| T9 | THERE IS NOT ENOUGH BANDWIDTH TO ACCOMMODATE THE INCREASE (FOR CG1) FROM AP2 TO AP1, BUT ENOUGH TO ACCOMMODATE THE INCREASE (FOR CG2) FROM AP5 TO AP4 | **(INCREASE)** | AP1 | AP2 | AP3 | **AP4** | AP6 | AP8 |
| T10 | IN CURRENT CONDITIONS, THERE ARE NO CHANGES TO THE ACTUAL PROFILES THAT CAN BE PERFORMED **IN THE NEXT ITERATION THIS STATUS MAY CHANGE** | **(KEEP)** | AP1 | AP2 | AP3 | AP4 | AP6 | AP8 |

TIME

FIG. 7B

EXAMPLE IMPLEMENTATION OF BALANCED POLICY

AVAILABLE PROFILES: AP1 (HIGHEST), AP2, ..., AP10 (LOWEST)

| TIME | NETWORK STATUS | STREAM QUALITY | CG1 TARGET PROFILE | CG1 ACTUAL PROFILE | CG2 TARGET PROFILE | CG2 ACTUAL PROFILE | CG3 TARGET PROFILE | CG3 ACTUAL PROFILE |
|---|---|---|---|---|---|---|---|---|
| T1 | THESE ARE THE INITIAL STREAMING CONDITIONS | | AP1 | AP1 | AP3 | AP3 | AP6 | AP6 |
| T2 | THERE IS NOT ENOUGH BANDWIDTH TO ACCOMMODATE THE CURRENT STREAMING CONDITIONS | **(LOWER)** | AP1 | AP1 | AP3 | AP3 | AP6 | **AP7** |
| T3 | THERE IS NOT ENOUGH BANDWIDTH TO ACCOMMODATE THE CURRENT STREAMING CONDITIONS | **(LOWER)** | AP1 | AP1 | AP3 | AP3 | AP6 | **AP8** |
| T4 | THERE IS NOT ENOUGH BANDWIDTH TO ACCOMMODATE THE CURRENT STREAMING CONDITIONS | **(LOWER)** | AP1 | AP1 | AP3 | AP3 | AP6 | **AP9** |
| T5 | THERE IS NOT ENOUGH BANDWIDTH TO ACCOMMODATE THE CURRENT STREAMING CONDITIONS | **(LOWER)** | AP1 | AP1 | AP3 | AP3 | AP6 | **AP10** |
| T6 | THERE IS NOT ENOUGH BANDWIDTH TO ACCOMMODATE THE CURRENT STREAMING CONDITIONS | **(LOWER)** | AP1 | AP1 | AP3 | **AP4** | AP6 | AP10 |
| T7 | THERE IS ENOUGH BANDWIDTH TO ACCOMMODATE THE INCREASE | **(INCREASE)** | AP1 | AP1 | AP3 | **AP3** | AP6 | AP10 |
| T8 | THERE IS NOT ENOUGH BANDWIDTH TO ACCOMMODATE THE CURRENT STREAMING CONDITIONS | **(LOWER)** | AP1 | AP1 | AP3 | **AP4** | AP6 | AP10 |
| T9 | THERE IS NOT ENOUGH BANDWIDTH TO ACCOMMODATE THE INCREASE (FOR CG1) FROM AP2 TO AP1, BUT ENOUGH TO ACCOMMODATE THE INCREASE (FOR CG2) FROM AP5 TO AP4 | **(INCREASE)** | AP1 | AP1 | AP3 | AP4 | AP6 | **AP9** |
| T10 | IN CURRENT CONDITIONS, THERE ARE NO CHANGES TO THE ACTUAL PROFILES THAT CAN BE PERFORMED **IN THE NEXT ITERATION THIS STATUS MAY CHANGE** | **(KEEP)** | AP1 | AP1 | AP3 | AP4 | AP6 | AP9 |

FIG. 7C

EXAMPLE IMPLEMENTATION OF LOWEST PRIORITY MAX OUT (LPMO) POLICY

ORCHESTRATOR CIRCUITRY

ORCHESTRATOR CIRCUITRY

SESSION

SESSION

SESSION

SESSION

METHODS AND APPARATUS TO MANAGE MEDIA STREAMS AMONGST LOCAL NETWORKS

RELATED APPLICATION

This patent claims the benefit of U.S. Provisional Patent Application No. 63/710,850, which was filed on Oct. 23, 2024. U.S. Provisional Patent Application No. 63/710,850 is hereby incorporated by reference in its entirety. Priority to U.S. Provisional Patent Application No. 63/710,850 is hereby claimed.

FIELD OF THE DISCLOSURE

This disclosure relates generally to media streams and, more particularly, to methods and apparatus to manage media streams amongst local networks.

BACKGROUND

In recent years, the number of devices within a given location that support media playback has increased. Conventionally, delivery of media content to multiple devices utilizes a unicast architecture in which a content delivery network supports n different transmissions of the same media from a content provider to n different devices. In some examples, the n devices that receive copies of the same media belong to a local network of streaming-capable devices within a shared environment.

BRIEF DESCRIPTION OF THE DRAWINGS

FIG. 7A is an illustrative example of pseudocode used by the proxy of FIG. 6 to edit a manifest file.

FIGS. 7B and 7C are two examples of the proxy of FIG. 6 applying a policy to change the stream quality of the local network.

In general, the same reference numbers will be used throughout the drawing(s) and accompanying written description to refer to the same or like parts. The figures are not necessarily to scale.

DETAILED DESCRIPTION

Figure 1:
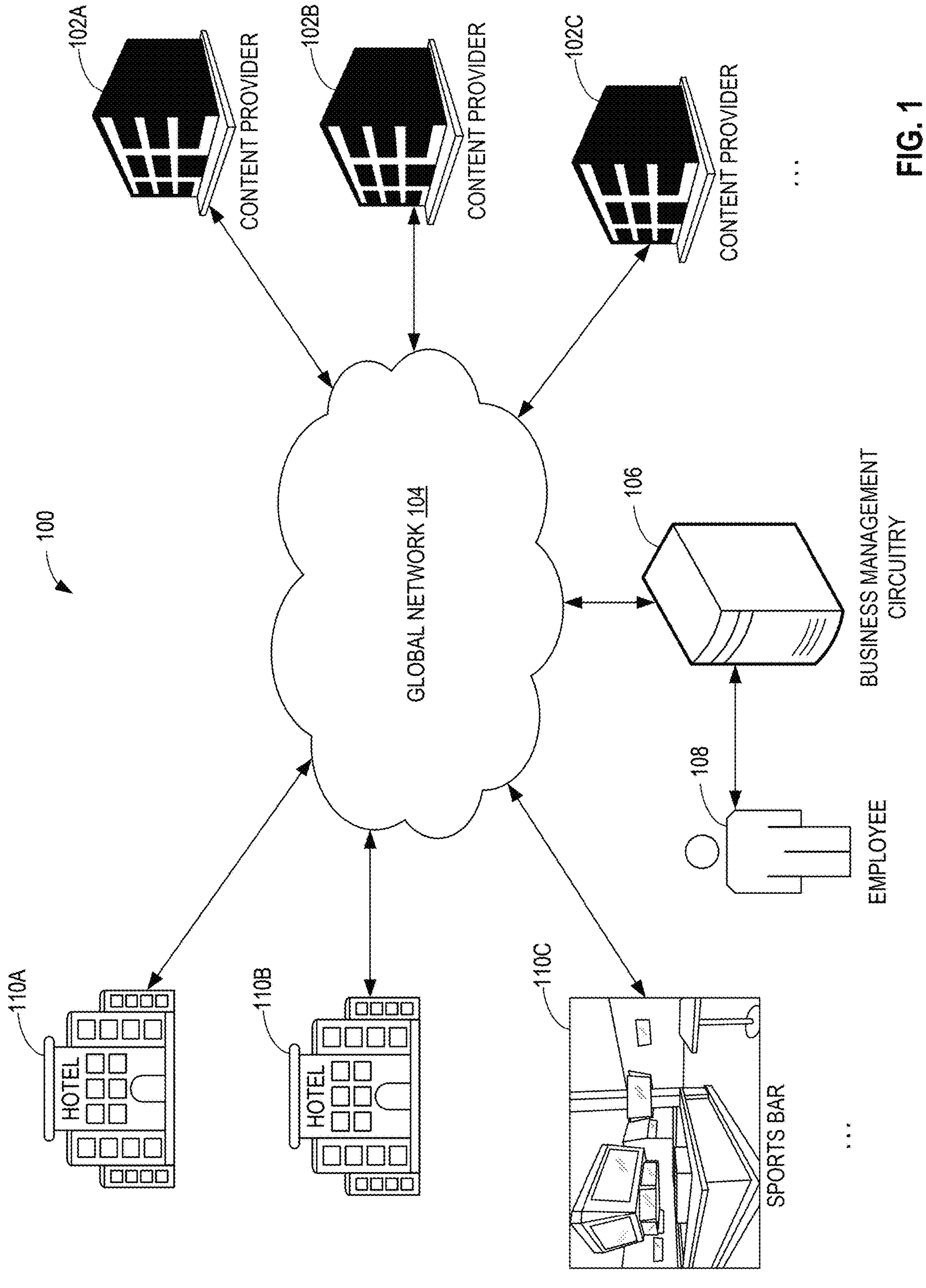
FIG. 1 is an illustrative example of media delivery.

In some use cases, unicast systems struggle to support efficient delivery of over the top (OTT) media. As used herein, OTT media refers to media that is transmitted and/or received over the Internet. For example, consider a streaming environment that includes both (1) a large number of devices requesting media and (2) legacy communications infrastructure having relatively limited total network traffic bandwidth. Such streaming environments may include, but are not limited to, hotels, malls, restaurants, sports bars, other commercial spaces, multiple dwelling units (MDUs), residential dwellings, etc. If such environments utilize a unicast content delivery network, a sufficiently large number of devices (n) requesting media at the same time can result in the need to transmit data that exceeds (or constitutes a disproportionate amount of) the total network traffic bandwidth available in the environment. As a result, one or more media playback sessions in the environment may experience a decrease in quality due to buffering, disconnections, etc. Additionally or alternatively, the large request for data from the n devices requesting media may cause other devices (e.g., phones, tablets, laptops) attempting to use the environment's local network to experience disconnections or other latencies. In some examples, a device requesting media is referred to as a client device.

Multicast content delivery systems may be utilized to decrease total network traffic and improve user experiences. In a multicast architecture, a content delivery network enables one transmission of a media stream from a content provider to a primary device (e.g., a server) located within the environment. The primary device then transmits n copies of the media stream to the n devices within the environment requesting the same media at approximately the same time. Using multicast, the number of transmissions (e.g., channels of communication dedicated to a particular media stream) between the environment and the content delivery network is reduced from n to 1, thereby decreasing the total network traffic and improving user experiences. As used above and herein, a media stream refers to data used to enable playback of a piece of media (e.g., a movie, a television show, a television channel, a live stream, etc.).

While multicast networks are generally more efficient than unicast networks, receiving a multicast stream requires the use of communication protocols that are not supported by some client devices. Additionally, different client devices may provide support for different types of multicast communication protocols. Such protocols include but are not limited to User Datagram Protocol (UDP) and Quadrature Amplitude Modulation (QAM). Thus, a streaming environment may include some client devices that only support unicast transmissions, some client devices that only support multicast transmissions via UDP, and some client devices that only support multicast transmissions via QAM. Such environments may still experience decreases in streaming quality due to the number of devices and network bandwidth limitations described above.

In examples below, unicast transmissions of media are formatted using HyperText Transfer Protocol (HTTP) Live Streaming (HLS) while multicast transmissions of media use either UDP or QAM. In other examples, one or more different streaming communication protocols are used to implement unicast and/or multicast transmissions.

In some examples, media streaming is facilitated by providing client devices with manifest files that contain metadata. Content providers generally provide manifest files with multiple stream profiles so that the client devices using the HLS protocol can perform Adaptive Bitrate Resolution (ABR). A given content device that performs ABR can independently choose to consume more bandwidth by requesting the stream at a higher resolution, e.g., switching from 1080p to 4K, or choose to consume less bandwidth by requesting the stream at a lower resolution. If multiple client devices independently perform ABR within a local network that has legacy infrastructure, the client devices can end up repeatedly switching video resolutions as they compete with one another for the available bandwidth. Such an implementation can lower stream quality and degrade user experience throughout the streaming environment.

Furthermore, support for multiple communication protocols within a single streaming environment adds complexity and cost to the implementation of a system. For some organizations, e.g., businesses that own a chain of hotels, chain of sports bars, etc., the added cost and complexity becomes a barrier towards scalability because each business location can have its own unique configuration of streaming devices, legacy infrastructure, and associated challenges.

Example methods, apparatus, and systems described herein improve the quality of media streams in a streaming environment by performing local network operations based on global business logic. As a first example, a local manager device within a streaming environment edits manifest files to remove the ability for client devices to perform adaptive bitrate resolution (ABR), thereby forcing the client devices within the streaming environment to stream media at specific resolutions. The local manager device assigns resolutions to the various client devices based on policies and client device groupings that are set globally by a managing organization.

As a second example, rather than having individual client devices consume bandwidth by individually communicating with content providers, the local manager device acts as a proxy and communicates with the content provider on behalf of all client devices within the streaming environment. The local manager device requests media streams from the content providers using HTTP and forwards the obtained HTTP packets to the client devices that support only unicast. The local manager also deconstructs the HTTP packets into smaller units of data suitable for multicast. Client devices that receive the data using UDP multicast then use a stitching technique to combine the smaller units of data back into a HTTP packet.

As a third example, the local manager device uses different Application Programming Interfaces (APIs), configurations, and logic to obtain media from any number of accessible content providers. The local manager device then normalizes and filters the data obtained from the content providers. As a result, the client device obtains electronic program guide (EPG) data that has a standardized format and includes some but not all of the total content providers accessible to the local manager device. The local manager device determines which data to filter based on business logic that is set globally by a managing organization.

FIG. 1 is an illustrative example of media streaming. The example of FIG. 1 shows a system 100 that includes content providers 102A, 102B, 102C, . . . (collectively referred to as content providers 102), a global network 104, business management circuitry 106, a user 108, and streaming environments 110A, 110B, 110C, . . . (collectively referred to as streaming environments 110).

The content providers 102 provides data that forms various media streams. A media stream may be formatted as a linear television channel, a live stream, a video on demand (VoD) or streaming platforms, etc. The media stream may correspond to any type of content, including news, sports, television shows, movies, etc. FIG. 1 illustrates three content providers 102A, 102B, 102C for simplicity. In practice, a given device may request media from any number of content providers 102.

A given content provider 102A may host one or more compute devices (e.g., servers) that receive requests for content and provide a corresponding media stream via the global network 104. In some examples, the OTT media provided by the content providers 102 is Digital Rights Management (DRM) HLS content that can only be transmitted using HTTP.

The global network 104 enables communication between one or more of the content providers 102, the business management circuitry 106, and the streaming environments 110. In some examples, the data exchange includes HTTP requests and HTTP streams as described above.

The global network 104 may be implemented by any number of internal nodes using any number of transmission mediums and any number of communication topologies. In the illustrative example of FIG. 1, the global network 104 is the Internet. However, the global network 104 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The streaming environments 110 refer to any environments in which a plurality of client devices request media. In examples described herein, the streaming environments 110A and 110B are hotels and the streaming environment 110C is a sports bar. In other examples, one or more of the streaming environments 110 may be a mall, a household with multiple televisions, other commercial or residential dwellings, etc. The various streaming environments 110 may have different numbers of client devices, different client device configurations, and/or different network infrastructure from one another. The term 'network infrastructure' as used above may include, but is not limited to, the amount and age of wiring within the building, whether the building supports COAX, Ethernet, WiFi, a combination thereof, or other Internet communication protocols, the amount of bandwidth that can be simultaneously consumed by client devices within the building, etc.

A given streaming environment 110A includes local manager circuitry. The local manager circuitry uses instructions from the business management circuitry 106 to improve streaming quality and local network efficiency for client devices within the streaming environment 110A. The streaming environments 110, local manager circuitry and client devices are discussed further in connection with FIG. 2.

In the examples described herein, the streaming environments 110A and 110B are part of a chain of hotels that are managed by an organization, e.g., a business. The operations performed by the local manager circuitry in the streaming environment 110A are different than those performed by the local manager circuitry in the streaming environment 110B because of the differences between the two networks described above. Furthermore, the management organization in charge of the hotel chain may have business reasons for controlling the local network within the streaming environment 110A, which is different from the local network within the streaming environment 110B. For example, a hotel that primarily serves business guests on travel may have different streaming requirements than a hotel that primarily serves families on vacation.

The business management circuitry 106 provides instructions, via the global network 104, to each of the local manager circuits within the respective streaming environments 110. Accordingly, the user 108 can interface with the business management circuitry 106 to simultaneously monitor and control one or more multiple streaming environments 110 in a scalable manner. The business management circuitry 106 can provide instructions that are applied globally across an organization (e.g., to every hotel in the hotel chain). The business management circuitry 106 can also provide instructions that are specific to a particular streaming environment 110B. In the example of FIG. 1, the user 108 is an employee of the hotel chain. In other examples, the user 108 is a different type of individual. The business management circuitry 106 is discussed further in connection with FIG. 8.

Figure 2:
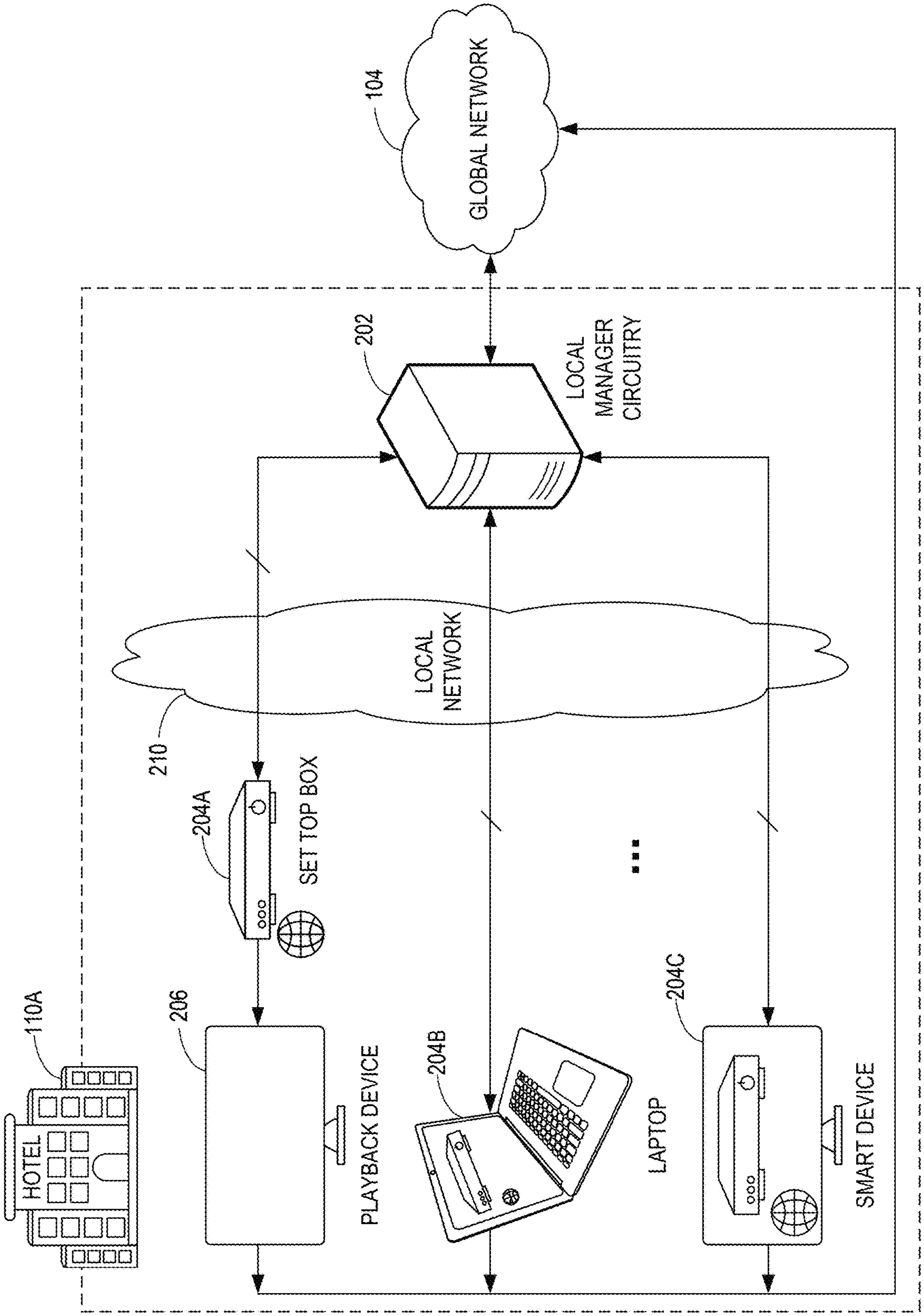
FIG. 2 is a block diagram of an example implementation of a streaming environment of FIG. 1.

FIG. 2 is a block diagram of an example implementation of a streaming environment of FIG. 1. The example of FIG. 2 shows the streaming environment 110A includes local manager circuitry 202, a set top box (STB) device 204A, a laptop 204B, a smart device 204C (collectively referred to as client devices 204), a playback device 206, and a local network 210. While the examples provided below refer to the streaming environment 110A, the teachings of this disclosure may be applied to any of the steaming environments 110.

The local manager circuitry 202 is a device that provides media streams to the client devices 204 in a manner that improves streaming quality and reduces bandwidth across the local network 210. In the illustrative example of FIG. 2, the local manager circuitry 202 receives multiple requests for the same media streams (e.g., media from content provider 102A) from the client devices 204. In general, the local manager circuitry 202 makes one request and receives one media stream over the global network 104 per unique request generated from the client devices within the streaming environment 110. Upon receiving matching requests from one or more of the client devices 204, the local manager circuitry 202 sends a single request for the media stream to the content provider 102A via the global network 104 and receives a single HLS media stream.

The local network 210 refers to infrastructure within a given streaming environment 110A that enables the client devices 204 and local manager circuitry 202 to communicate with one another. Accordingly, the local network 210 may include hardware components such as cables, ports, routers, etc. In some examples, the local network 210 additionally includes intermediate devices such as Ethernet switches that receive a message from the local manager circuitry 202, forward to one or more client devices 204, or vice versa.

The local manager circuitry 202 transmits multiple copies of the media streams it receives to the client devices 204 that requested the media. Before the transmission, the local manager circuitry 202 re-formats one or more copies of the media stream to match the settings of the requesting client devices 204 as described further below. Thus, the local manager circuitry 202 may simultaneously transmit one or more of a HLS unicast, and a UDP multicast, or a QAM carrying the same content. Advantageously, any client device that receives the stream data through a form of multicast reduces the bandwidth consumed by the local network 210 in comparison to the same client device having to instead use HLS unicast. The local manager circuitry 202 is discussed further in connection with FIG. 3.

The client devices 204 are devices within the that request media streams for playback. The media streams may be in any suitable architecture, including but not limited to linear television channels and Video on Demand (VoD)/streaming content. The client devices 204 form requests for media based on user input. The client devices 204 may use any suitable form of user input, including but not limited to button presses from a remote or software application, voice commands, etc. In some examples, the client devices 204 include Internet connections to request media streams, receive media metadata, receive user interface data, receive media streams, etc.

In the illustrative example of FIG. 2, one or more of the client devices 204 requests the same media stream. The client devices 204 transmit the request to the local manager circuitry 202, receive the corresponding media stream, and provide the resulting media data, e.g., synchronized image and audio data, to various internal or external displays. Such displays include but are not limited to the playback device 206, a laptop screen, a television screen, etc.

The client devices 204 may communicate with the local manager circuitry 202 using any suitable network communication protocol. Such protocols include but are not limited to Ethernet, COAX, WiFi, etc. The client devices 204 also support one or more stream delivery protocols. Such media protocols include but are not limited to HLS unicast, UDP multicast, or QAM. A given client device 204A may be limited to a particular selection of network communication protocol(s) and stream delivery protocol(s) for any reason, including but not limited to data storage requirements, processor speed requirements, the hardware, firmware, or software on the device being outdated, the streaming environment 110A not having the infrastructure to support a given protocol, etc.

In the example of FIG. 2, each of the client devices 204A, 204B, 204C are able to communicate with the local manager circuitry 202 through the local network 210. In other examples, one or more of the client devices 204 are unable to communicate over the local network 210 and therefore communicate with the local manager circuitry 202 using the global network 104 instead. In such examples, communication between the client devices 204 and the local manager circuitry 202 that occurs through the global network 104 is referred to as back channel communication. While FIG. 2 shows three client devices 204 for simplicity, the streaming environment 110A may include any number of client devices 204. The client devices 204 are discussed further in connection with FIG. 3.

Figure 3:
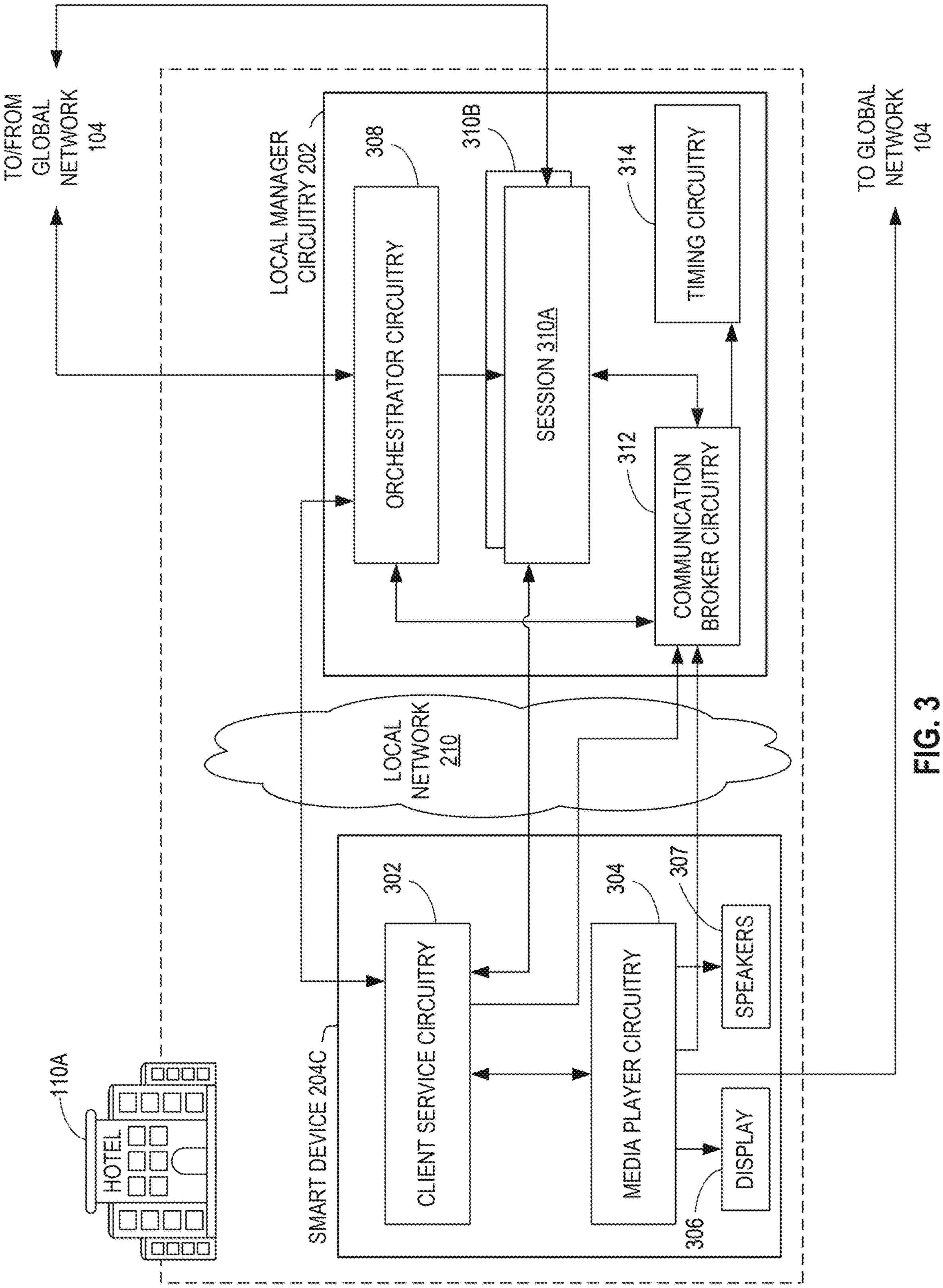
FIG. 3 is a block diagram of an example implementation of the smart device and local manager circuitry of FIG. 2.

FIG. 3 is a block diagram of an example implementation of a client device and the local manager circuitry of FIG. 2 to stream media. The client devices 204 and local manager circuitry 202 may be instantiated (e.g., creating an instance of, bring into being for any length of time, materialize, implement, etc.) by programmable circuitry such as a Central Processor Unit (CPU) executing first instructions. Additionally or alternatively, the client devices 204 and the local manager circuitry 202 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. Some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The example of FIG. 3 includes the smart device 204C, the local network 210, and the local manager circuitry 202. The example of FIG. 3 shows the smart device 204C includes client service circuitry 302, media player circuitry 304, a display 306, and speaker devices 307. The example of FIG. 3 also shows the local manager circuitry 202 includes orchestrator circuitry 308, sessions 310A, 310B, . . . (collectively referred to as sessions 310), communication broker circuitry 312, and timing circuitry 314.

Within the smart device 204C, the client service circuitry 302 communicates with the local manager circuitry 202 to obtain media streams. For example, the client service circuitry 302 self-registers with the orchestrator circuitry 308, requests a media stream from the orchestrator circuitry 308, and receives media stream data from one of the sessions 310. The client service circuitry 302 also forwards the media stream data to the media player circuitry and provides stream metrics to the communication broker circuitry 312. In this example, the stream metrics generally include metadata that describe the state of communications between the client service circuitry 302 and the local manager circuitry 202. Accordingly, stream metrics generated by the client service circuitry 302 may include but is not limited to a description of whether any of its requests for media streams have failed, the number of media stream segments that have been received, etc. In some examples, the client service circuitry 302 is instantiated by programmable circuitry executing client service instructions and/or configured to perform operations such as those represented by the flowchart(s) of FIG. 9A-9B.

The media player circuitry 304 presents the media stream data it receives from the client service circuitry 302 by providing video data to the display 306 and audio data to one or more speakers 307. The media player circuitry 304 may perform any type of reformatting or decapsulation operations necessary to convert the media stream data into an output that is interpretable by the display 306 and speakers 307. For example, the media player circuitry 304 determines individual Red, Green and Blue (RGB) values for pels on the display 306 based on image frames within the media stream data. The media player circuitry 304 also reports stream metrics to the communication broker circuitry 312. In this example, the stream metrics generally refer to information that describes the media playback. Accordingly, stream metrics generated by the media player circuitry 304 include but are not limited to a description of whether the media player is buffering, idle, tuning between different media streams, etc.

The media player circuitry 304 also provides Digital Rights Management (DRM) data to the content providers 102 via the global network 104. Unlike the video and audio data that is requested and received through the local manager circuitry 202, the individual client devices 204 provide DRM data to the content providers 102 In some examples, the media player circuitry 304 is instantiated by programmable circuitry executing media player instructions and/or configured to perform operations such as those represented by the flowchart(s) of FIG. 9A-9B.

Within the local manager circuitry 202, the orchestrator circuitry 308 controls the streaming activity of all client devices 204 within the streaming environment 110A, including but not limited to the smart device 204C. For example, the orchestrator circuitry 308 broadcasts metadata to new client devices 204 that join the streaming environment 110A to self-register. Advantageously, the orchestrator circuitry 308 also edits manifest files given to the client devices 204 to: a) determine what media streams a given client device 204C can access. The orchestrator circuitry 308 makes the determinations based on instructions provided by the business management circuitry 106 via the global network 104. Such remote control provides customizability and scalability for organizations that manage multiple streaming environments, e.g., the hotel chain with streaming environments 110A and 110B. In some examples, the orchestrator circuitry 308 is instantiated by programmable circuitry executing orchestrator instructions and/or configured to perform operations such as those represented by the flowchart(s) of FIG. 10A-10D. The orchestrator circuitry 308 is described further in connection with FIGS. 4 and 5.

The sessions 310 represent software modules that obtain media stream data from the content providers 102 and distribute the media stream data to one or more client devices 204. The sessions 310 are opened and closed by the orchestrator circuitry 308 so that there is one session open per unique media title that is currently being requested by the client devices 204. For example, suppose the set top box 204A requests a news channel stream and the laptop 204B requests a home improvement channel stream at the same time. In response, the orchestrator circuitry 308 opens session 310A and provides instructions for the session 310A to obtain and distribute news channel stream data. The orchestrator circuitry 308 also opens session 310B and provides instructions for the session 310B to obtain and distribute home improvement channel stream data. If a user then tunes the smart device 204C to the home improvement channel while the laptop 204B is still streaming the same media, the orchestrator circuitry forwards the request from the smart device 204C to the session 310B instead of opening a new session. Thus, a single session 310B can support multiple client devices 204 that are simultaneously requesting data from the same media stream. The example FIG. 3 shows two active sessions 310A and 310B. More generally, the orchestrator circuitry 308 may instantiate any number of concurrently active sessions 310.

The sessions 310 also: a) determine the video resolution at which the client devices 204 presents the media, and/or b) determine the audio quality at which the client devices 204 presents the media. The sessions 310 make the foregoing determinations based on instructions provided by the business management circuitry 106 via the global network 104. Such remote control provides customizability and scalability for organizations that manage multiple streaming environments, e.g., the hotel chain with streaming environments 110A and 110B. In some examples, the sessions 310 are instantiated by programmable circuitry executing session instructions and/or configured to perform operations such as those represented by the flowchart(s) of FIG. 11A-11E. The sessions 310 are described further in connection with FIG. 6.

The communication broker circuitry 312 provides an interface to enable the exchange of data both internally between components of the local manager circuitry 202 and externally with the client devices 204. To do so, the communication broker circuitry 312 receives and forwards data to various components in FIG. 3 using a communication protocol. The communication protocol used may be any suitable machine-to-machine network protocol, including but not limited to Message Queue Telemetry Transport (MQTT).

The communication broker circuitry 312 may receive and forward any type of data to support the operations of the streaming environment 110A. For example, the client service circuitry 302 or media player circuitry 304 may send event messages to the communication broker circuitry 312 via the local network 210. The event messages may include but are not limited to information describing stream properties, client device configuration properties, whether the media stream is buffering, etc. The communication broker circuitry 312 then forwards the event messages to the timing circuitry 314.

The timing circuitry 314 affixes timestamps to obtained streaming metrics and distributes the results to one or more of the orchestrator circuitry 308 or business management circuitry 106. The timing circuitry 314 may use any suitable technique to store and receive time series data. Such techniques include but are not limited to software applications such as InfluxDB. In some examples, the timing circuitry 314 is instantiated by programmable circuitry executing timing instructions and/or configured to perform operations such as those represented by the flowchart(s) of FIG. 11C.

As type of communications facilitated by the communication broker circuitry 312 are internal messages within the local manager circuitry 202. For example, initialization of the sessions 310 requires operations that may occur independently of the orchestrator circuitry 308. Once the session 310A is initialized, it sends the communication broker circuitry 312 a message indicating the session 310A is ready to proceed. The communication broker circuitry 312 forwards the message to the orchestrator circuitry 308. In turn, the orchestrator circuitry provides configuration data that is forwarded back to the session 310A via the communication broker circuitry 312. The configuration data may include instructions to obtain and distribute stream data from a particular content provider, e.g., a network that broadcasts the news channel discussed above. In some examples, the communication broker circuitry 312 is instantiated by programmable circuitry executing communication broker instructions and/or configured to perform operations such as those represented by the flowchart(s) of FIG. 10A-11C.

Figure 4:
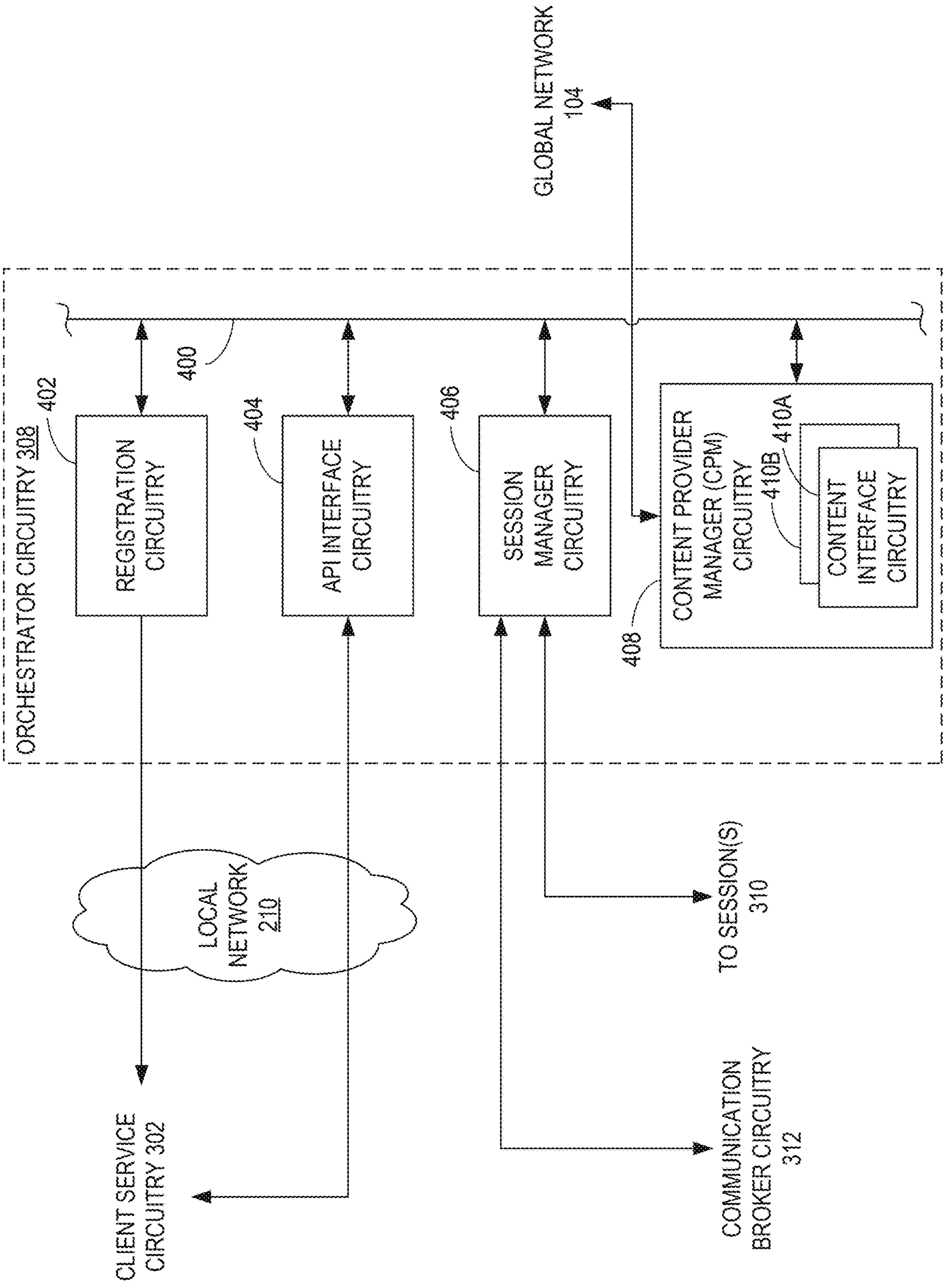
FIG. 4 is a block diagram of an example implementation of the orchestrator circuitry of FIG. 3.

FIG. 4 is a block diagram of an example implementation of the orchestrator circuitry of FIG. 3. The example of FIG. 4 shows the orchestrator circuitry 308 includes a bus 400, registration circuitry 402, application program interface (API) interface circuitry 404, session manager circuitry 406, and content provider manager (CPM) circuitry 408. The CPM circuitry 408 includes content interface circuitry 410A, 410B, . . . (collectively referred to as content interface circuits 410).

The bus 400 refers to one or more physical connections (e.g., an interconnect, copper trace, etc.) that enables communication between the registration circuitry 402, the API interface circuitry 404, the session manager circuitry 406, and the CPM circuitry 408. The bus 400 may be implemented using one or more communication systems that meet pre-determined threshold power and latency requirements.

The registration circuitry 402 broadcasts configuration messages over the local network 210 for any device on the network to obtain. The broadcasts contain data that enables new client devices 204 that join the streaming environment 110A to self-register with the orchestrator circuitry 308. Accordingly, a configuration message may include information including but not limited to an Internet Protocol (IP) address and/or a Media Access Control (MAC) address of the orchestrator circuitry 308, a description of the roles and or authorizations of the orchestrator circuitry 308, encryption data, the operating mode of the local manager circuitry 202 (e.g., HTTP or HTTPS), etc. In some examples, the registration circuitry 402 is instantiated by programmable circuitry executing registration instructions and/or configured to perform operations such as those represented by the flowchart(s) of FIG. 10A.

The API interface circuitry 404 manages an API that is used by the client service circuitry 302 and various components of the orchestrator circuitry 308 to communicate over the local network 210 as shown in FIG. 4 or, in some examples, the global network 104. For example, the API interface circuitry 404 receives self-registration data from client service circuitry 302. The self-registration data may include but is not limited to certificate files, usernames, and passwords, etc. The self-registration data is transmitted by the client service circuitry 302 in a specific format, e.g. using a particular function call, which is interpretable by the API interface circuitry 404. The API interface circuitry 404 then forwards the registration information to the registration circuitry 402, which determines whether to admit or deny the client device 204. Once the client device is admitted, the CPM circuitry 408 uses the API interface circuitry 404 to transmit Electronic Program Guide (EPG) data to the client service circuitry 302. The client service circuitry 302 also uses the APIs to request manifest files for various media streams described within the EPG data. The API interface circuitry 404 forwards such requests to the session manager circuitry 406, which determines how to respond. In some examples, the API interface circuitry 404 converts data from a first format into a different format supported by an API function call, or vice versa. In some examples, the API interface circuitry 404 is instantiated by programmable circuitry executing API interface instructions and/or configured to perform operations such as those represented by the flowchart(s) of FIGS. 10B and 10C.

The session manager circuitry 406 opens and closes the sessions 310 based on the requests that are received from the client devices 204 within the streaming environment 110A. The session manager circuitry 406 also provides configuration instructions to the various sessions 310. In some examples, the session manager circuitry 406 is instantiated by programmable circuitry executing session manager instructions and/or configured to perform operations such as those represented by the flowchart(s) of FIGS. 10C and 10D.

The CPM circuitry 408 provides the client service circuitry 302, via the API interface circuitry 404, with EPG data that describes various media streams. Such EPG data may include but is not limited to a uniform resource link (URL) for the stream, a channel ID, poster art, authentication data structures such as tokens, etc. Within the CPM circuitry 408, the content interface circuits 410 communicate with the respective content providers 102 to obtain the EPG data. The example of FIG. 4 includes two content interface circuits 410A and 410B. More generally, the CPM circuitry 408 may include any number of content interface circuits 410 as described further in connection with FIG. 5.

In some examples, the CPM circuitry 408 filters the amount of data it receives from the content providers 102 so that a given client device 204 receives EPG data with only the media streams that the managing organization authorizes. The managing organization may authorize all media streams available to the client device 204 or, alternatively, authorize only a subset of the available media streams. The CPM circuitry 408 determines which combinations of client devices 204 and content providers 102 to filter based on instructions from the business management circuitry 106. In some examples, the CPM circuitry 408 is instantiated by programmable circuitry executing CPM instructions and/or configured to perform operations such as those represented by the flowchart(s) of FIG. 10B.

Figure 5:
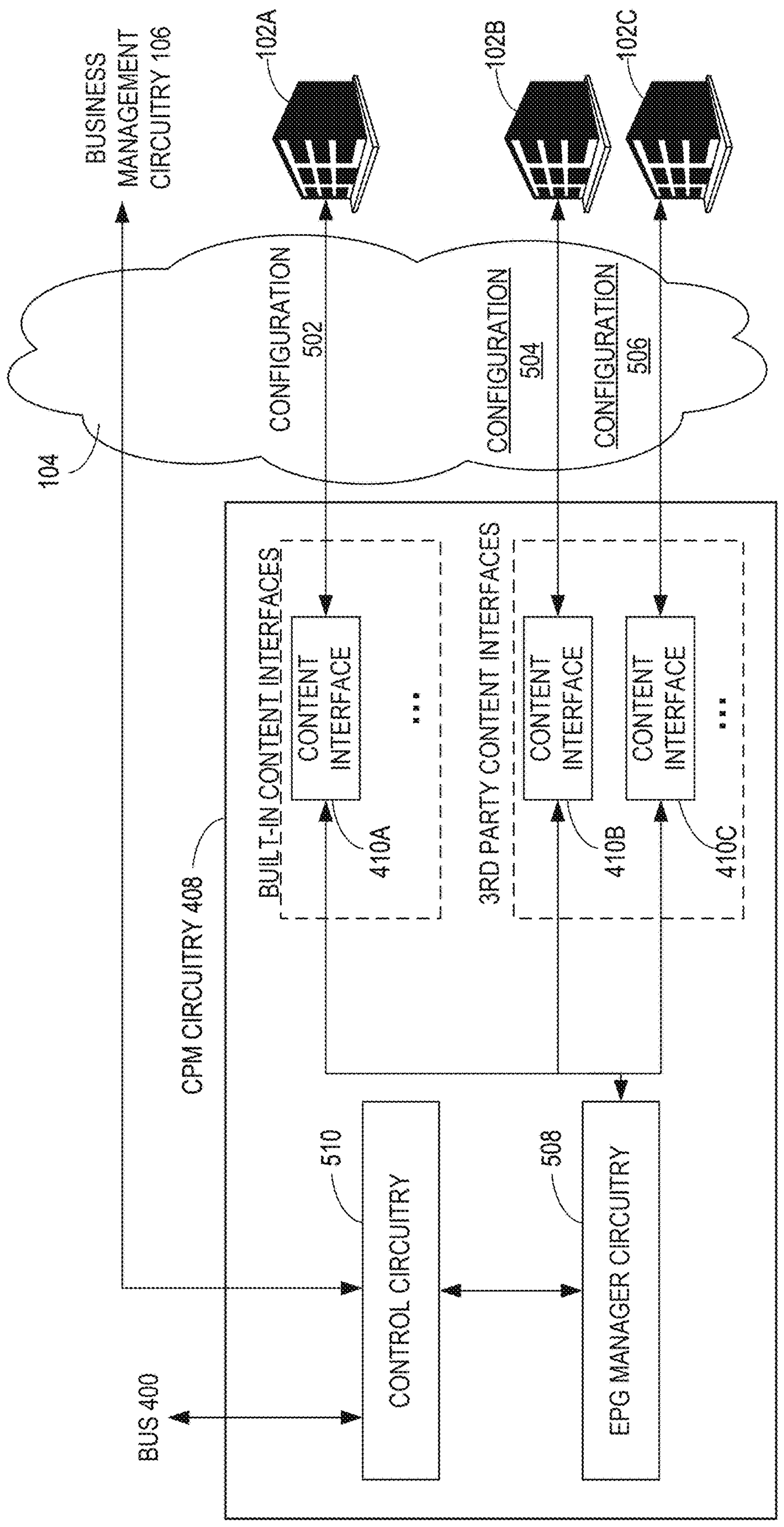
FIG. 5 is a block diagram of an example implementation of the content provider manager circuitry of FIG. 4.

FIG. 5 is a block diagram of an example implementation of the CPM circuitry 408 of FIG. 4. The example of FIG. 5 shows the CPM circuitry 408 includes the content interface circuits 410, configurations 502, 504, and 506, EPG manager circuitry 508, and control circuitry 510.

The content providers 102 may provide any type of media streams as described above. For example, the content provider 102A may provide one or more linear television channels, content provider 102B may provide one or more VOD streams corresponding to a particular streaming platform, content provider 102C may provide footage from a security camera affixed to the hotel 110A, etc. Furthermore, some content providers 102 may be managed by a content distribution platform that provides multiple media streams, while other content providers 102 correspond to a network that produces a specific media stream. As such, the content providers 102 generally enforce different configurations from one another. As used in the context of FIG. 5, a configuration may refer to any combination of rules, protocols, procedures, APIs, data formats, etc. that a given content provider 102A uses to communicate with external devices. In the example of FIG. 5, the content provider 102A uses the configuration 502 for communication, the content provider 102B uses the configuration 504 for communication, and the content provider 102C uses the configuration 506 for communication.

In other media delivery architectures, an STB includes only one content interface circuit that communicates with one content provider. In some such examples, the content provider may correspond to the same organization that manufactures the STB, e.g., DirecTV®. Thus, while the STB in such an example provides media streams offered by DirecTV®, a user wishing to view media streams from other sources, e.g., PlutoTV®, Netflix®, Hulu®, etc., cannot use the STB to obtain said media. Instead, a user that participates in such a media delivery architecture must install third-party software applications on an Internet-capable device such as a tablet, laptop, smart TV, etc. The third-party software application then uses a particular configuration to communicate with its corresponding content provider and present media. While third-party software usage can be acceptable in contexts where the user owns the Internet-capable devices, such software usage can lead to security and scalability concerns in business contexts such as the streaming environment 110A. For example, an owner of a chain of hotels may have licensing agreements to provide content from certain content providers, and to exclude content from other content providers, in every hotel room television. Allowing hotel guests to install third-party software may lead to the streaming of unauthorized content, thereby breaking the licensing agreement. Furthermore, content that is streamed through third-party software applications cannot be managed by the hotel organization and therefore may consume a disproportionate amount of bandwidth, thereby decreasing the streaming quality for other client devices on the local network.

Advantageously, the CPM circuitry 408 in examples described herein includes one content interface circuit 410 per content provider 102 that is accessible to the orchestrator circuitry 308. The CPM circuitry 408 includes both content interface circuitry 410A that communicate with pre-approved content providers, e.g., DirecTV®, and content interface circuits 410B and 410C that communicate with third-party content providers, e.g., PlutoTV® and Netflix®. Thus, client devices 204 in examples described herein can present third-party content without installing the corresponding third-party software. Such an architecture provides additional security and scalability than other media delivery architectures.

The EPG manager circuitry 508 receives EPG data from the content interfaces 410 in different formats that correspond to the different configurations 502, 504, 506. The EPG manager circuitry 508 then normalizes the various EPG data so that the client devices 204 can use a single, standardized protocol from the API interface circuitry 404 to request and obtain the EPG data. Such normalization operations include but are not limited to changing file types, reorganizing data fields, concatenating or zero-padding data fields, adding certain metadata, removing certain metadata, and/or, more generally, mapping multiple unique data structures in which EPG data is received to a single data structure for use within the streaming environment 110A.

In some examples, the EPG manager circuitry 508 acts as a filter by providing the control circuitry 510 with standardized EPG data from some but not all of the content providers 102. The EPG manager circuitry 508 provides data from the specific content providers 102 requested by the control circuitry 510, which can request different sets of EPG data for different client devices 204. The control circuitry 510 determines which filters to apply based on instructions from the business management circuitry 106. Such instructions are described further in connection with FIG. 8.

Figure 6:
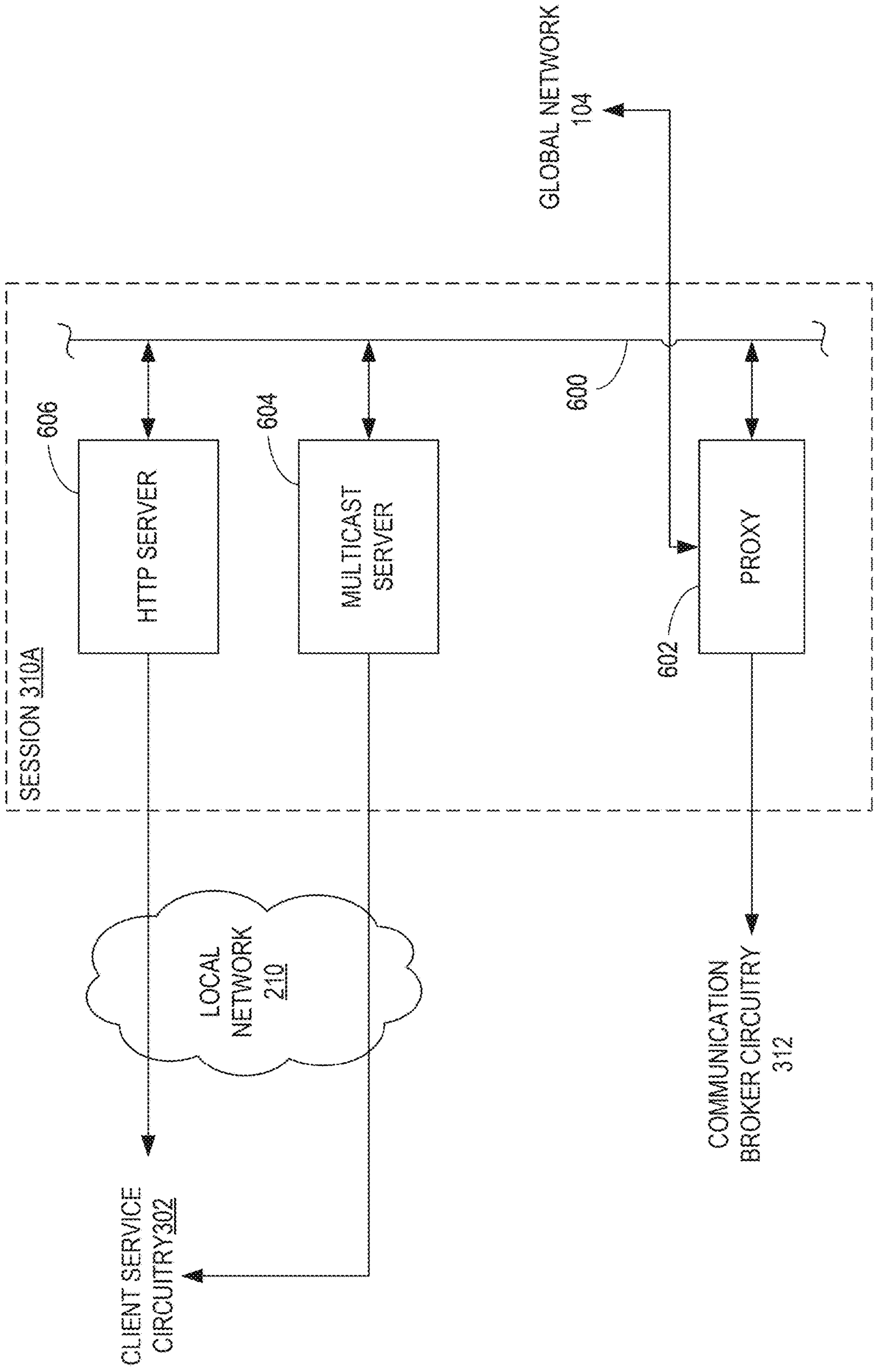
FIG. 6 is a block diagram of an example implementation of a session of FIG. 3.

FIG. 6 is a block diagram of an example implementation of a session of FIG. 3. The example of FIG. 6 shows that the session 310A includes a bus 600, a proxy 602, a multicast server 604, and an HTTP server 606.

The bus 600 refers to one or more logical connections that enables communication between the proxy 602, multicast server 604, and HTTP server 606. In some examples, the bus 600 is implemented using a shared memory resource that is accessible by the various threads, processes, or programmable circuits that instantiate the session 310A. The bus 600 may be implemented using one or more communication systems that meet pre-determined threshold power and latency requirements.

The proxy 602 communicates with the session manager circuitry 406 via the communication broker circuitry 312. The proxy 602 may communicate with the session manager circuitry 406 for any purpose, including but not limited to reporting that initialization is complete, obtaining configuration instructions, obtaining instructions to start or stop servicing client devices, provide session metrics, etc.

The proxy 602 also receives a request for a manifest file from the client service circuitry 302 via the communication broker circuitry 312. As used herein, the manifest file refers to data that enables client service circuitry 302 to request particular portions of a particular media stream. A manifest file may include data including but not limited to a full stream URL.

In many examples, an original manifest file received from a content provider 102A includes data that corresponds to multiple video resolutions and/or audio resolutions to support ABR. Allowing multiple client devices 204 to independently perform ABR within a local network 210 can degrade user experience throughout the streaming environment 110A as described above.

Advantageously, the proxy 602 edits the manifest file to remove extra video resolutions and/or audio resolutions, thereby preventing the client devices 204 from performing ABR. Instead, the proxy 602 edits the manifest file so that the client device 204A can only request media from one video resolution and one audio resolution for a period of time. The proxy 602 determines which resolutions to assign to various client devices 204 and when to change resolution assignments based on policies and client device groupings obtained from the business management circuitry 106. The policies and device groupings are described further in connection with FIGS. 7A-7C and 11D. In some examples, the proxy 602 additionally or alternatively edits the manifest file to provide support for Dynamic Advertisement Insertion. The proxy 602 then provides the edited manifest file to the client service circuitry 302.

A given proxy 602 also communicates with a single content provider 102A via the global network 104 to obtain the actual stream data, e.g., video and audio data that form a television show, movie, livestream, etc. In some examples, the stream data obtained by the proxy 602 is referred to as a payload, while the manifest file and the EPG data are referred to as metadata that correspond to the payload.

The proxy 602 obtains a given segment of a media stream in response to a HTTP request from the client service circuitry 302 of a client device. In the example of FIG. 6 the HTTP request is obtained by the HTTP server 606 (using the edited manifest file described above) and forwarded to the proxy 602 via the bus 600. In other examples, the HTTP server 606 is a component of the proxy 602.

The proxy 602 also transmits HTTP requests to the content provider 102A and receives corresponding media segments as HTTP packets. However, while HTTP requests are comparatively small amounts of data that do not generally stress the local network 210, HTTP packets containing stream data are comparatively large amounts of data that can stress the local network 210 if duplicate copies are sent to each requesting client device.

Advantageously, the proxy 602 instructs the HTTP server 606 to forward copies of the HTTP packets to only those requesting devices that have registered for HTTP stream delivery, e.g., those that do not support multicast. The proxy 602 also instructs the multicast server 604 to convert the HTTP packet into UDP datagrams and/or QAM data chunks based on the multicast protocols supported by the other requesting client devices. The multicast server 604 and HTTP server 606 then transmits the stream data using their respective protocols to the client service circuitry 302 of one or more requesting client devices 204. The stream data transmissions may occur over the local network 210, as shown in the example of FIG. 6, and/or over the global network 104.

FIG. 7A is an illustrative example of business logic used by the proxy 602 of FIG. 6 to edit a manifest file. The business logic is represented in the example of FIG. 7A as pseudocode 700. The pseudocode 700 includes example profiles 702A, 702B, 702C, 702D, . . . , 702-*n* (collectively referred to as profiles 702), an example maximum bandwidth 704, example client group definitions 706A, 706B, 706C, . . . , 706-*n* (collectively referred to as client group definitions 706), an example policy list 708, and an example policy application 710.

In many examples such as the streaming environment 110A, the client devices 204 can collectively consume a significant portion of the bandwidth available in the local network 210 by streaming media. Accordingly, the local manager circuitry 202 performs various operations to control the bandwidth consumed by streaming media. For example, the proxy 602 edits manifest files that are requested by HLS supporting client devices (e.g., the smart device 204C). In addition to removing support for ABR as described above, editing the manifest file assigns a singular video resolution and a singular audio resolution to the smart device 204C. Therefore, when the smart device 204C streams the media associated with the manifest file, it is limited to doing so at the assigned video and audio resolution.

The proxy 602 determines which video resolution and audio resolution to assign based on business logic (e.g., instructions from the business management circuitry 106) that includes but is not limited to the pseudocode 700 of FIG. 7A. Assigning streaming resolutions based on business logic enables the local manager circuitry 202 to prioritize the limited resources of the local network 210 in an application-specific manner that is defined by the managing organization.

The pseudocode 700 may include any number of profiles 702. As used above and herein, a profile refers to a combination of one audio resolution and one video resolution. The proxy 602 assigns a given profile 702A to a client device 204C by editing a manifest file as described above.

The profiles 702 may include any video resolution described in the manifest files, including but not limited to 4K, 1440p, 1080p, 720p, 480p, 360p, etc. The profiles 702 may similarly include any number of audio resolutions. In the example of FIG. 7A, the pseudocode 700 represents audio resolutions as different file formats (FLAC, WAV, MP3, etc.) because the bandwidth consumed by audio streaming is generally dependent on file format. In other examples, the profiles 702 define the audio resolutions differently.

The example of FIG. 7A shows that video resolution quality is proportional to audio resolution quality in each of profiles 702A-702D. For example, profile 702A is the highest quality at 4K video resolution and audio formatted in. FLAC files (a lossless compression format) and profile 702D is the lowest quality at 720p video resolution and audio formatted in. MP3 files (a lossy compression format). In some examples, the pseudocode 700 additionally or alternatively include one more profiles 702 where video resolution quality and audio resolution quality are not proportional.

The bandwidth devoted to media streaming in the local network 210 may change frequently based on the number of client devices 204 that are streaming media, the number of duplicative streams, the audio and video resolutions of the existing streams, etc. Thus, at any given time, the proxy 602 can evaluate the status of the local network 210 to determine whether to increase, decrease, or maintain the overall streaming quality. The operations performed by the proxy to evaluate the status of the local network 210 are described further in connection with FIG. 11C.

A given profile is composed of both one video stream and one audio stream as described above. Thus, some of the profiles 702 may share a common component stream. For example, profiles 702A and 702B have the same audio stream of FLAC formatting. If the FLAC-formatted audio stream for a given media title is available independently of the video streams, the proxy 602 will obtain copy of the audio stream and combine it with two separate video streams (e.g., 4K and 1440p) to form two separate profiles 702A and 702B. More generally, if n profiles share a common component stream and a content provider 102 provides the component stream independently, the proxy 602 can reduce external bandwidth by obtaining only one copy of the common component stream from the content provider rather than n copies.

The proxy 602 may change the profile assignment of one or more client devices 204 after determining the status of the local network 210 to meet the application-specific goals defined by the managing organization in the pseudocode 700. For example, if the proxy 602 determines the bandwidth consumed by the client devices 204 exceeds the maximum bandwidth 704, the proxy 602 lowers the streaming quality of the local network 210 by assigning lower profile(s) 702 to one or more client devices 204. Examples of changing profiles are described in FIGS. 7B-7C, 11D and 11E.

After deciding to change the streaming quality of one or more client devices 204 based on the status of the local network 210, the proxy 602 uses the client group definitions 706 to determine which streams to change. As used above and herein, a client group refers to one or more client devices 204 that share a common profile 702 assignment. Thus, at any point in time, all client devices in a client group that are streaming media do so at the same audio resolution and the same video resolution as one another.

In FIG. 7A, the business management circuitry 106 uses ".ASSIGN( )" to assign client devices 204 to a given client group. In other examples, the managing organization uses a different technique to assign client devices to client groups. Thus, the client group definition 706A includes client devices 204B and 204D, the client group definition 706B includes client devices 204A and 204C, etc. Notably, FIG. 7A shows initial assignments based on the client devices 204 that are present in the local network 210 at the time the business management circuitry 106 provides the pseudocode 700 to the proxy 602. If the environment 110A changes to add additional client devices 204E, 204F, etc., the proxy 602 can use additional instructions from the business management circuitry 106 to either add the new client devices to existing client group(s) and/or form a new client group for the new client devices.

In the pseudocode 700, the client group definition 706C includes the line "CLIENT_GROUP_C.ISDEFAULT ( )=TRUE;" that designates client group "C" as the default group. The business management circuitry 106 assigns one client group as a default per local network 210. The client group definition 706C also includes the line "CLIENT_GROUP_C.ASSIGN( )=< >;" because the business management circuitry 106 does not need to explicitly assign client devices to the default group in the pseudocode 700. Rather, the proxy 602 automatically adds client devices to the default group when they are not explicitly part of any other group. Similarly, the proxy 602 automatically removes a client device from the default group when said client device is explicitly added to any other group.

The proxy 602 and/or business management circuitry 106 may change the client group assignments at any time for any reason. Such reasons include but are not limited to a change in the designation of some client devices 204 (e.g., a hotel management organization changes some standard rooms to VIP rooms). In such examples, the business may choose to change the client group assignments in view of the changing client device designations. Additional reasons for changing client group assignments include but are not limited to connectivity changes. For example, if some client devices 204 were initially streaming media over Wi-Fi but are then upgraded to stream media over Ethernet, the management organization may want to switch those client devices to a higher quality group.

In the example of FIG. 7A, the business management circuitry 106 uses ".TYPE( )" to designate each client group as either fixed or variable. If the business management circuitry 106 designates a client group as fixed, the local manager circuitry 202 is forbidden from changing the streaming quality of client devices within said client group. Thus, the client definition 706A shows that client devices 204B and client devices 204C are permanently set to stream media at profile 702A, even if the proxy 602 determines the overall stream quality of the local network 210 needs to change. The business management circuitry 106 may assign any numbers of client groups as fixed for any reason. For example, the business management circuitry 106 may create one or more fixed client groups for client devices 204 that are in luxury hotel rooms or public areas (e.g., lobbies, conference rooms, etc.) to ensure the streaming quality in those rooms remains consistently high.

In contrast to fixed client groups, the proxy 602 does change the streaming quality of variable client groups based on the status of the local network 210 (e.g., if media streaming among the client devices collectively exceeds the maximum bandwidth 704). Thus, the business management circuitry 106 uses ".TARGET( )" to assign target profiles for the variable client group definitions 706B and 706C rather than using ".SET( )" to assign a profile in the fixed client group definition 706A. A target profile represents the desired streaming quality that should be used by the client devices in the client group when the conditions of the local network 210 are ideal (e.g., if media streaming among the client devices collectively exceeds the maximum bandwidth 704).

When the proxy 602 decides to increase or decrease the streaming quality of the overall local network 210, the proxy 602 determines which of the variable client groups to change by applying one or more of the policies in the policy list 708. A given policy refers to a technique to edit the streaming quality of one or more variable client groups in a specific order. For example, the proxy 602 applies the "CG_PRIORITY" policy by changing streaming quality of the variable client groups based on the "PRIORITY( )" designation within the client group definitions 706. Thus, under the "CG_PRIORITY" policy, the streaming quality of the client group B increases before the client group C is increased, and the streaming quality of the client group B decreases after the client group C is decreased, because client group B's priority value of 1 indicates a higher priority than client group C's priority value of 2. The proxy 602 may additionally or alternatively change the streaming quality of the variable client groups using other policies within the policy list 708. Such other policies include but are not limited to "BALANCED" and Lowest Priority Max Out "LPMO", which are described further in connection with FIGS. 7B and 7C respectively.

The proxy 602 uses the policy application 710 to determine how many of the policies to apply, which policies to apply, and the order in which the policies should be applied. The policy application 710 may include one or more policies in sequential order and/or one or more conditional statements as described further in connection with FIG. 11E. In some examples, the policy application 710 may be referred to as an algorithm, a function, a method, etc.

In the example of FIG. 7A, the maximum bandwidth 704 is a parameter within the pseudocode 700 and thus set by the business management circuitry 106 and provided to the proxy 602. In other examples, the proxy 602 sets the value of the maximum bandwidth 704 based on measurements of the local network 210.

FIG. 7B is an illustrative example of the proxy 602 changing the stream quality in the local network 210 by applying a balanced policy. The example of FIG. 7B includes three client groups (labeled CG1, CG2, CG3) that may be implemented by any of the client group definitions 706 in FIG. 7A that include ".TYPE( )=VARIABLE". FIG. 7B also includes ten available profiles (labeled A1 through A10) that may be implemented by any of the profiles 702 of FIG. 7. Accordingly, the target profile of a given client group may be different than the actual profile that the proxy 602 assigns to it. Like FIG. 7A, the profiles of FIG. 7B are indexed by stream quality so that AP1 has the highest stream quality and AP10 has the lowest stream quality. Accordingly, a client device 204C consumes the most amount of bandwidth by streaming media at AP1 and the least amount of bandwidth by streaming media at AP10.

In some examples, a profile may be unavailable despite being offered by the content providers 102 due to instructions set by a managing organization via the business management circuitry 106. A profile may be marked as unavailable for any reason. For example, a managing organization may decide that the client devices 204 should buffer rather than attempt to stream media at 140p video resolution and therefore mark any profile with 140p video resolution as unavailable).

The example of FIG. 7B shows how the profiles assigned to client groups CG1, CG2, and CG3 change over time. Accordingly, each row in the table of FIG. 7B refers to a different timestamp. The timestamps are indexed chronologically so that T1 occurs before T2, which occurs before T3, etc. Operations listed in a given row occur at approximately the same time as denoted by the timestamp that corresponds to the row.

The proxy 602 begins operations at T1 by assigning profiles that match the target profile listed in the client group definition. Thus, CG1 streams media at AP1, CG2 streams media at AP3, and CG3 streams media at AP6 in the initial streaming conditions of T1.

At T2, the proxy 602 evaluates the status of the local network 210 to determine there is not enough bandwidth to accommodate the current streaming conditions. In response, the proxy 602 decides to lower the stream quality of the local network 210 using the balanced policy. The balanced policy refers to a technique in which, under adverse network conditions, the proxy 602 downgrades the assigned stream profile equitably amongst the variable client groups. Thus, under the balanced policy, the stream quality of a variable client group is not downgraded an (n+1)th time until all the other variable client groups have been downgraded at least n times. Before T2, the streaming quality of three client groups has been downgraded an equal amount of times (zero). In such situations, the proxy 602 applies the balanced policy by downgrading the lowest priority client group. In the example of FIG. 7B, CG1 has the highest priority, followed by CG2, and CG3 has the lowest priority. Thus, at T2, the proxy 602 implements the decision lower the stream quality of the local network 210 by downgrading the actual profile of CG3 from AP7 to AP6. The proxy 602 changes the actual profile of a client group by editing manifest files as described above.

At T3, the proxy 602 determines there is still not enough bandwidth in the local network 210 to accommodate the current streaming conditions set during T2. Thus, the proxy 602 decides to lower the streaming quality again. Notably, the streaming quality of CG3 (the lowest priority group) can still be lowered to any of AP8, AP9, or AP10. But at T3, the stream quality of CG3 has been downgraded once while the stream quality of CG1 and CG2 remain unaffected. The proxy 602 therefore applies the balanced policy by changing the available profile of CG2 from AP4 to AP3 because at T3, CG2 is the lowest priority group that had yet to be downgraded.

At T4, the proxy 602 determines there is still not enough bandwidth in the local network 210 to accommodate the current streaming conditions set during T3. Thus, the proxy 602 decides to lower the streaming quality again. To apply the balanced policy and continue equitably distributing downgrades, the proxy 602 changes the available profile of CG1 from AP1 to AP2 because at T4, CG1 is the lowest priority group that had yet to be downgraded.

At T5, the proxy 602 determines the current streaming conditions of T4 are still insufficient and the stream quality of the local network 210 still needs to be lowered. After T4, all client groups have been had their streaming quality downgrade once. Thus, at T5, the proxy 602 applies the balanced by downgrading the streaming quality of CG3 a second time from AP7 to AP8. Similarly, when the proxy 602 determines yet another decrease is needed at T6, the proxy 602 downgrades the stream quality of CG2 a second time from AP4 to AP5.

At T7, the proxy 602 determines the local network 210 now has enough bandwidth to accommodate an improvement in stream quality from the current streaming conditions of T6. In this example, the proxy 602 implements the balanced policy by upgrading the streaming quality client groups based on their priority list. Thus, at T7, the proxy 602 restores the stream quality of CG1 back to its target profile of AP1. In other examples, the proxy 602 implements the balanced policy by upgrading client groups in reverse of the order in which the client groups were downgraded.

Because a given profile can refer to any available audio resolution and available video resolution, the difference in bandwidth consumed by nth highest quality profile and the (n+1)th highest quality profile may be unequal to the difference in bandwidth consumed by nth highest quality profile and the (n−1)th highest quality profile. For example, the proxy 602 determines at T8 that the difference in bandwidth between CG1 streaming at AP2 and CG1 streaming at AP1 cannot currently be accommodated by the local network 210. Accordingly, the proxy 602 reverts CG1 back to AP2 at T8.

At T9, the client devices 204 are again consuming less than the maximum bandwidth 704. Accordingly, the proxy 602 attempts a different upgrade at T9 by changing the actual profile of AP5 back to AP4. At T10, the proxy 602 determines a) the bandwidth consumed by CG2 streaming at AP4 is less than the bandwidth consumed by CG1 streaming at AP1 and b) the total bandwidth consumed by the client devices stays under the maximum bandwidth 704. However, the proxy 602 also determines c) the difference in bandwidth between CG2 streaming at AP4 compared to CG2 streaming at AP5 is large enough that no further improvements can be made without exceeding the maximum bandwidth 704 again. Accordingly, the proxy 602 decides at T10 to keep the client devices 204 in the current streaming conditions set at T9.

Notably, the internal bandwidth (e.g., the bandwidth of the local network 210) consumed by a given client group at a given actual profile is dependent on the number of client devices in the client group that are currently streaming media. Thus, even though the proxy 602 decided to keep the current stream streaming conditions at T10, the decision to change the stream quality may change at any number of times in the future. For example, if one or more client devices in CG1 stop streaming media at T11 (e.g., the client devices are turned OFF), the internal bandwidth savings may enable the proxy 602 to change the actual profile CG3 from AP8 back to AP7. More generally, a decrease in the total number of client devices currently streaming can cause the proxy 602 to make an available profile upgrade, where an upgrade is only available if the amount of additional bandwidth consumed by a client group at the improved profile is less than or equal to the bandwidth saved by the one or more client devices that stopped streaming. Similarly, an increase in the total number of client devices 204 currently streaming will cause the proxy 602 to downgrade at least one client group to a lower profile if the increase causes the internal bandwidth consumed by streaming to exceed the maximum bandwidth 704. In some examples, the proxy 602 changes one or more stream qualities based on stream metrics and/or network quality parameters other than the maximum bandwidth 704.

The proxy 602 can also change client group assignments in based on the amount of external bandwidth consumed (e.g., the amount of data exchanged between the local manager circuitry 202 and the global network 104). For example, consider a starting configuration that has five client devices in CG1, five client devices in CG2, and five client devices in CG3. As the number of client groups increases in a streaming environment, the amount of external bandwidth consumed also increases. In this example, the further the proxy 602 determines the current connection between the hotel 110A and the global network 104 cannot support three client groups. As a result, the proxy 602 form a new configuration in which the same client devices 204 are reassigned to only two client groups. In this example, the new configuration includes the same five client devices in CG1, ten client devices in CG2, and no client devices in CG3. The new configuration is beneficial because the amount of external bandwidth consumed by streaming is not dependent on the number of client devices in a client group. Thus, even though the new configuration has an increased average streaming quality compared to the initial configuration, the new configuration also consumes less external bandwidth than the old configuration because of the difference in client groups.

Some client devices are not capable of streaming all available profiles to the local manager circuitry 202. For instance, some televisions may lack the hardware components necessary to display video in 4K resolution. Thus, before making the change from the initial configuration to the new configuration in the foregoing example, the proxy 602 checks that the five client devices originally assigned to CG3 in the initial configuration are also capable of streaming media at CG2.

FIG. 7C is an illustrative example of the proxy 602 changing the stream quality in the local network 210 by applying an LPMO policy. The example of FIG. 7C includes the same client groups CG1, CG2, and CG3 and the same available profiles AP1-AP10 as FIG. 7B. FIG. 7C also includes a sequence of chronological timestamps T1-T10 as described above in connection with FIG. 7B. And like FIG. 7B, the proxy 602 starts operations by assigning the actual profile of each client group to match the target profile of the client group.

The LPMO policy instructs the proxy 602 to, during adverse network conditions, downgrade the streaming quality of the lowest priority client group as much as possible before making any downgrades to a higher priority client group. Thus, when the proxy 602 determines at T2 that the initial downgrade of CG3 from AP6 to AP7 is insufficient to accommodate the bandwidth restraints on the local network 210, the proxy 602 downgrades the streaming quality of CG3 again from AP7 to AP8. The proxy 602 continues to apply the LPMO policy by downgrading the streaming quality of CG3 at each of T4 and T5.

At T6, the proxy 602 determines there is still not enough bandwidth to accommodate the current streaming conditions of T5. However, the downgrades of the lowest priority client group have already been "maxed out" in the sense that AP10, the actual profile of CG3, is the lowest possible streaming quality. Accordingly, the proxy 602 changes the actual profile of CG2 from AP3 to AP4 at T6 because CG2 is the lowest priority group that can still be downgraded.

At T7, the proxy 602 determines the bandwidth consumed by the client devices 204 for streaming is now below the maximum bandwidth 704. In such situations where increases in streaming quality are possible, the LPMO policy indicates that the higher priority client groups should be upgraded before lower priority groups. Here, the highest CG1 does not need to be upgraded because the actual profile has remained at the target profile of AP1 throughout the example of FIG. 7C. Accordingly, the proxy 602 implements the LPMO policy at T7 by reverting the actual profile of CG2 back to AP3.

At T8, the proxy 602 determines the increase in bandwidth caused by the new streaming conditions of T7 put the total bandwidth consumed by the client devices 204 for streaming above the maximum bandwidth 704. As a result, the proxy 602 downgrades the actual profile of CG2 back to AP4 at T8. Accordingly, at T9, the total consumed streaming bandwidth is again less than the maximum bandwidth 704. The proxy 602 then attempts to upgrade the stream quality of CG3 by changing the actual profile from AP10 to AP9.

At T10, the proxy 602 determines a) the bandwidth consumed by CG3 streaming at AP9 is less than the bandwidth consumed by CG2 streaming at AP4 and b) the total bandwidth consumed by the client devices stays under the maximum bandwidth 704. However, the proxy 602 also determines c) the difference in bandwidth between CG3 streaming at AP9 compared to CG3 streaming at AP10 is large enough that no further improvements can be made without exceeding the maximum bandwidth 704 again. Accordingly, the proxy 602 decides at T10 to keep the client devices 204 in the current streaming conditions set at T9. Like FIG. 7B, the proxy 602 may continue to make changes to the current streaming conditions after T10 if the performance of the local network 210 changes.

Figure 8:
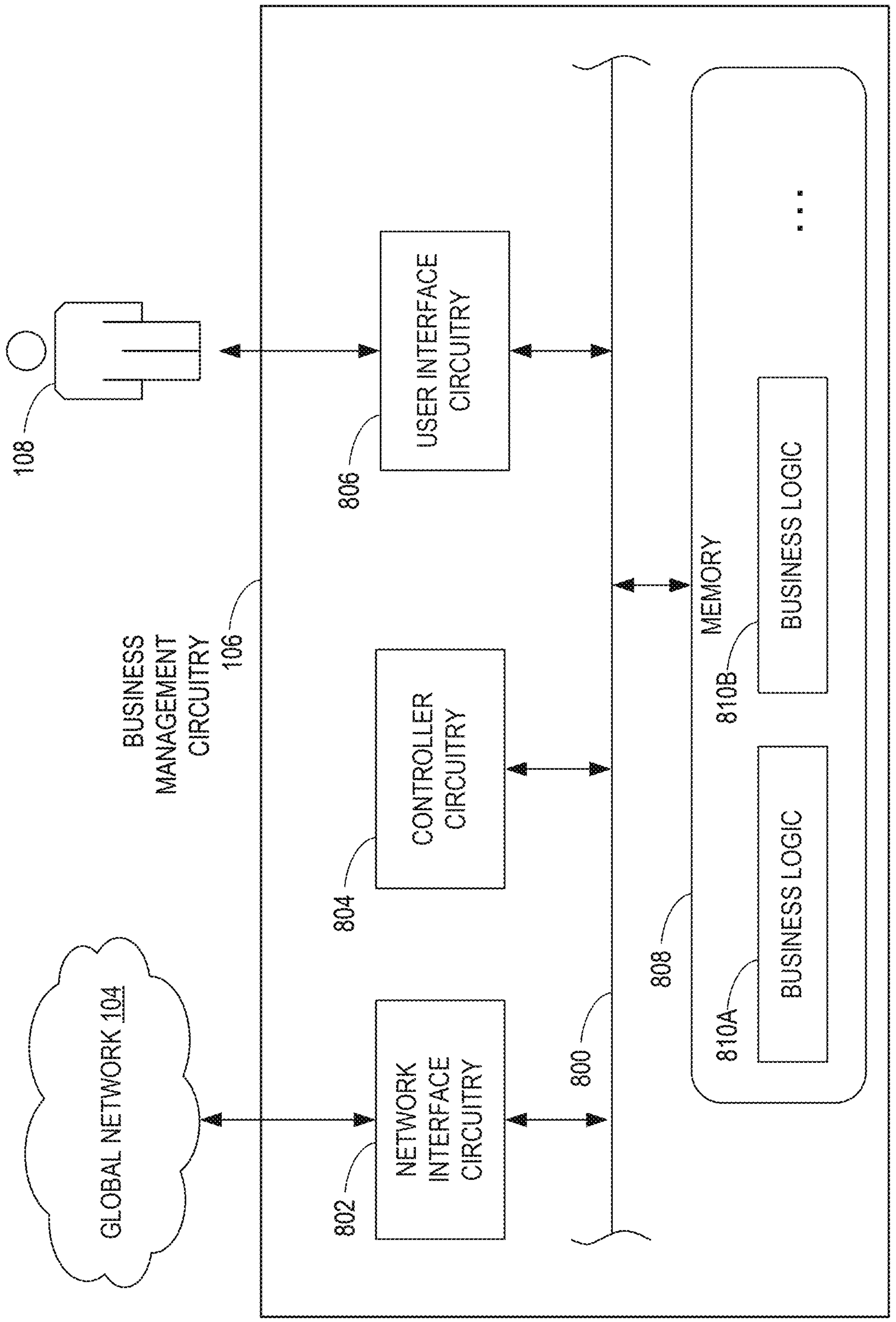
FIG. 8 is a block diagram of the business management circuitry of FIG. 1.

FIG. 8 is a block diagram of the business management circuitry 106 of FIG. 1. The example of FIG. 8 shows the business management circuitry 106 includes a bus 800, network interface circuitry 802, controller circuitry 804, user interface circuitry 806, and memory 808. The memory 808 includes business logic 810A, 810B, . . . (collectively referred to as business logic 810).

The bus 800 refers to one or more physical connections (e.g., an interconnect, copper trace, etc.) that enables communication between the network interface circuitry 802, the controller circuitry 804, the user interface circuitry 806, and the memory 808. The bus 800 may be implemented using one or more communication systems that meet pre-determined threshold power and latency requirements.

The network interface circuitry 802 enables the other components of the business management circuitry 106 to communicate with external devices using the global network 104. The network interface circuitry 802 includes one or more transceivers, antennas, and/or other hardware components required to facilitate such communication. Similarly, the network interface circuitry 802 may implement any suitable communication protocols to send and receive data over the global network 104. Such communication protocols include but are not limited to those used to implement the network and data link layers of the Open Systems Interconnection (OSI) model.

The controller circuitry 804 manages the operations of the other components of the business management circuitry 106. In the example of FIG. 4, the controller circuitry 804 controls the user interface circuitry 806 to provide stream data to the user 108 and obtain instructions from the user 108. The user interface circuitry 806 may include a display, keyboard, mouse, touchscreen, or other computer input/output hardware components required to facilitate such communication with the user 108. In some examples, the controller circuitry 804 additionally or alternatively provides stream data to and obtains instructions from a remote user via of an external device via the global network.

The controller circuitry 804 interprets and organizes the user instructions into business logic, then stores the business logic in the memory 808. The controller circuitry 804 also provides instructions, via the global network 104, to local manager circuits 202 within one or more streaming environments 110 based on the business logic 810 stored in memory 808. In some examples, the controller circuitry 804 is instantiated by programmable circuitry executing controller instructions and/or configured to perform operations such as those represented by the flowchart(s) of FIG. 12.

Within the memory 808, a given unit of business logic 810 refers to data that describes how a managing organization controls the operations of client devices 204 within their streaming environments. Thus, in the foregoing examples, business logic 810A controls the operations of devices in both the hotel 110A and the hotel 110B and is therefore editable by the hotel chain owner. Similarly, in the same examples, business logic 810B controls the operation of the sports bar 110C and is therefore editable by the owner of the sports bar.

In the examples of FIGS. 1 and 8, the managing organizations provide add or edit their business logic 810 through an employee, e.g., the user 108. In some examples, an external device such as a server adds or edit a unit of business logic 810A on behalf of a managing organization. A managing organization may view, add, or edit their unit business logic 810A at any time. Thus, some portions of the business logic 810A can be pre-determined before being applied to a device, while other portions of the business logic 810A are changed or introduced after some amount initial instructions have been sent to the one or more local manager circuits 202. Edits to a unit of business logic 810A may occur for any reason, including but not limited to a change in the number or type of client devices 204 in a particular local network 210, the addition or subtraction of a streaming environment 110 from the control of the managing organization (e.g. if a new hotel opens or an old hotel closes in the chain), feedback from customers, changes in the finances of the managing organization, etc.

A given unit of business logic 810A includes policies and client device groupings that are used to disable ABR and improve efficiency of the local network 210 as described above in connection with FIG. 7A-7C. The unit of business logic 810A also characterizes the filter operations performed by the CPM circuitry 408 as described above in FIG. 5. Notably, a managing organization may edit any portion of their unit business logic 810A to apply to any combination of the streaming environments 110 they control. For example, a chain of hotels with 110 locations may have some business logic that applies to all 110 locations, some business logic that applies to 50 of the locations, some business logic that applies only to one location, etc. In some examples, a given unit of business logic 810A includes other information corresponding to the client devices 204, local networks 210, and/or local manager circuits 202 in addition to the policies, rules, and filter data described above.

The memory 808 may be implemented as any type of memory. For example, the memory 808 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

The memory 808 and/or any other data storage devices described herein may be implemented by any number and/or type(s) of memories. In some examples, some or all of the memory 808 is implemented as a database. Such a database can be implemented by any memory, storage device and/or storage disc for storing data such as, for example, flash memory, magnetic media, optical media, solid state memory, hard drive(s), thumb drive(s), etc. Furthermore, the data stored in the database may be in any data format such as, for example, binary data, comma delimited data, tab delimited data, structured query language (SQL) structures, etc.

While an example manner of implementing the streaming environment 110A of FIG. 1 is illustrated in FIGS. 1 and 2, one or more of the elements, processes, and/or devices illustrated in FIGS. 1 and 2 may be combined, divided, re-arranged, omitted, eliminated, and/or implemented in any other way. Further, the content providers 102, the business management circuitry 106, the local manager circuitry 202, the client devices 204, and/or, more generally, the example streaming environment 110A of FIG. 1, may be implemented by hardware alone or by hardware in combination with software and/or firmware. Thus, for example, any of the content providers 102, the business management circuitry 106, the local manager circuitry 202, the client devices 204, and/or, more generally, the example streaming environment 110A of FIG. 1, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, one or more of the business management circuitry 106, the local manager circuitry 202, or the client device 204 of FIGS. 1 and 2 may include one or more elements, processes, and/or devices in addition to, or instead of, those illustrated in FIGS. 1 and 2, and/or may include more than one of any or all of the illustrated elements, processes and devices.

Flowcharts representative of example machine-readable instructions, which may be executed by programmable circuitry to implement and/or instantiate one or more of the business management circuitry 106, the local manager circuitry 202, or the client device 204 of FIGS. 1 and 2 and/or representative of example operations which may be performed by programmable circuitry to implement and/or instantiate one or more of the business management circuitry 106, the local manager circuitry 202, or the client device 204 of FIGS. 1 and 2, are shown in FIGS. 9A-12. The machine-readable instructions may be one or more executable programs or portion(s) of one or more executable programs for execution by programmable circuitry such as the programmable circuitry 1312 shown in the example programmable circuitry platform 1300 discussed below in connection with FIG. 13 and/or may be one or more function(s) or portion(s) of functions to be performed by the example programmable circuitry (e.g., an FPGA) discussed below in connection with FIGS. 14 and/or 15. In some examples, the machine-readable instructions cause an operation, a task, etc., to be carried out and/or performed in an automated manner in the real world. As used herein, “automated” means without human involvement.

The program may be embodied in instructions (e.g., software and/or firmware) stored on one or more non-transitory computer readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9A-12, many other methods of implementing one or more of the business management circuitry 106, the local manager circuitry 202, or the client device 204 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9A-12 may be implemented using executable instructions (e.g., computer readable and/or machine-readable instructions) stored on one or more non-transitory computer readable and/or machine-readable media. As used herein, the terms non-transitory computer readable medium, non-transitory computer readable storage medium, non-transitory machine-readable medium, and/or non-transitory machine-readable storage medium are expressly defined to include any type of computer readable storage device and/or storage disk and to exclude propagating signals and to exclude transmission media. Examples of such non-transitory computer readable medium, non-transitory computer readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer readable storage devices /d/ or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer-readable instructions, machine-readable instructions, etc.

Figure 9A:
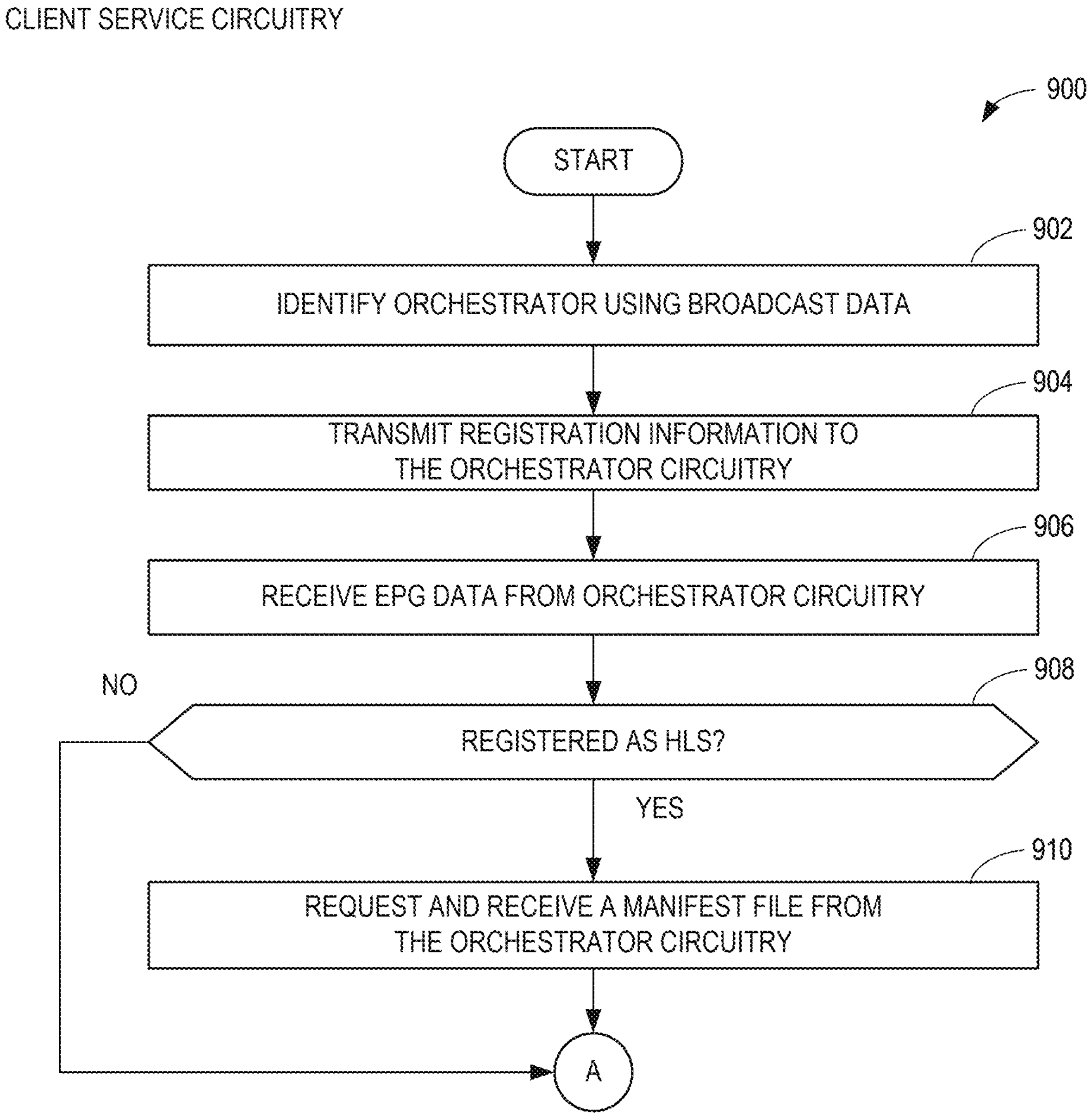
FIG. 9A-9B is a flowchart representative of example machine-readable instructions and/or example operations that may be executed, instantiated, and/or performed by example programmable circuitry to implement the client service circuitry of FIG. 3.
Figure 9B:
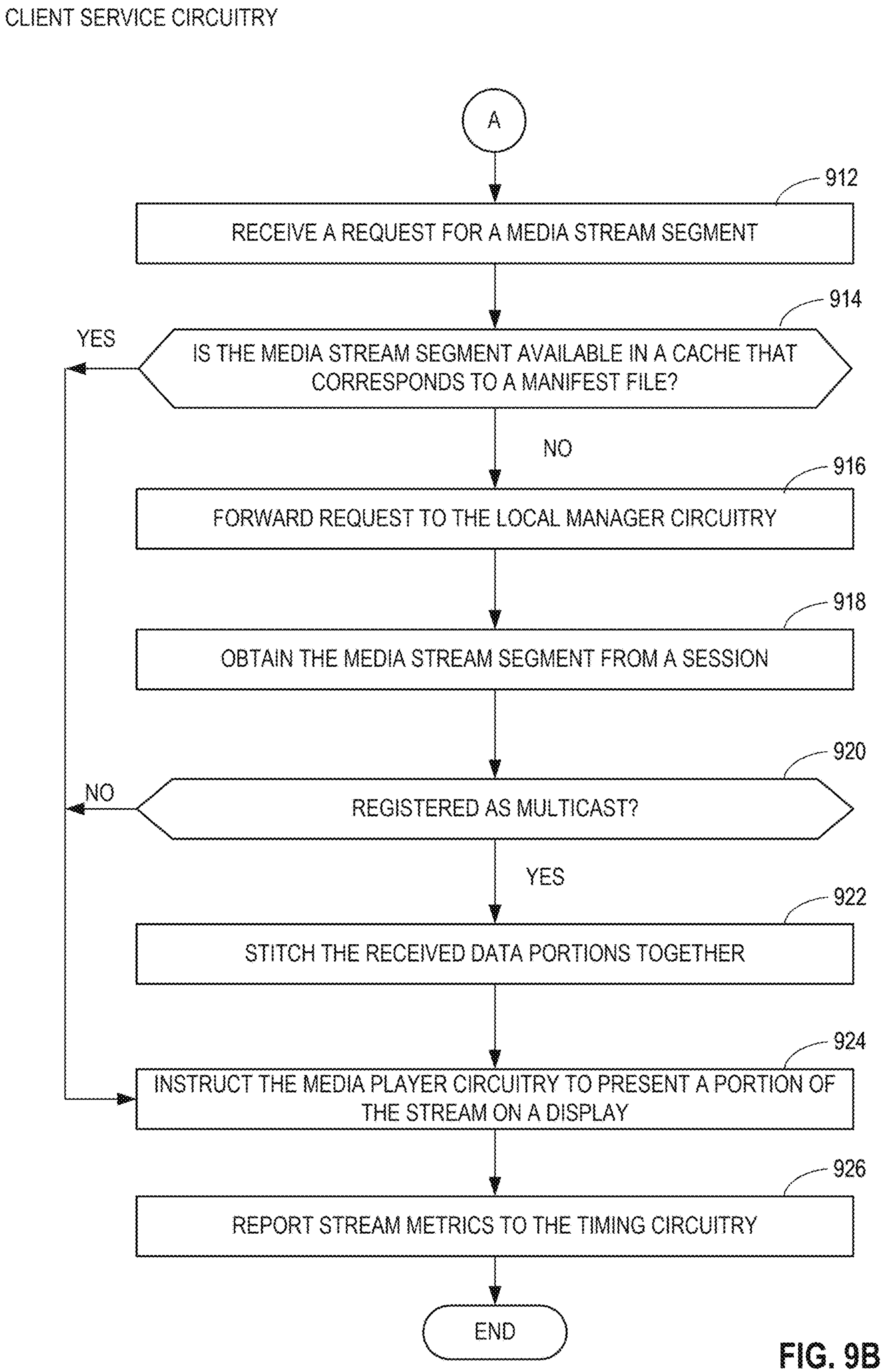

FIG. 9A-9B are flowcharts representative of example machine-readable instructions and/or example operations 900 that may be executed, instantiated, and/or performed by programmable circuitry to implement the client service circuitry 302 within one of the client devices 204. While the examples of FIGS. 9A-12 are described with reference to the smart device 204C, the machine-readable instructions and/or operations described in examples herein may be implemented by any of the client devices 204. Similarly, while the examples of FIGS. 9A-12 refer only to HLS, UDP, or QAM as options for streaming media, the machine-readable instructions and/or operations described in examples herein may apply to other unicast or multicast protocols supported by a streaming environment.

The example flowchart of FIG. 9A begins when the client service circuitry 302 identifies the orchestrator circuitry 308 using broadcast data. (Block 902). In the examples described above, the broadcast data is a configuration message that provides one or more addresses, roles, authorization, or encryption data structures associated with the orchestrator circuitry 308. In other examples, the broadcast data includes different types of information used to identify the orchestrator circuitry 308. The client service circuitry 302 may obtain the broadcast data over the local network 210 or global network 104 using any suitable broadcast communication protocol.

The client service circuitry 302 transmits registration information to the orchestrator circuitry 308. (Block 904). The registration information includes whether the smart device 204C supports stream delivery using HLS over unicast, UDP over multicast, or QAM over multicast. In some examples, the registration information additionally includes one or more addresses, roles, authorization, or encryption data structures associated with the smart device 204C.

The client service circuitry 302 receives EPG data from the orchestrator circuitry 308. (Block 906). The EPG data includes a list of media streams accessible by the smart device 204C and corresponding metadata including but not limited to the examples provided above. In some examples, the EPG data received at block 906 is a filtered version of a larger set of EPG data that is obtainable by the orchestrator circuitry 308.

If the smart device 204C registered at block 904 as supporting only HLS (Block 908: Yes), the client service circuitry 302 requests and subsequently receives a manifest file from the proxy 602. (Block 910). In such examples, the received manifest file is edited to only include one video resolution and one audio resolution, thereby preventing the client service circuitry 302 from performing ABR. The manifest file corresponds to a selection of content by a user and corresponds to a particular session 310A that provides media streams of said content.

After block 910, or if the smart device 204C registered at block 904 as supporting one of the unicast protocols (Block 908: No), control proceeds to FIG. 9B where the client service circuitry 302 receives a request for a media stream segment. (Block 912). The media stream segment is generated by the media player circuitry 304 and refers to a specific portion of a media stream (e.g., data that corresponds to six continuous seconds of video).

The client service circuitry 302 determines whether the requested media stream segment is available in a cache that corresponds to a manifest file. (Block 914). In some examples, client devices 204 that support HLS include a corresponding cache to store media stream segments. In such examples, a client device may receive a media stream segment and store it in the cache without submitting a request for the media stream segment. Such use cases are described further in connection with block 1116 of FIG. 11A.

If the smart device 204C already has the media segment available in a cache that corresponds to a manifest file (Block 914: Yes), control proceeds to block 924. Alternatively, if the media segment is not stored in the cache or if the smart device 204C is not registered using HLS (Block 914: No), the client service circuitry 302 forwards the request for the media stream segment to the local manager circuitry 202. (Block 916). If the smart device 204C is registered with HLS, the client service circuitry 302 uses the manifest file to request the media stream segment at the pre-determined video and audio resolution. If the smart device 204C is instead registered with UDP or QAM, the smart device 204C uses a different technique to request the media stream segment.

The client service circuitry 302 obtains the media stream segment from a session 310A. (Block 918). The obtained media segment of block 918 is formatted using the communication protocol identified in block 904 because the session 310A used said protocol for transmission. Thus, if the smart device 204C is registered as supporting one of the multicast protocols (Block 920: Yes), the media segment arrives at the smart device 204C as a series of data portions. In such examples, the client service circuitry 302 stitches the received data portions together to form the media stream segment. (Block 922). Advantageously, the individual data portions are formatted in a manner that avoids sending duplicated data over the local network 210 and enables stitching with as little information as possible. Accordingly, the client service circuitry 302 executes block 922 with a stitching technique that is based on the format of the individual data portions. If the smart device 204C is registered as supporting only HLS (Block 920: No), such stitching is not necessary because the requested media segment arrives in a single HTTP response.

After execution of block 924, or if the smart device 204C is registered as supporting only HLS (Block 920: No), or if the media stream segment was already stored in the smart device 204C when the media player circuitry 304 requested the media segment (Block 914: Yes), the client service circuitry 302 instructs the media player circuitry 304 to present a portion of the media stream on a display. (Block 924). In some examples, the client service circuitry 302 implements blocks 912-922 multiple times before implementing block 924 in order to queue a threshold number of media stream segments and avoid buffering. Similarly, the client service circuitry 302 may iteratively implement blocks 912-922 in parallel with execution of blocks 924 and/or 926.

The client service circuitry 302 reports stream metrics to the timing circuitry 314 within the local manager circuitry 202. (Block 926). Stream metrics may refer to any data that characterizes the network utilization associated with blocks 912-918. Such metrics include but are not limited to a description of whether any requests for media streams have failed, the number of media stream segments that have been received, etc. as described above. In some examples, the media player circuitry 304 also reports stream metrics during block 926.

The machine-readable instructions and/or operations 900 end after block 926 in the example of FIG. 9A-9B. In other examples, the client service circuitry 302 continues implementing one or more of blocks 906-926 until a user decides to stop watching media on the smart device 204C.

FIG. 10A-10D are flowcharts representative of example machine-readable instructions and/or example operations that may be executed, instantiated, and/or performed by example orchestrator circuitry 308 to implement the client service circuitry of FIG. 3. A given flowchart within the examples of FIG. 10A-10D represent a set of machine-readable instructions and/or operations that may be implemented in parallel with other sets of machine-readable instructions and/or operations. Accordingly, the orchestrator circuitry 308 may implement one or more of FIGS. 10A, 10B, 10C, and 10D concurrently with one another.

Figure 10A:
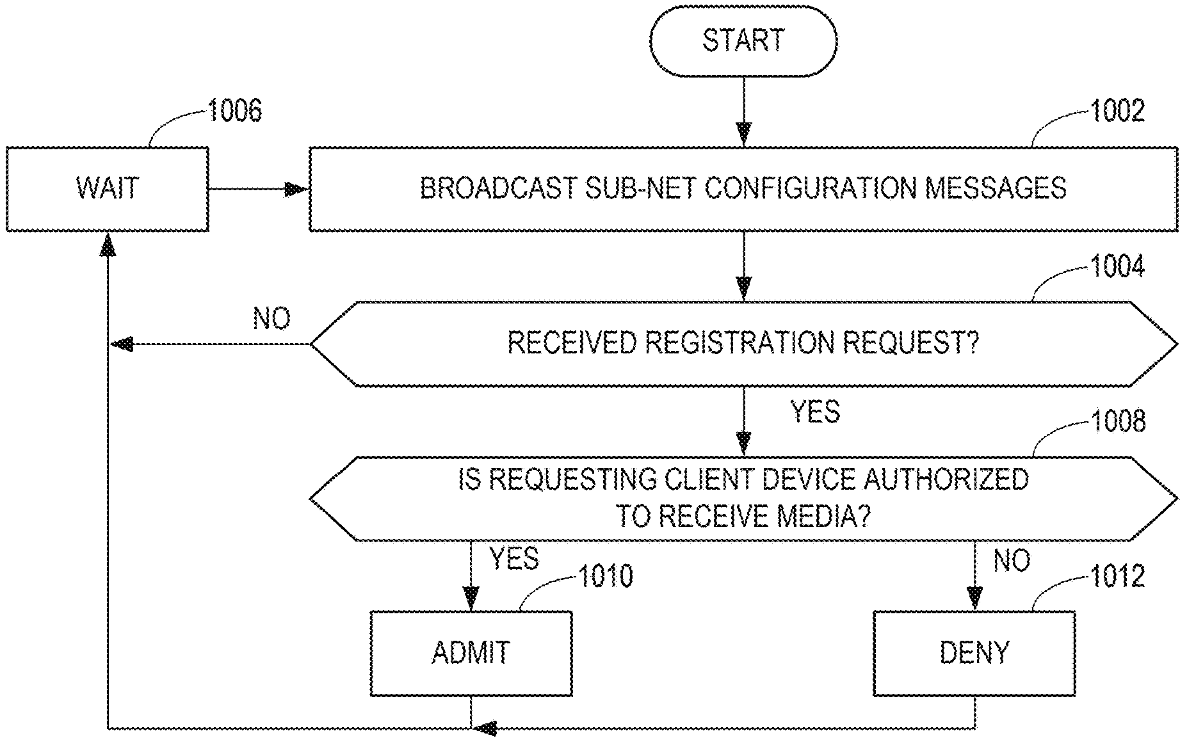
FIG. 10A-10D are flowcharts representative of example machine-readable instructions and/or example operations that may be executed, instantiated, and/or performed by example orchestrator circuitry to implement the client service circuitry of FIG. 3.

In the example of FIG. 10A, the registration circuitry 402 broadcasts configuration messages. (Block 1002). The broadcasts contain data that enables new client devices 204 that join the streaming environment 110A to self-register as described above.

The registration circuitry 402 determines whether it has received a registration request. (Block 1004). If the registration circuitry 402 has not received a registration request (Block 1004: No), the registration circuitry 402 waits an amount of time (Block 1006) before re-executing block 1002.

If a registration request has been received (Block 1004: Yes), the registration circuitry 402 determines whether the requesting client device, e.g., smart device 204C, is authorized to receive media. (Block 1008). The registration circuitry 402 may perform any suitable combination of handshake, authentication, or encryption operations to perform the determination of block 1008.

If the smart device 204C is authorized to receive media (Block 1008: Yes), the registration circuitry 402 admits the smart device 204C to a list of trusted devices. (Block 1010). In the example of FIG. 10, admission onto the list of trusted devices enables the other components of the local manager circuitry 202 to communicate with the smart device 204C. The registration circuitry 402 also stores the registration information in a memory of the local manager circuitry 202 at block 1010. Control returns to block 1006 after block 1010.

Alternatively, if the smart device 204C is not authorized to receive media (Block 1008: No), the registration circuitry 402 denies the smart device 204C from the list of trusted devices. (Block 1012). In such examples the smart device 204C does not participate in any operations described in FIGS. 9A-12 that occur after block 1012. Such excluded operations include the requesting or presenting media stream data as described above in connection with FIG. 9. Control returns to block 1006 after block 1010.

Figure 10B:
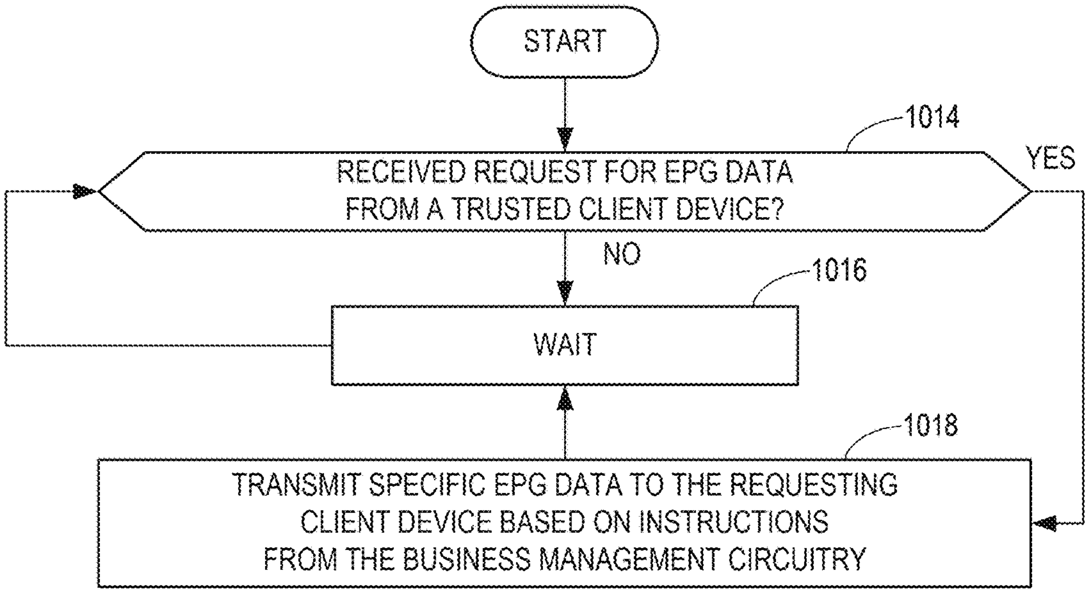

Within the example of FIG. 10B, and optionally in parallel with the execution of FIG. 10A, the CPM circuitry 408 determines whether the orchestrator circuitry 308 has received a request for EPG data from a trusted client device. (Block 1014). As used herein, a trusted client device refers to any device that has been successfully admitted at block 1010.

If a request for EPG data from a trusted client device has not been received (Block 1014: No), the CPM circuitry 408 waits for an amount of time (Block 1016) before re-executing block 1014. Alternatively, if a request for EPG data has been receive from a trusted client device (Block 1014: Yes), the CPM circuitry 408 transmits specific EPG data to the requesting client device based on instructions from the business management circuitry 106. (Block 1018). The filtering operations of block 1018 allow the managing organization of the hotel chain to use the business logic 810A to determine which media streams are accessible by the smart device 204C. For example, the managing organization may use the business logic 810A to apply content restrictions on the smart device 204C because the smart device 204C is in a hotel room frequently used by families. More generally, managing organizations can use business logic 810 to enforce any type of filtering operations at block 1018 for any commercial, logistical, financial, or other reason. Control returns to block 1016 once the operations of block 1018 are completed.

In some examples, the EPG data available for transmission at block 1018 changes over time based on updates performed by the CPM circuitry 408 on a periodic basis. In such examples, the update period of the CPM circuitry 408 is separate and independent of the wait period of block 1016. Thus, the CPM circuitry 408 responds to a request at block 1014 in substantially real time by providing the client device 204 with any EPG data that is both available at the time and authorized for transmission by the managing organization.

When the smart device 204C wishes to join a session 310A (e.g., tunes to a specific channel), the smart device 204C issues a request for a manifest file directly to the session 310A (via the local network 210). However, if the request is issued to a session that does not currently exist, the communication broker circuitry 312 receives the request instead and forwards it to the session manager circuitry 406. Thus, within the example of FIG. 10C, and optionally in parallel with the execution of one or more of FIGS. 10A and 10B, the session manager circuitry 406 determines whether the orchestrator circuitry 308 has received a request corresponding to a session that does not currently exist. (Block 1020).

If the orchestrator circuitry has received a request for a non-existent session (Block 1020: Yes), the session manager circuitry 406 opens a new session. (Block 1022). Such opening operations may include but are not limited to executing a function call to instantiate new instance of a session, e.g., a 'session' object in Object Oriented Design programming. In some examples, the session manager circuitry 406 additionally waits for the session to initialize, then provides the session with initial configuration data to assign the session to a particular media title. The session manager circuitry 406 then forwards the request to the new session (Block 1024). Control returns to block 1020 after block 1024. Alternatively, if the session manager circuitry 406 has not received a request for a non-existent session (Block 1020: No), the session manager circuitry 406 waits an amount of time (Block 1026) before re-executing block 1020.

Figure 10C:
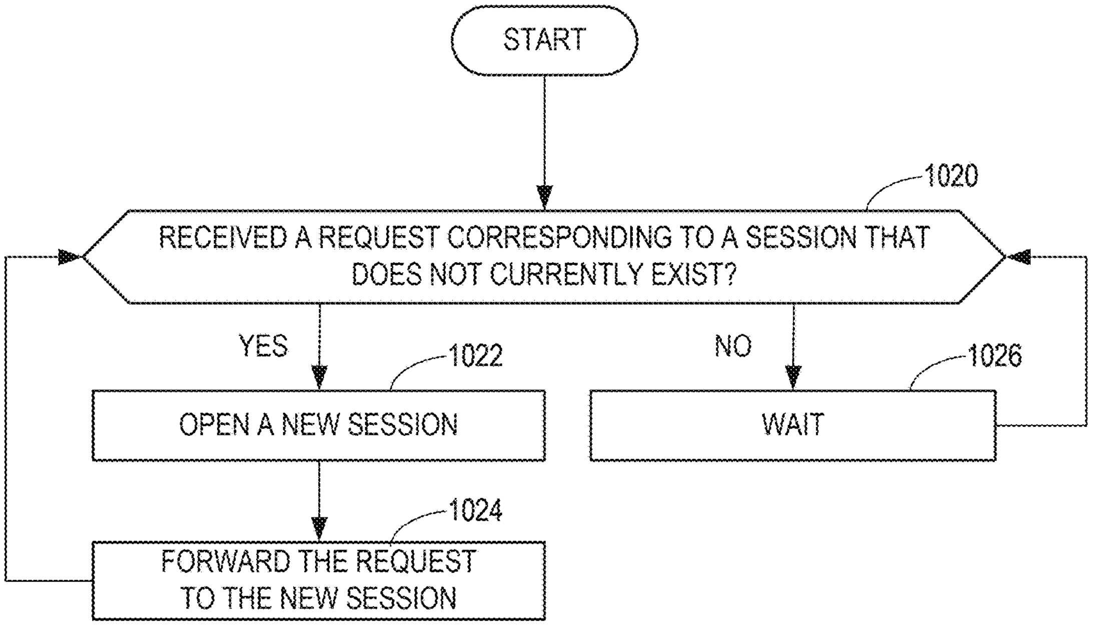

The example flowchart of FIG. 10C describes how the orchestrator circuitry 308 creates a session 310C on-demand based on a request for a manifest file from a device that has self-registered as supporting HLS. In examples where the smart device 204C instead self-registers as supporting one of the multicast protocols, the orchestrator circuitry 308 creates a session 310C on-demand based on a request that the smart device 204C transmits using the back-channel communication described above in connection with FIG. 2.

Figure 10D:
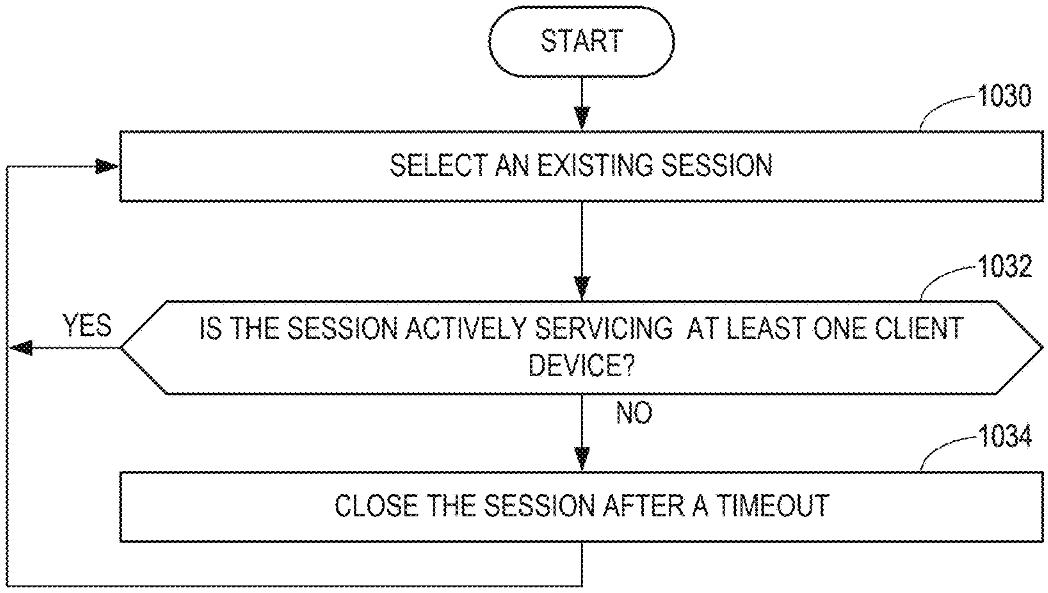

Within the example of FIG. 10D, and optionally in parallel with the execution of one or more of FIG. 10A-10C, the session manager circuitry 406 selects an existing session. (Block 1030). The session manager circuitry 406 then determines whether the session is actively servicing at least one client device. (Block 1032). A session is actively servicing a client device if it is providing stream data to a client device using any suitable technique, e.g., HLS, QAM, UDP, etc.

If the session is actively servicing at least one client device (Block 1032: Yes), control returns to block 1030 where the session manager circuitry 406 selects another existing session. Alternatively, if the session is not actively servicing at least one client device (Block 1032: No), the session manager circuitry 406 closes the session after a timeout period. (Block 1034). Control then returns to block 1030 after block 1034.

FIG. 11A-11E are flowcharts representative of example machine-readable instructions and/or example operations that may be executed, instantiated, and/or performed by local manager circuitry 202 to implement the session of FIG. 3. In FIG. 3A, the machine-readable instructions and/or operations 1100 begin when proxy 602 determines whether it has received a request for a manifest file. (Block 1102). Such requests may be sent directly from the client devices 204 or may be forwarded to the session 310A by the session manager circuitry 406. If the session 310A has not received a request for a manifest file (Block 1102: No), the session 310 re-implements block 1102 after an amount of time.

Alternatively, if the session 310A has received a request for a manifest file (Block 1102: Yes), the proxy 602 obtains a primary manifest file. (Block 1104). As used herein, a primary manifest file refers to an original version of a manifest file that is unedited by the proxy 602 and obtained from a content provider 102 via the global network 104. In some examples, a primary manifest file provides ABR support by including data that corresponds to multiple video and/or audio resolutions.

The proxy 602 edits the primary manifest file to remove support for ABR. (Block 1106). In doing so, the proxy 602 assigns a specific audio and/or video resolution to the client device, e.g., the smart device 204C, that requested the manifest file. Block 1106 is discussed further in connection with FIG. 11C. In some examples, the proxy 602 additionally edits the primary manifest file to support DAI. (Block 1108).

The HTTP server 606 transmits the edited manifest file to the requesting client device. (Block 1110). In the examples described above, the edited manifest file is transmitted across the local network 210. In other examples, the edited manifest file is transmitted across the global network 104.

The proxy 602 receives a request for a media stream segment. (Block 1112). Because client devices 204 that self-register as only supporting HLS use manifest files to form such requests, block 1112 is implemented in chronologically after blocks 1102-1110 for such devices. However, in some examples, the proxy 602 may receive a request without having previously implemented blocks 1102-1110 because the client device transmitting the request self-registered as supporting a multicast protocol.

If the proxy 602 has not received a request for a media stream segment (Block 1112: No), control returns to block 1112 after a period of time so the proxy 602 can perform another check for requests. Alternatively, if the proxy 602 has received a request for a media stream segment (Block 1112: Yes), the proxy 602 obtains a media stream segment from the content provider indicated by the request. (Block 1114). In the example of FIG. 10, the proxy 602 uses HLS to communicate with the content provider at block 1114, regardless of which protocol the requesting device selected during self-registration. The use of HLS occurs because the global network 104 includes third-party devices not associated with the entities shown in FIG. 1, which therefore prevents transmission with less secure protocols such as UDP. In other examples, the proxy 602 uses a different protocol to communicate with content providers 102 over the network.

The proxy 602 proactively selects other client devices in the local network that are predicted to also request the same chunk. (Block 1116). The prediction technique used in block 1116 is described in U.S. Pat. No. 13,034,790, which is incorporated herein by reference in its entirety.

Figure 11A:
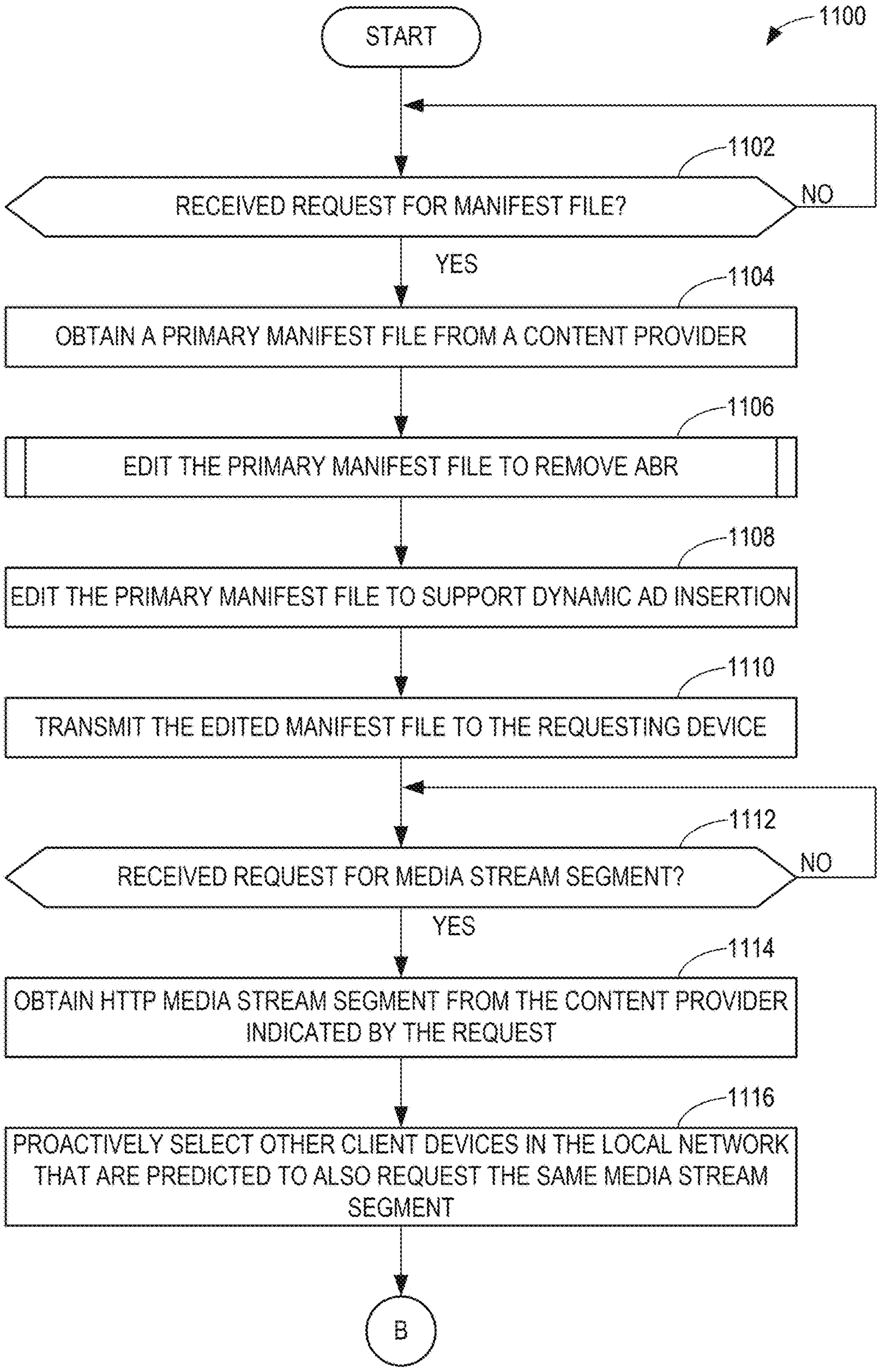
FIG. 11A-11E are flowcharts representative of example machine-readable instructions and/or example operations that may be executed, instantiated, and/or performed by local manager circuitry to implement the session of FIG. 3.
Figure 11B:
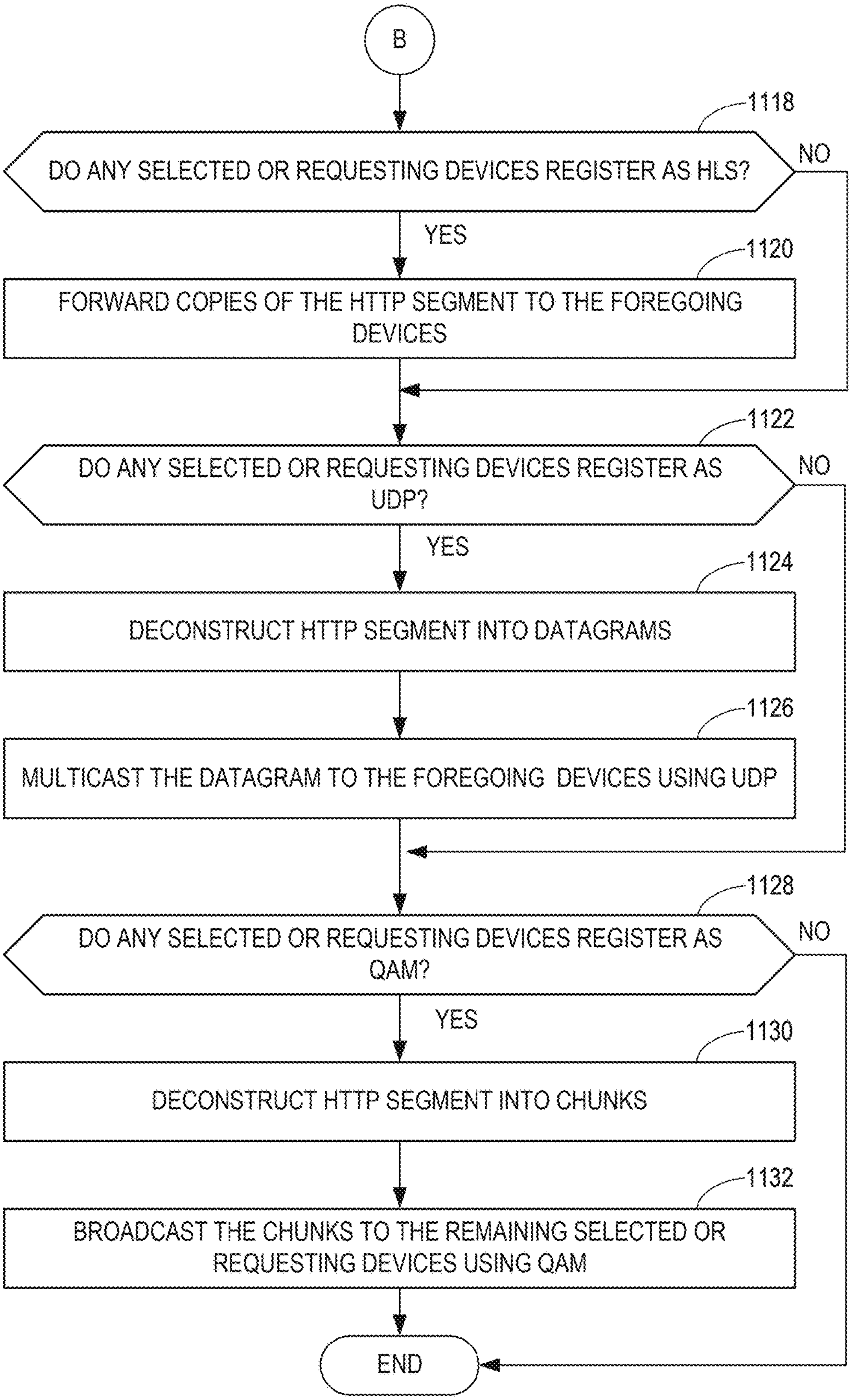

After implementation of block 1116, control flows to FIG. 11B where the proxy 602 determines whether any of the selected or requesting client devices 204 have self-registered as using HLS to receive media streams. (Block 1118). If one or more of the selected or requesting client devices 204 have self-registered as using HLS to receive media streams (Block 1118: Yes), the HTTP server 606 forwards copies of the HTTP segment to those devices. (Block 1120). The HTTP server 606 forwards the HTTP segments using HLS and unicast.

After block 1120, or if none of the selected or requesting client devices 204 have self-registered as using HLS (Block 1118: No), the proxy 602 determines whether any of the selected or requesting devices self-register using UDP. (Block 1122). If one or more of the selected or requesting client devices 204 have self-registered as using UDP to receive media streams (Block 1122: Yes), the multicast server 604 deconstructs the HTTP segment into datagrams. (Block 1124). Advantageously, the proxy 602 deconstructs the HTTP segment and formats the resulting datagrams in a manner that avoids sending duplicated data over the local network 210. The deconstruction of block 1124 also enables client service circuitry 302 to perform stitching at block 916 with as little information as possible. The multicast server 604 then multicasts the datagrams to the one or more selected or requesting devices that self-registered using UDP. (Block 1126).

After block 1126, or if none of the selected or requesting client devices 204 have self-registered as using UDP (Block 1122: No), the proxy 602 determines whether any of the selected or requesting devices self-register using QAM. (Block 1128). If one or more of the selected or requesting client devices 204 have self-registered as using QAM to receive media streams (Block 1128: Yes), the multicast server 604 deconstructs the HTTP segment into data chunks. (Block 1130). Like block 1124, the multicast server 604 deconstructs the HTTP segment and formats the resulting data chunks at block 1130 in a manner that avoids sending duplicated data over the local network 210. The multicast server 604 then multicasts the data chunks to the one or more selected or requesting devices that self-registered using QAM. (Block 1132). The machine-readable instructions and/or operations of FIGS. 11A and 11B end after block 1132 or if none of the selected or requesting client devices 204 have self-registered as using QAM (Block 1128: No).

Figure 11C:
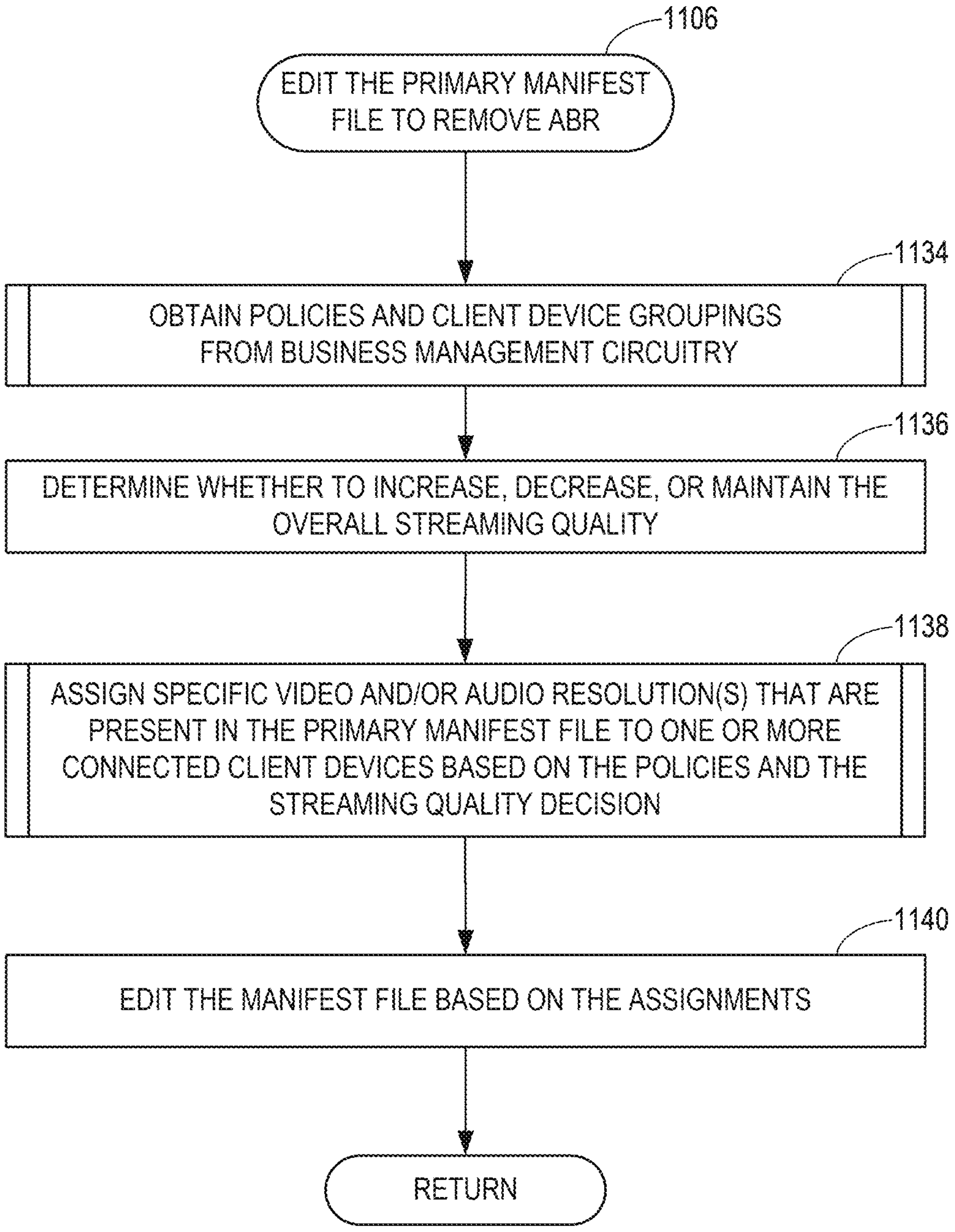

FIG. 11C is a flowchart representative of example machine-readable instructions and/or example operations that may be executed, instantiated, and/or performed by local manager circuitry 202 to edit the primary manifest file to remove Adaptive Bit Rate (ABR). In particular, FIG. 11C is an example implementation of block 1106 of FIG. 11A.

Execution of block 1106 begins when the proxy 602 obtains policies and client device groupings from the business management circuitry 106. (Block 1134). The groupings separate the client devices 204 of the streaming environment 110A into different categories so that various policies can be applied to some but not all of the devices. The policies describe which video and audio resolution are applied to a given group of client devices 204, which client devices change due to adverse network conditions, what resolutions those client devices should change to, etc. The policies and client groupings of block 1134 are described further in FIG. 11D.

The proxy 602 determines whether to increase, decrease, or maintain the overall streaming quality. (Block 1136). The proxy 602 may make the determination of block 1136 based on any number of factors, including but not limit to: a throughput of a connection between the local manager circuitry 202 and one or more of the content providers 102, a latency of the connection between the local manager circuitry 202 and one or more of the content providers 102, a total number of media streams being requested by the client devices 204, a total number of client devices 204 in the local network 210, a throughput of the local network 210, buffering statuses of the client devices 204 that are currently streaming, etc. The proxy 602 obtains one or more of the foregoing stream metric analysis parameters from the client devices 204 via the timing circuitry 314. Additionally or alternatively, the proxy 602 obtains one or more parameters used to make the determination of block 1136 form the business management circuitry 106. Such stream metric analysis parameters from the business management circuitry 106 include but are not limited to the maximum bandwidth 704.

The proxy 602 assigns specific video and/or audio resolution(s) that are present in the primary manifest file to one or more client devices 204 based on the policies from block 1134 and the streaming quality decision of block 1136. (Block 1138). The assignment operations performed in block 1138 are described further in connection with FIG. 11C.

The proxy 602 edits the manifest file based on the assignments. (Block 1140). To do so, the proxy 602 deletes video and audio resolution data that does not correspond to the assignments of block 1138, thereby removing the ability for the client devices 204 to perform ABR. (Block 1140). Control returns to block 1108 after block 1140.

In the example of FIG. 11C, the proxy determines whether to increase, decrease, or maintain the streaming quality (block 1136) in response to a request for a manifest file (block 1102 of FIG. 11A). In other examples, the proxy 602 determines whether to change or maintain streaming quality any number of times and for any reason (e.g., on a periodic basis, in response to a logical condition, etc.). In such examples, the proxy 602 then responds to a request for a manifest file based on the latest result of the determination to change or maintain streaming quality.

Figure 11D:
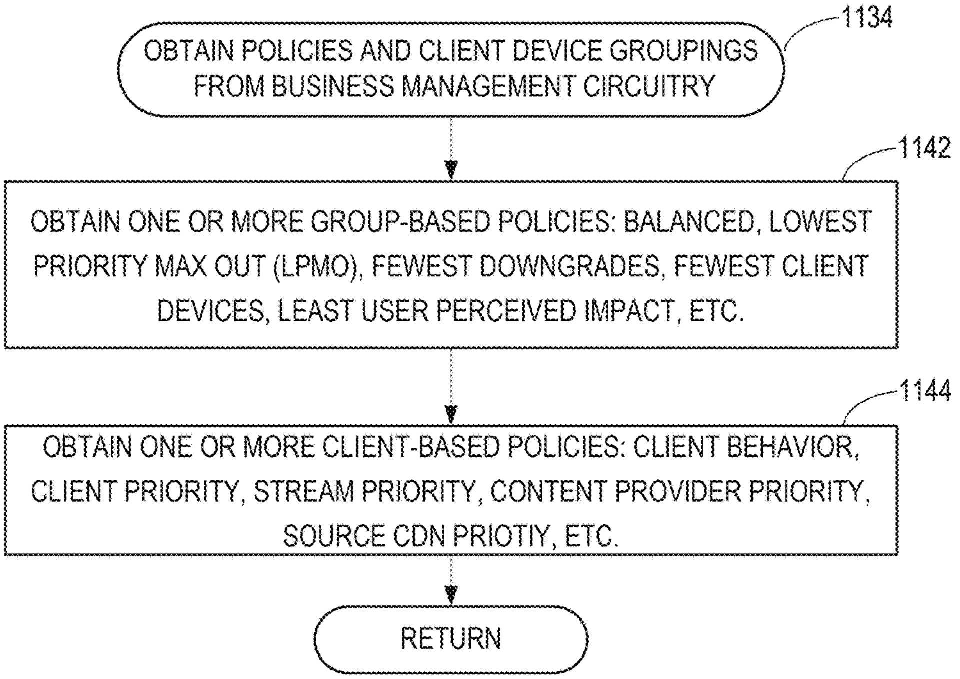

FIG. 11D is a flowchart representative of example machine-readable instructions and/or example operations that may be executed, instantiated, and/or performed by local manager circuitry 202 to obtain policies and client device groupings from the business management circuitry 106. In particular, FIG. 11D is an example implementation of block 1134 of FIG. 11C.

Execution of block 1134 begins when the proxy 602 obtains one or more group-based policies. (Block 1142). Such group-based policies include the balanced policy and the LPMO policy described above in connection with FIGS. 7B and 7C.

Another example of a group-based policy is the fewest downgrades policy. Under adverse network conditions, the proxy 602 applies the fewest downgrades policy by finding the smallest number of profile downgrades to make that would satisfy the current network conditions. As used above and herein, one profile downgrade refers to a single change in quality to the next level down, for a single client group. For example, assume there are ten available profiles that are indexed in order of stream quality: AP1 (highest), AP2, . . . AP10 (lowest). Assume further there are two client groups: CG1 that has a current profile AP1, and CG2 with current profile AP5. When the result of block 1136 is to lower the overall streaming quality, the proxy 602 determines that to satisfy the current conditions it would have to either lower the profile for CG2 from AP5 to AP8 or lower the profile for CG1 from AP1 to AP2. Under the fewest downgrades policy, the proxy 602 chooses to lower the profile for CG1 (1 level downgrade) instead of CG2 (3 levels downgrade).

Another example of a group-based policy is the fewest-client-devices policy. Under adverse network conditions, the proxy 602 applies the fewest-client-devices policy by downgrading client group streaming profiles om a manner that negatively affects a fewest number of the client devices 204. In effect, the fewest-client-devices policy replaces the priority-based ordering of client groups with an ordering based on the number of live clients in each group. As described further in FIG. 11D, the fewest-client-devices policy can be combined with other policies to determine the actual order in which client groups are affected.

Another example of a group-based policy is the least-user-perceived-impact policy. Under adverse network conditions, the proxy 602 applies the least-user-perceived-impact policy by downgrading the client group whose decrease in streaming quality minimizes the user perceived impact. The proxy 602 estimates the effect on user experience based on predefined technical and/or business criteria provided by the business management circuitry 106. For example, assume the following three profiles are available for a certain stream: AP1 has 4K video resolution, AP2 has 1080p video resolution, AP3 has 720p video resolution. Assume further there are two client groups: CG1 using AP1 and CG2 using AP2. Finally, assume the proxy 602 determines the perceived user impact score of a downgrade from 4K to 1080p is higher than the score for a downgrade from 1080p to 720p, (4K→1080p)>(1080p→720p). In this example, the proxy 602 will choose to downgrade CG2 from AP2 to AP3 instead of downgrading CG1 from AP1 to AP2.

The proxy 602 obtains one or more client-based policies from the business management circuitry 106. (Block 1144). To implement client-based policies, the proxy 602 makes changes to streaming quality at a client-device-level rather than a client-group-level. Thus, the proxy 602 may provide a first edited manifest file to a first client device and a second edited manifest file to a second client device, where the second edited manifest file also removes support for ABR but selects a different audio resolution and/or a different video resolution than a first edited manifest file.

One such policy obtained at block 1144 is the client-behavior policy. The proxy 602 applies the client-behavior policy by analyzing and scoring individual client behavior. The proxy 602 does so using predefined technical and/or business criteria provided by the business management circuitry 106. Under adverse network conditions, the proxy 602 applies the client-behavior policy by downgrading streaming profiles based on the computed score (either in isolation or in combination with other criteria as described further in FIG. 11D). For example, one type of client behavior that could be considered by the proxy 602 in the context of live television streaming is whether the client device is actively streaming a certain channel or is channel surfing (repeatedly changing channels/streams in short periods of time). Based on this behavior, the algorithm can decide to switch that client to a lower streaming profile until the behavior changes.

Another example of a client-based policy is the client-priority policy. The proxy 602 applies the client-priority policy based on a priority value assigned to each individual client device 204. In contrast, the proxy 602 applies the LPMO policy of FIG. 7B by using the priority values that apply to every client device in a client group. The proxy 602 can apply the client-priority policy either standalone (e.g., in deployments with a small number of clients such as restaurants or bars), or combined with other, more generic, policies. For example, the proxy 602 could apply a generic policy first that identifies one or more client groups for a change in streaming quality and then, for the client devices in the identified groups, apply a client priority-based policy to determine which clients to downgrade and in which order.

Another example of a client-based policy is the stream-priority policy. The proxy 602 applies the stream-priority policy based on a priority value assigned to the streams currently being viewed by the client devices 204. The proxy 602 may assign priorities to media streams based on a variety of technical or business criteria provided by the business management circuitry 106. For example, the proxy 602 may implement a technical criteria in which a movie channel has a higher priority than a cartoon channel because technically movie streams need more bandwidth than cartoon streams for the same perceived quality. As another example, the proxy 602 may implement business criteria in which a sports channel has a higher priority than a movie channel if the business or location is sports related.

Another example of a client-based policy is the content-provider-priority policy. The proxy 602 applies the content-provider-priority policy based on a priority assigned to the content providers 102 (as opposed to priority assigned to individual streams, client devices, or client groups). For example, if a certain deployment has access to streams from two different client providers 102A and 102B, under adverse network conditions the proxy 602 applies the content-provider-policy by lowering the quality of streams from content provider 102B before streams from content provider 102A.

The proxy 602 may assign priorities to content providers based on a variety of technical or business criteria provided by the business management circuitry 106. For example, the proxy 602 may apply business criteria in which a content provider offering sports channels has a higher priority than another provider offering general TV channels if the business or location is sports related. As another example, the proxy 602 may apply business criteria in which a third-party content provider contractually imposes that their content should always stream at the best quality supported by the network conditions. As another example, the proxy 602 may apply technical criteria in which the quality of media streams from a content provider 102A is lowered before a content provider 102B because the streams from the latter source bandwidth is lower, or the latency is higher, for the content provider 102A.

Another example of a client-based policy is the source-CDN-priority policy. The proxy 602 applies the source-CDN-priority policy by assigning priorities to individual delivery server devices or locations from where the content is streamed. A content provider may have multiple content server devices and use a load balancing algorithm to select a server device for delivering each stream. These content server devices could be spread across different outbound networks, different locations, different regions, different cloud providers, etc. The load balancing algorithm used by the content provider is configured based on their internal technical and business criteria and is under third party control. Consequently, streams provided from one content server device may work better (e.g., achieve higher throughput or lower latency) than streams provided from another content server device for a particular local network 210. The proxy 602 does not control the content provider's load balancing. However, by assigning different priorities to different sources, it can control how the streaming quality is influenced by the load balancer's choice. Control returns to block 1136 after block 1144.

Figure 11E:
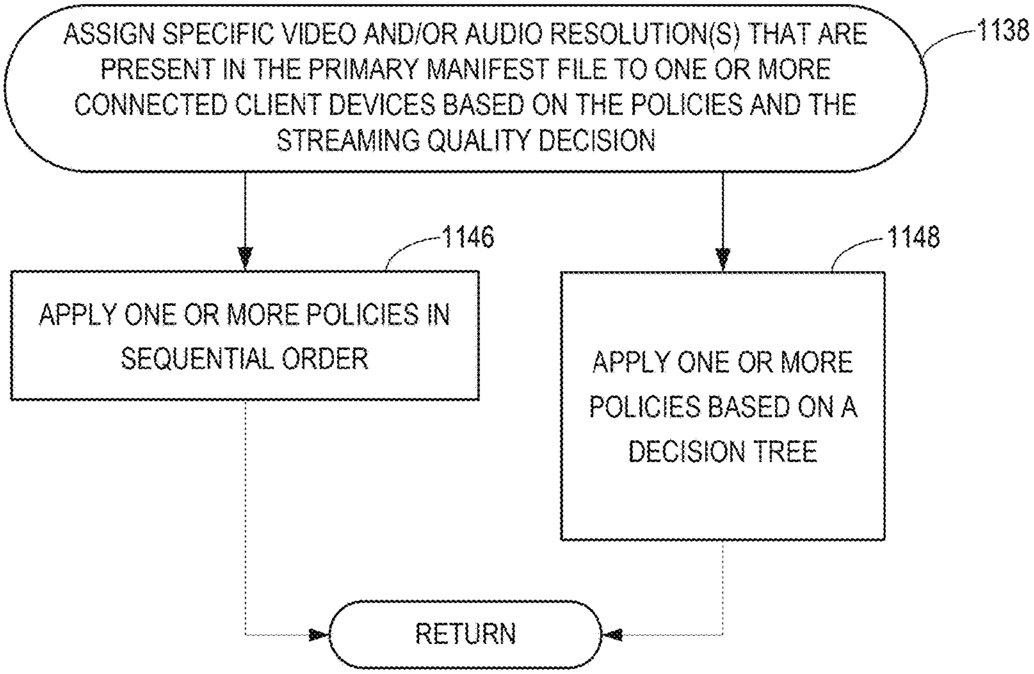

FIG. 11E is a flowchart representative of example machine-readable instructions and/or example operations that may be executed, instantiated, and/or performed by local manager circuitry 202 to assign specific stream profiles to client devices 204. In particular, FIG. 11E is an example implementation of block 1138 of FIG. 11C.

In some examples, the application of a singular group-based policy, leads to situations where either the proxy 602 is unable to select any client device or any client group for downgrade, or the proxy 602 cannot decide between multiple equally viable candidates for downgrade. Therefore, the proxy 602 may execute block 1138 by applying one or more policies in sequential order. (Block 1146). For example, the proxy 602 may begin by applying a group-based policy. Then, if the proxy 602 determines the group-based policy is completed but that further changes to stream quality are needed, the proxy 602 implements a second policy. The second policy may be another group-based policy or a client-based policy. The proxy 602 may apply any number of policies in sequential order at block 1146.

The proxy 602 may additionally or alternatively implement block 1138 by applying one or more policies based on a decision tree. A decision tree is a logical structure with leaf nodes that are policies and a root node that is a conditional statement, and intermediate nodes (if needed) that can be either policies or conditional statements. Thus, the proxy 602 can determine which policy to apply by evaluating the one or more relevant conditional statements. As an example, consider a simple decision tree with one root node, two leaf nodes, and no intermediate nodes. In this example, the conditional statement in the root node asks whether the number of client devices in a group is over 100. If the proxy 602 determines the client group currently being evaluated has over 100 client devices, the root node evaluates to TRUE and the proxy 602 applies a first policy. If instead the proxy 602 determines the client group has 100 or fewer client devices, the root node evaluates to FALSE and the proxy 602 applies a second, different policy.

A conditional statement can be based on any information that the local manager circuitry 202 has access to. Such information includes but is not limited to environment information (e.g. current network throughput or latency), client information (e.g. number or type of clients that are currently online), streaming information (e.g. what content and at what quality each client is currently streaming), timing information (e.g. time based rules that apply different policies based on the time of day), or any other generic information.

Decision trees can be as complex as necessary (e.g., with multiple intermediate nodes) provided the output of the policy tree allows the proxy 602 to determine which policy to apply. Thus, a conditional statement with only one sub-branch (e.g., the decision tree points to another node if the conditional statement evaluates to TRUE but calls for no further action if the conditional statement evaluates to FALSE) must have a policy above the conditional statement on the route from the root node. A decision tree may call for the application of one or more policies in sequential order as described in block 1146 by having two intermediate nodes adjacent to one another that both describe policies rather than conditional statements, by having a policy intermediate node adjacent to a leaf node, etc.

The foregoing examples refer to environments in which a given client device 204C is part of one and only one client group. However, in other examples, this restriction is relaxed and the business management circuitry 106 allows a single client device 204C to be part of multiple client groups. In such examples, the business management circuitry 106 can define policies that make decisions based on the client groups that certain clients are members of. When combined with decision trees, this practice allows the business management circuitry 106 more granular control over the client devices 204 and decisions of the local manager circuitry 202.

For example, presume the hotel 110B has the following client groups: Presidential_Suite=<Client A, Client B>, VIP_Rooms=<Client A, Client B, Client C, Client D, Client E, . . . >. In this example, the presidential suite is considered a VIP room but the managing organization wants to be able to handle the presidential suite differently than other VIP rooms if needed. Thus, client devices A and B are part of both the Presidential_Suite client group and the VIP_Rooms client group. The managing organization (via the business management circuitry 106) could then define a conditional statement that only applies to clients in the VIP_Rooms group that are not also in the Presidential_Suite group. Additionally or alternatively, a decision tree can be built that applies a certain policy to the VIP_Rooms group and then applies an additional policy just to the Presidential_Suite group.

More generally, the proxy 602 determines how to implement block 1146 and/or block 1148 based on instructions from the business management circuitry 106. For example, the instructions for implementing block 1146 and/or block 1148 are described in FIG. 7A as the policy application 710. This allows a managing organization to define and call for the execution of policies in an application-specific manner that best fits a particular streaming environment 110A. Control returns to block 1140 after block 1148.

Figure 12:
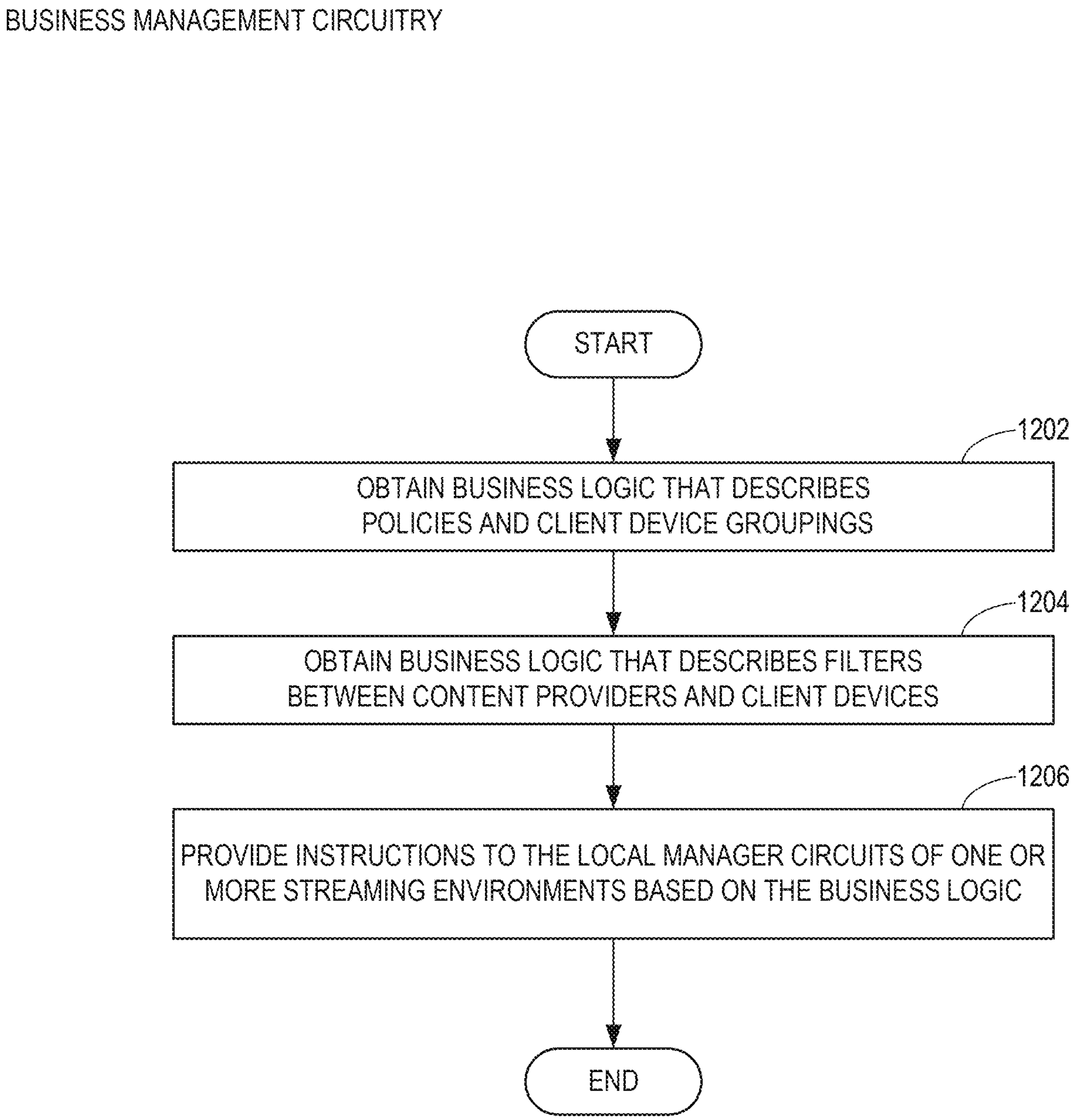
FIG. 12 is a flowchart representative of example machine-readable instructions and/or example operations that may be executed, instantiated, and/or performed to implement the business management circuitry of FIG. 1.

FIG. 12 is a flowchart representative of example machine-readable instructions and/or example operations that may be executed, instantiated, and/or performed to implement the business management circuitry 106 of FIG. 1. The machine-readable instructions and/or operations of FIG. 12 begin when the controller circuitry 804 obtains business logic 810A that describes ABR policies and client device groupings. (Block 1202). The controller circuitry 804 may obtain the business logic 810A from an employee via the user interface circuitry 806, from a remote employee via the network interface circuitry 802, or the business logic 810A may be pre-recorded in memory 808.

The controller circuitry 804 obtains business logic 810A that describes filters between the content providers 102 and the client devices 204. (Block 1204). The controller circuitry 804 may obtain the business logic 810A from an employee via the user interface circuitry 806, from a remote employee via the network interface circuitry 802, or the business logic 810A may be pre-recorded in memory 808.

The controller circuitry 804 provides, via the network interface circuitry 802, instructions to the local manager circuits 202 of one or more streaming environments 110 based on the business logic 810A. (Block 1206). In some examples, the business logic 810A applies to a single streaming environment 110A. In other examples, the business logic 810A applies to any number of streaming environments that are controlled by the same managing organization (e.g., the owner of the hotel chain). The machine-readable instructions and/or operations of FIG. 12 end after block 1206.

Figure 13:
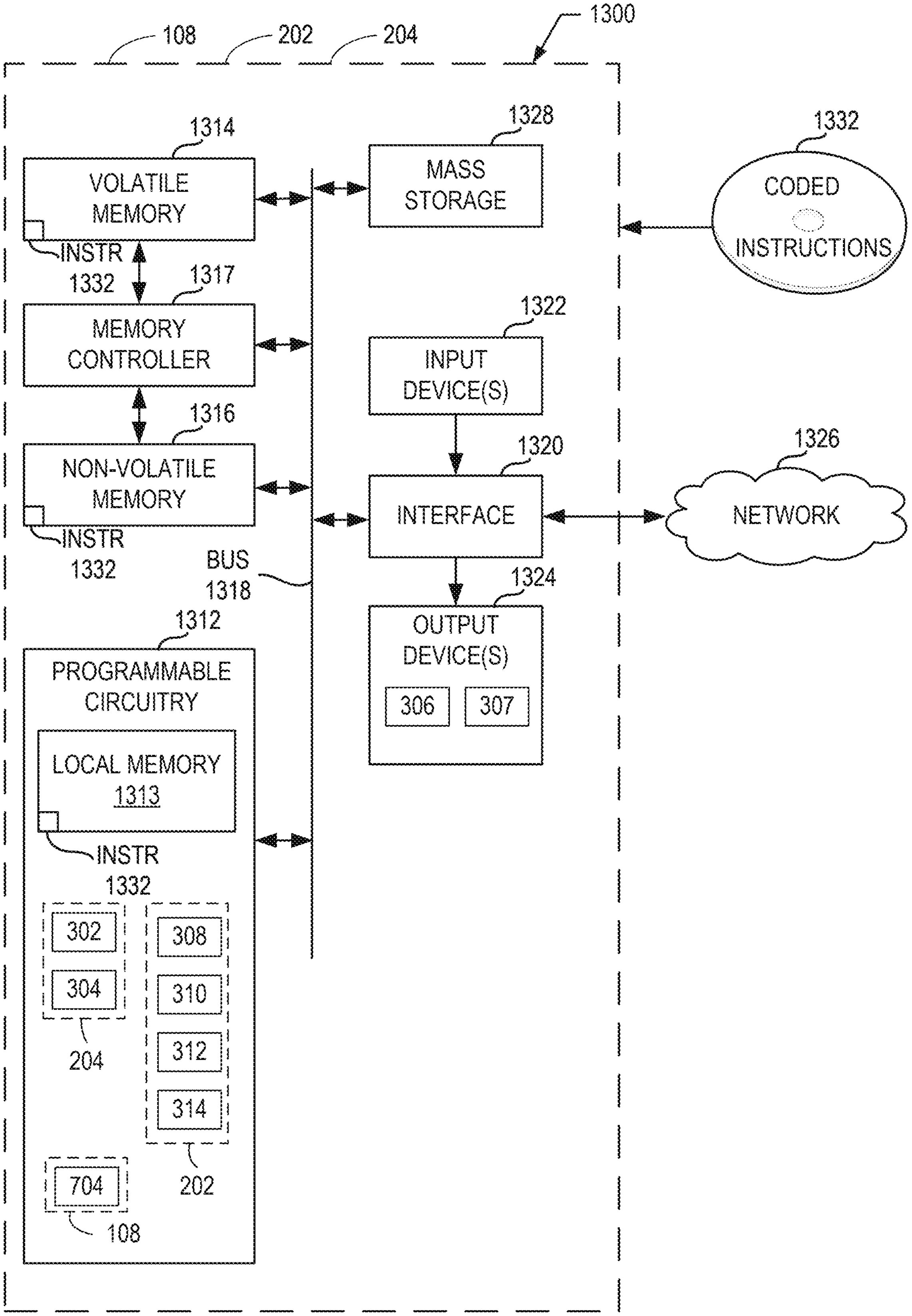
FIG. 13 is a block diagram of an example processing platform including programmable circuitry structured to execute, instantiate, and/or perform the example machine-readable instructions and/or perform the example operations of FIGS. 9A-12 to implement one or more of the business management circuitry 106, the local manager circuitry 202, or the client device 204 of FIGS. 1 and 2.

FIG. 13 is a block diagram of an example programmable circuitry platform 1300 structured to execute and/or instantiate the example machine-readable instructions and/or the example operations of FIGS. 9A-12 to implement one or more of the business management circuitry 106, the local manager circuitry 202, or the client device 204 of FIGS. 1 and 2. The programmable circuitry platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1300 of the illustrated example includes programmable circuitry 1312. The programmable circuitry 1312 of the illustrated example is hardware. For example, the programmable circuitry 1312 can be implemented by one or more integrated circuits, logic circuits, FPGAs, microprocessors, CPUs, GPUs, DSPs, and/or microcontrollers from any desired family or manufacturer. The programmable circuitry 1312 may be implemented by one or more semiconductor based (e.g., silicon based) devices. In this example, the programmable circuitry 1312 implements one or more of the client service circuitry 302, the media player circuitry 304, the orchestrator circuitry 308, the sessions 310, the timing circuitry 314, and the controller circuitry 804.

The programmable circuitry 1312 of the illustrated example includes a local memory 1313 (e.g., a cache, registers, etc.). The programmable circuitry 1312 of the illustrated example is in communication with main memory 1314, 1316, which includes a volatile memory 1314 and a non-volatile memory 1316, by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317. In some examples, the memory controller 1317 may be implemented by one or more integrated circuits, logic circuits, microcontrollers from any desired family or manufacturer, or any other type of circuitry to manage the flow of data going to and from the main memory 1314, 1316.

The programmable circuitry platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user (e.g., a human user, a machine user, etc.) to enter data and/or commands into the programmable circuitry 1312. The input device(s) 1322 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU. In this example, the output devices 1324 include the display 306 and the speakers 307.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1300 of the illustrated example also includes one or more mass storage discs or devices 1328 to store firmware, software, and/or data. Examples of such mass storage discs or devices 1328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1332, which may be implemented by the machine-readable instructions of FIGS. 9A-12, may be stored in the mass storage device 1328, in the volatile memory 1314, in the non-volatile memory 1316, and/or on at least one non-transitory computer readable storage medium such as a CD or DVD which may be removable.

Figure 14:
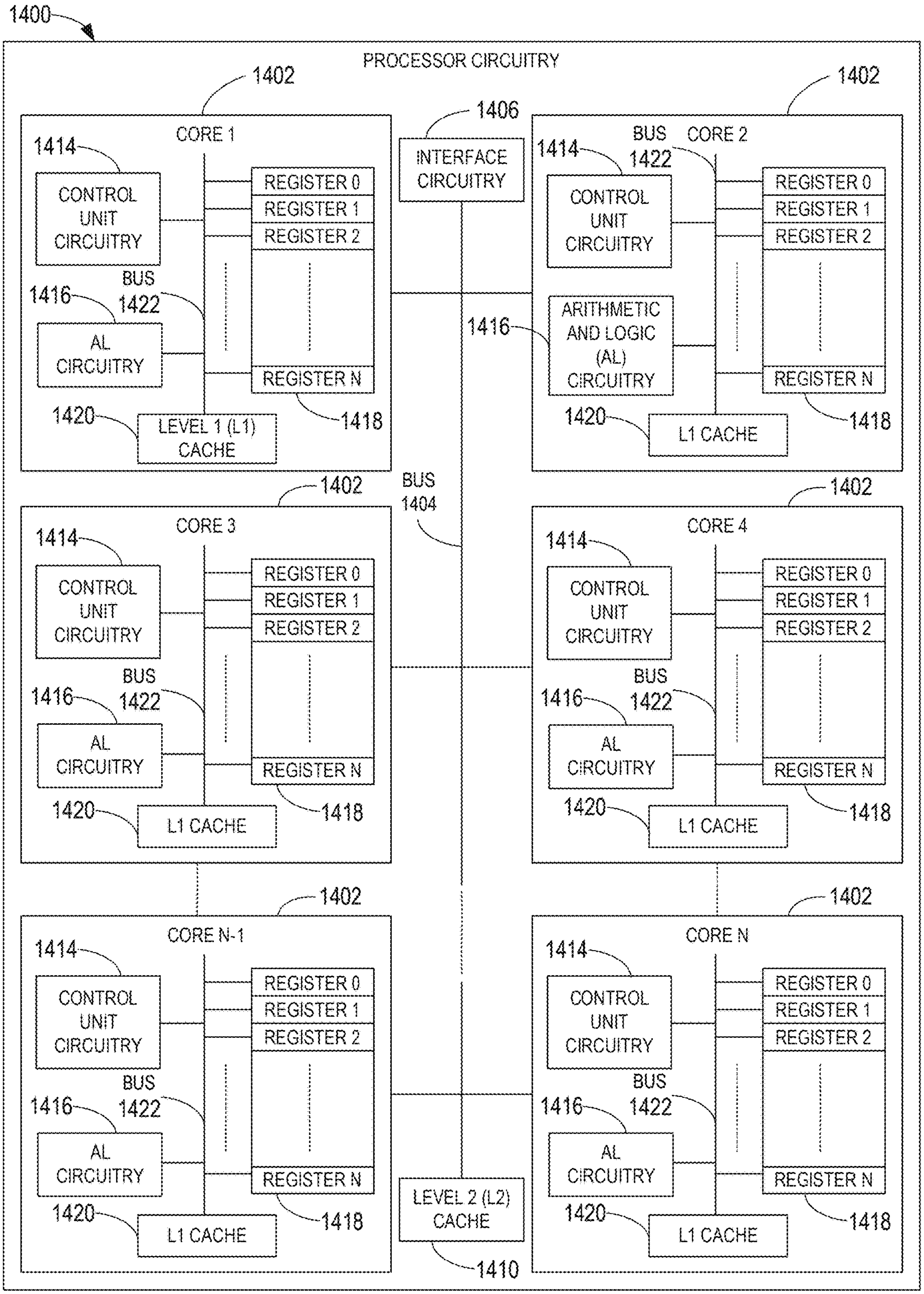
FIG. 14 is a block diagram of an example implementation of the programmable circuitry of FIG. 13.

FIG. 14 is a block diagram of an example implementation of the programmable circuitry 1312 of FIG. 13. In this example, the programmable circuitry 1312 of FIG. 13 is implemented by a microprocessor 1400. For example, the microprocessor 1400 may be a general-purpose microprocessor (e.g., general-purpose microprocessor circuitry). The microprocessor 1400 executes some or all of the machine-readable instructions of the flowcharts of FIGS. 9A-12 to effectively instantiate the circuitry of FIG. 2 as logic circuits to perform operations corresponding to those machine-readable instructions. In some such examples, the circuitry of FIGS. 1 and 2 is instantiated by the hardware circuits of the microprocessor 1400 in combination with the machine-readable instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine-readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine-readable instructions and/or operations represented by the flowcharts of FIGS. 9A-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer-based operations. In other examples, the AL circuitry 1416 also performs floating-point operations. In yet other examples, the AL circuitry 1416 may include first AL circuitry that performs integer-based operations and second AL circuitry that performs floating-point operations. In some examples, the AL circuitry 1416 may be referred to as an Arithmetic Logic Unit (ALU).

The registers 1418 are semiconductor-based structures to store data and/or instructions such as results of one or more of the operations performed by the AL circuitry 1416 of the corresponding core 1402. For example, the registers 1418 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure, such as by being distributed throughout the core 1402 to shorten access time. The second bus 1422 may be implemented by at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages.

The microprocessor 1400 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1400, in the same chip package as the microprocessor 1400 and/or in one or more separate packages from the microprocessor 1400.

Figure 15:
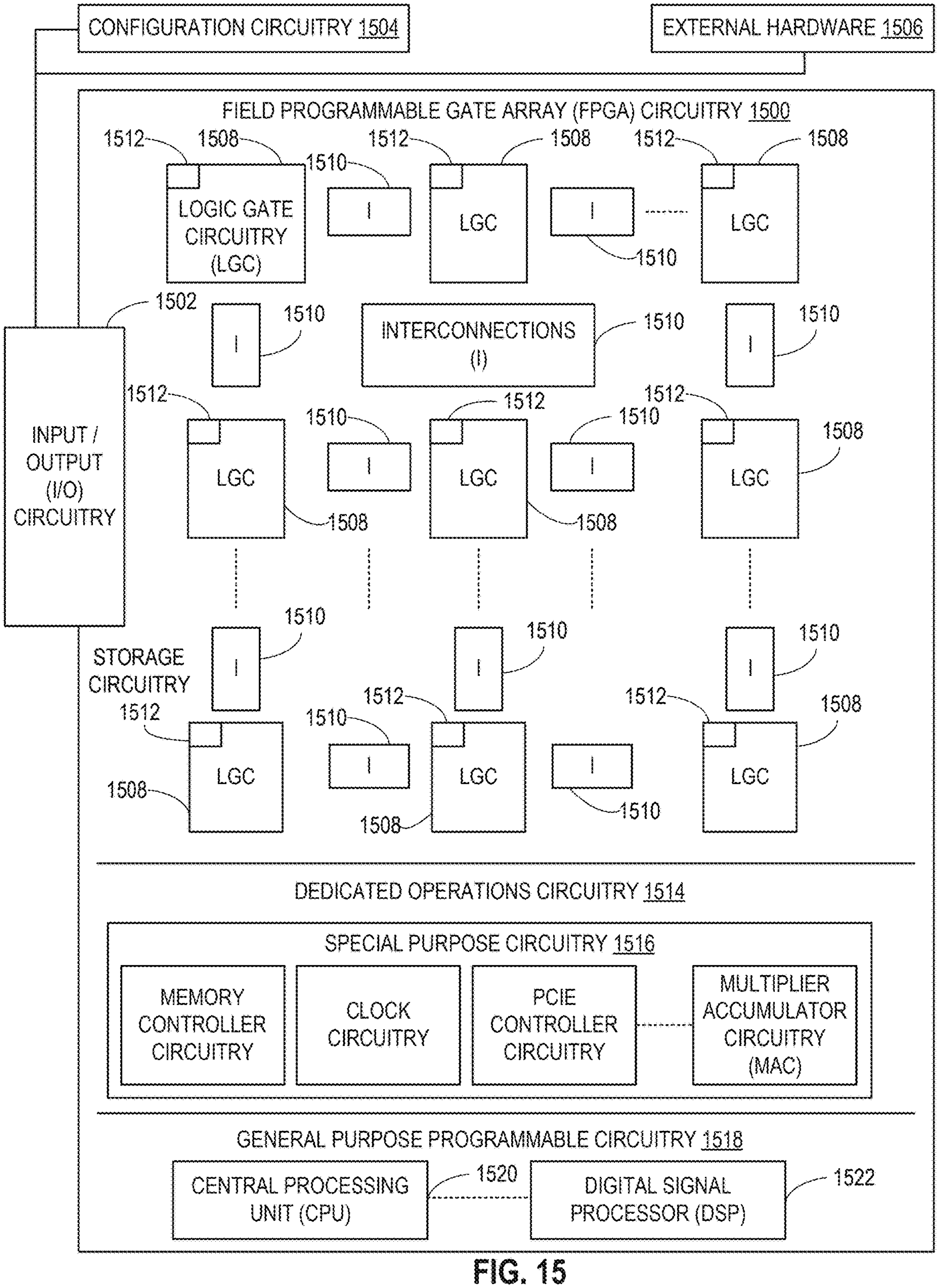
FIG. 15 is a block diagram of another example implementation of the programmable circuitry of FIG. 13.

FIG. 15 is a block diagram of another example implementation of the programmable circuitry 1312 of FIG. 13. In this example, the programmable circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine-readable instructions. However, once configured, the FPGA circuitry 1500 instantiates the operations and/or functions corresponding to the machine-readable instructions in hardware and, thus, can often execute the operations/functions faster than they could be performed by a general-purpose microprocessor executing the corresponding software.

More specifically, in contrast to the microprocessor 1400 of FIG. 14 described above (which is a general purpose device that may be programmed to execute some or all of the machine-readable instructions represented by the flowchart(s) of FIGS. 9A-12 but whose interconnections and logic circuitry are fixed once fabricated), the FPGA circuitry 1500 of the example of FIG. 15 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 9A-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 9A-12. As such, the FPGA circuitry 1500 may be configured and/or structured to effectively instantiate some or all of the operations/functions corresponding to the machine-readable instructions of the flowchart(s) of FIGS. 9A-12 as dedicated logic circuits to perform the operations/functions corresponding to those software instructions in a dedicated manner analogous to an ASIC. Therefore, the FPGA circuitry 1500 may perform the operations/functions corresponding to the some or all of the machine-readable instructions of FIGS. 9A-12 faster than the general-purpose microprocessor can execute the same.

In the example of FIG. 15, the FPGA circuitry 1500 is configured and/or structured in response to being programmed (and/or reprogrammed one or more times) based on a binary file. In some examples, the binary file may be compiled and/or generated based on instructions in a hardware description language (HDL) such as Lucid, Very High-Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain a binary file, which may be implemented by a bit stream, data, and/or machine-readable instructions, to configure the FPGA circuitry 1500, or portion(s) thereof. In some such examples, the configuration circuitry 1504 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1506 may be implemented by external hardware circuitry. For example, the external hardware 1506 may be implemented by the microprocessor 1400 of FIG. 14.

The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations/functions that may correspond to at least some of the machine-readable instructions of FIGS. 9A-12 and/or other desired operations. The logic gate circuitry 1508 shown in FIG. 15 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations/functions. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example dedicated operations circuitry 1514. In this example, the dedicated operations circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the programmable circuitry 1312 of FIG. 13, many other approaches are contemplated. For example, FPGA circuitry may include an on-board CPU, such as one or more of the example CPU 1520 of FIG. 14. Therefore, the programmable circuitry 1312 of FIG. 13 may additionally be implemented by combining at least the example microprocessor 1400 of FIG. 14 and the example FPGA circuitry 1500 of FIG. 15. In some such hybrid examples, one or more cores 1402 of FIG. 14 may execute a first portion of the machine-readable instructions represented by the flowchart (s) of FIGS. 9A-12 to perform first operation(s)/function(s), the FPGA circuitry 1500 of FIG. 15 may be configured and/or structured to perform second operation(s)/function(s) corresponding to a second portion of the machine-readable instructions represented by the flowcharts of FIGS. 9A-12, and/or an ASIC may be configured and/or structured to perform third operation(s)/function(s) corresponding to a third portion of the machine-readable instructions represented by the flowcharts of FIGS. 9A-12.

Some or all of the circuitry of FIGS. 1 and 2 may, thus, be instantiated at the same or different times. For example, same and/or different portion(s) of the microprocessor 1400 of FIG. 14 may be programmed to execute portion(s) of machine-readable instructions at the same and/or different times. In some examples, same and/or different portion(s) of the FPGA circuitry 1500 of FIG. 15 may be configured and/or structured to perform operations/functions corresponding to portion(s) of machine-readable instructions at the same and/or different times.

In some examples, some or all of the circuitry of FIGS. 1 and 2 may be instantiated, for example, in one or more threads executing concurrently and/or in series. For example, the microprocessor 1400 of FIG. 14 may execute machine-readable instructions in one or more threads executing concurrently and/or in series. In some examples, the FPGA circuitry 1500 of FIG. 15 may be configured and/or structured to carry out operations/functions concurrently and/or in series. Moreover, in some examples, some or all of the circuitry of FIGS. 1 and 2 may be implemented within one or more virtual machines and/or containers executing on the microprocessor 1400 of FIG. 14.

In some examples, the programmable circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the programmable circuitry 1312 of FIG. 13, which may be in one or more packages. For example, the XPU may include a CPU (e.g., the microprocessor 1400 of FIG. 14, the CPU 1520 of FIG. 15, etc.) in one package, a DSP (e.g., the DSP 1522 of FIG. 15) in another package, a GPU in yet another package, and an FPGA (e.g., the FPGA circuitry 1500 of FIG. 15) in still yet another package.

Figure 16:
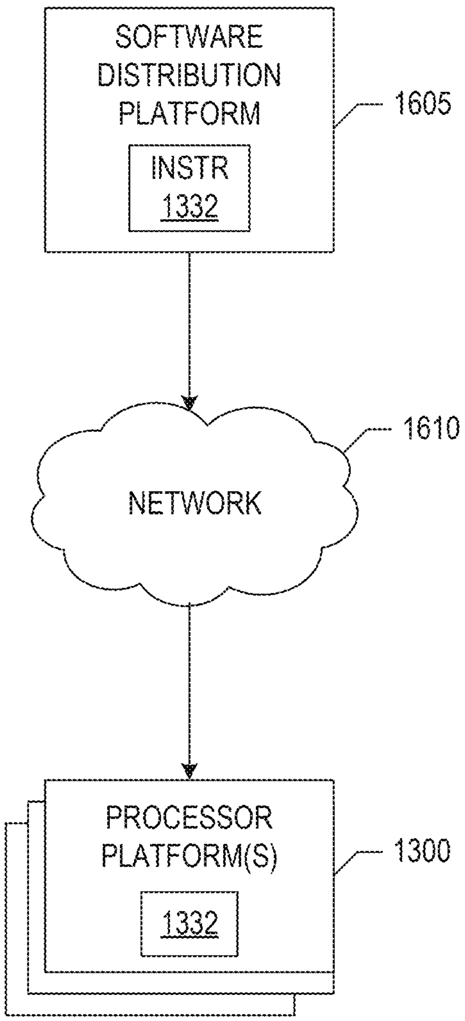
FIG. 16 is a block diagram of an example software/firmware/instructions distribution platform (e.g., one or more servers) to distribute software, instructions, and/or firmware (e.g., corresponding to the example machine-readable instructions of FIGS. 9A-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine-readable instructions 1332 of FIG. 13 to other hardware devices (e.g., hardware devices owned and/or operated by third parties from the owner and/or operator of the software distribution platform) is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine-readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine-readable instructions 1332, which may correspond to the example machine-readable instructions of FIGS. 9A-12, as described above. The one or more servers of the example software distribution platform 1605 are in communication with an example network 1610, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1332 from the software distribution platform 1605. For example, the software, which may correspond to the example machine-readable instructions of FIGS. 9A-12, may be downloaded to the example programmable circuitry platform 1300, which is to execute the machine-readable instructions 1332 to implement one or more of the business management circuitry 106, the local manager circuitry 202, or the client device 204. In some examples, one or more servers of the software distribution platform 1605 periodically offer, transmit, and/or force updates to the software (e.g., the example machine-readable instructions 1332 of FIG. 13) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−11% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that improve the quality of media streams in a streaming environment by performing local network operations based on global business logic. Disclosed systems, apparatus, articles of manufacture, and methods improve the efficiency of using a computing device by using business logic to: apply various policies and client device groupings to disable ABR, deconstruct and reformat HTTP segments into multicast data, and filtering Electronic Program Guide data to remove certain client devices from accessing media from certain content providers. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to manage media streams amongst local networks are disclosed herein. Further examples and combinations thereof include the following.

Example 1 includes an apparatus to manage media streams, the apparatus comprising interface circuitry, machine-readable instructions, and programmable circuitry to at least one of instantiate or execute the machine-readable instructions to obtain a request for a manifest file from one of a plurality of a client devices within a local network, obtain an original version of a manifest file that supports Adaptive Bit Rate (ABR) by including two or more audio resolutions and/or two or more video resolutions, select one of the audio resolutions and one of the video resolutions by applying one or more policies based on a determination whether to increase, decrease, or maintain an overall streaming quality of media within the local network, remove ABR support by editing the manifest file to remove any audio resolution or video resolution except those that were selected, and provide the edited manifest file to the requesting client device.

Example 2 includes the apparatus of example 1, wherein the request is a second request, the edited manifest file is a second edited manifest file, the programmable circuitry is to obtain instructions that a streaming quality of the requesting client device can vary, obtain a first request from the requesting client device before the second request, send a first edited manifest file to the requesting client device in response to the first request, and in response to the second request, select a video resolution and/or audio resolution for the second edited manifest file that is different than the selections in the first edited manifest file, wherein the difference is based on the determination whether to increase, decrease, or maintain an overall streaming quality of media within the local network.

Example 3 includes the apparatus of example 1, wherein the request is a second request, the edited manifest file is a second edited manifest file, the programmable circuitry is to obtain instructions that a streaming quality of the requesting client device is fixed, obtain a first request from the requesting client device before the second request, send a first edited manifest file to the requesting client device in response to the first request, and send a second edited manifest file in response to the second request, wherein the selected video resolution and the selected audio resolution is the same in both the first edited manifest file and the second edited manifest file regardless of the determination whether to increase, decrease, or maintain an overall streaming quality of media within the local network.

Example 4 includes the apparatus of example 1, wherein the programmable circuitry is to make the determination whether to increase, decrease, or maintain an overall streaming quality of media based one or more of a throughput of a connection between the apparatus and one or more content providers, a latency of the connection between the apparatus and one or more content providers, a total number of media streams being requested by the plurality of client devices, a total number of client devices in the local network, a throughput of the local network, or buffering statuses of the plurality of client devices.

Example 5 includes the apparatus of example 1, wherein the request is a first request, the edited manifest file is a first edited manifest file, the requesting client device is a first client device, and the programmable circuitry is to obtain a second request from a second client device in the local network, and provide a second edited manifest file to the second client device by applying the one or more policies, wherein the second edited manifest file also removes support for ABR but selects a different audio resolution and/or a different video resolution than the first edited manifest file.

Example 6 includes the apparatus of example 1, wherein the programmable circuitry is to organize the plurality of client devices into one or more groups of client devices, and determine to decrease the overall streaming quality of media within the local network, in response to the determination, apply the one or more policies to identify one or more of the groups of client devices, edit manifest files to decrease video resolutions and/or audio resolutions of each client device within the identified groups, and edit manifest files to maintain the selected video resolution and/or the selected audio resolution of each client device of the groups that were not identified by the one or more policies.

Example 7 includes the apparatus of example 6, wherein the one or more policies include a policy to change streaming quality based on a priority list, a first client device is higher on the priority list than a second client device, and in response to a determination to decrease the overall streaming quality of the local network, the programmable circuitry is to edit manifest files to decrease audio resolutions and/or video resolutions of the second client device before the first client device.

Example 8 includes the apparatus of example 7, wherein the programmable circuitry is to generate the priority list based on one or more of which media streams the client devices are requesting, which content providers the client devices are requesting media streams from, which Content Delivery Network (CDN) the client devices are requesting media stream from, or a role of a client device in the local network.

Example 9 includes the apparatus of example 6, wherein the programmable circuitry is to apply the one or more policies by, in response to a determination to decrease the overall streaming quality of the network, editing manifest files to decrease audio resolutions and/or video resolutions of one or more of the client devices in a manner that includes a fewest number of downgrades, negatively affects a fewest number of the client devices, or minimizes a user perceived impact.

Example 10 includes the apparatus of example 1, wherein the manifest file is a first manifest file, and the programmable circuitry is to decide to decrease the overall streaming quality of the local network, edit, after the decision, the first manifest file by applying a first of the one or more policies, evaluate a status of the local network after editing the first manifest files, decide, based on the status, to decrease the overall streaming quality of the local network further, and in response the decision to decrease the overall streaming quality further, edit a second manifest file by applying a second of the one or more policies.

Example 11 includes the apparatus of example 1, wherein the manifest file is a first manifest file, and the programmable circuitry is to edit the first manifest file by applying a first of the one or more policies, determine whether a logical condition is true or false, in response to a determination that the logical condition is true, edit a second manifest file by applying a second of the one or more policies, and in response to a determination that the logical condition is false, edit a third manifest file by applying a third of the one or more policies.

Example 12 includes the apparatus of example 11, wherein the programmable circuitry is to determine whether the logical condition is true or false based on one or more of environment information, client information, streaming information, or timing information.

Example 13 includes the apparatus of example 1, wherein the request is formatted using HyperText Transfer Protocol (HTTP) Live Streaming (HLS), and the programmable circuitry is to provide the edited manifest file to the requesting client device using HLS.

Example 14 includes a non-transitory machine-readable storage medium comprising instructions to cause programmable circuitry to at least obtain a request for a manifest file from one of a plurality of a client devices within a local network, obtain an original version of a manifest file that supports Adaptive Bit Rate (ABR) by including two or more audio resolutions and/or two or more video resolutions, select one of the audio resolutions and one of the video resolutions by applying one or more policies based on a determination whether to increase, decrease, or maintain an overall streaming quality of media within the local network, remove ABR support by editing the manifest file to remove any audio resolution or video resolution except those that were selected, and provide the edited manifest file to the requesting client device.

Example 15 includes the non-transitory machine-readable storage medium of example 14, wherein the request is a second request, the edited manifest file is a second edited manifest file, the programmable circuitry is to obtain instructions that a streaming quality of the requesting client device can vary, obtain a first request from the requesting client device before the second request, send a first edited manifest file to the requesting client device in response to the first request, and in response to the second request, select a video resolution and/or audio resolution for the second edited manifest file that is different than the selections in the first edited manifest file, wherein the difference is based on the determination whether to increase, decrease, or maintain an overall streaming quality of media within the local network.

Example 16 includes the non-transitory machine-readable storage medium of example 14, wherein the request is a second request, the edited manifest file is a second edited manifest file, the programmable circuitry is to obtain instructions that a streaming quality of the requesting client device is fixed, obtain a first request from the requesting client device before the second request, send a first edited manifest file to the requesting client device in response to the first request, and send a second edited manifest file in response to the second request, wherein the selected video resolution and the selected audio resolution is the same in both the first edited manifest file and the second edited manifest file regardless of the determination whether to increase, decrease, or maintain an overall streaming quality of media within the local network.

Example 17 includes the non-transitory machine-readable storage medium of example 14, wherein the programmable circuitry is to make the determination whether to increase, decrease, or maintain an overall streaming quality of media based one or more of a throughput of a connection between the programmable circuitry and one or more content providers, a latency of the connection between the programmable circuitry and one or more content providers, a total number of media streams being requested by the plurality of client devices, a total number of client devices in the local network, a throughput of the local network, or buffering statuses of the plurality of client devices.

Example 18 includes the non-transitory machine-readable storage medium of example 14, wherein the request is a first request, the edited manifest file is a first edited manifest file, the requesting client device is a first client device, and the programmable circuitry is to obtain a second request from a second client device in the local network, and provide a second edited manifest file to the second client device by applying the one or more policies, wherein the second edited manifest file also removes support for ABR but selects a different audio resolution and/or a different video resolution than the first edited manifest file.

Example 19 includes the non-transitory machine-readable storage medium of example 14, wherein the programmable circuitry is to organize the plurality of client devices into one or more groups of client devices, and determine to decrease the overall streaming quality of media within the local network, in response to the determination, apply the one or more policies to identify one or more of the groups of client devices, edit manifest files to decrease video resolutions and/or audio resolutions of each client device within the identified groups, and edit manifest files to maintain the selected video resolution and/or the selected audio resolution of each client device of the groups that were not identified by the one or more policies.

Example 20 includes the non-transitory machine-readable storage medium of example 19, wherein the one or more policies include a policy to change streaming quality based on a priority list, a first client device is higher on the priority list than a second client device, and in response to a determination to decrease the overall streaming quality of the local network, the programmable circuitry is to edit manifest files to decrease audio resolutions and/or video resolutions of the second client device before the first client device.

Example 21 includes the non-transitory machine-readable storage medium of example 20, wherein the programmable circuitry is to create the priority list based on one or more of which media streams the client devices are requesting, which content providers the client devices are requesting media streams from, which Content Delivery Network (CDN) the client devices are requesting media stream from, or a role of a client device in the local network.

Example 22 includes the non-transitory machine-readable storage medium of example 19, wherein the programmable circuitry is to, apply of the one or more policies by, in response to a determination to decrease the overall streaming quality of the network, editing manifest files to decrease audio resolutions and/or video resolutions of one or more of the client devices in a manner that includes a fewest number of downgrades, negatively affects a fewest number of the client devices, or minimizes a user perceived impact.

Example 23 includes the non-transitory machine-readable storage medium of example 14, wherein the manifest file is a first manifest file, and the programmable circuitry is to decide to decrease the overall streaming quality of the local network, edit, after the decision, the first manifest file by applying a first of the one or more policies, evaluate a status of the local network after editing the first manifest files, decide, based on the status, to decrease the overall streaming quality of the local network further, and in response the decision to decrease the overall streaming quality further, edit a second manifest file by applying a second of the one or more policies.

Example 24 includes the non-transitory machine-readable storage medium of example 14, wherein the manifest file is a first manifest file, and the programmable circuitry is to edit the first manifest file by applying a first of the one or more policies, determine whether a logical condition is true or false, in response to a determination that the logical condition is true, edit a second manifest file by applying a second of the one or more policies, and in response to a determination that the logical condition is false, edit a third manifest file by applying a third of the one or more policies.

Example 25 includes the non-transitory machine-readable storage medium of example 24, wherein the programmable circuitry is to determine whether the logical condition is true or false based on one or more of environment information, client information, streaming information, or timing information.

Example 26 includes the non-transitory machine-readable storage medium of example 14, wherein the request is formatted using HyperText Transfer Protocol (HTTP) Live Streaming (HLS), and the programmable circuitry is to provide the edited manifest file to the requesting client device using HLS.

Example 27 includes a method comprising obtaining a request for a manifest file from one of a plurality of a client devices within a local network, obtaining an original version of a manifest file that supports Adaptive Bit Rate (ABR) by including two or more audio resolutions and/or two or more video resolutions, selecting one of the audio resolutions and one of the video resolutions by applying one or more policies based on a determination whether to increase, decrease, or maintain an overall streaming quality of media within the local network, removing ABR support by editing the manifest file to remove any audio resolution or video resolution except those that were selected, and providing the edited manifest file to the requesting client device.

Example 28 includes the method of example 27, wherein the request is a second request, the edited manifest file is a second edited manifest file, the method further includes obtaining instructions that a streaming quality of the requesting client device can vary, obtaining a first request from the requesting client device before the second request, sending a first edited manifest file to the requesting client device in response to the first request, and in response to the second request, selecting a video resolution and/or audio resolution for the second edited manifest file that is different than the selections in the first edited manifest file, wherein the difference is based on the determination whether to increase, decrease, or maintain an overall streaming quality of media within the local network.

Example 29 includes the method of example 27, wherein the request is a second request, the edited manifest file is a second edited manifest file, the method further includes obtaining instructions that a streaming quality of the requesting client device is fixed, obtaining a first request from the requesting client device before the second request, sending a first edited manifest file to the requesting client device in response to the first request, and sending a second edited manifest file in response to the second request, wherein the selected video resolution and the selected audio resolution is the same in both the first edited manifest file and the second edited manifest file regardless of the determination whether to increase, decrease, or maintain an overall streaming quality of media within the local network.

Example 30 includes the method of example 27, further including making the determination whether to increase, decrease, or maintain an overall streaming quality of media based one or more of a throughput of a connection between a local manager device and one or more content providers, a latency of the connection between the local manager device and one or more content providers, a total number of media streams being requested by the plurality of client devices, a total number of client devices in the local network, a throughput of the local network, or buffering statuses of the plurality of client devices.

Example 31 includes the method of example 27, wherein the request is a first request, the edited manifest file is a first edited manifest file, the requesting client device is a first client device, and the method further includes obtaining a second request from a second client device in the local network, and providing a second edited manifest file to the second client device by applying the one or more policies, wherein the second edited manifest file also removes support for ABR but selects a different audio resolution and/or a different video resolution than the first edited manifest file.

Example 32 includes the method of example 27, further including organizing the plurality of client devices into one or more groups of client devices, and determining to decrease the overall streaming quality of media within the local network, in response to the determination, applying the one or more policies to identify one or more of the groups of client devices, editing manifest files to decrease video resolutions and/or audio resolutions of each client device within the identified groups, and editing manifest files to maintain the selected video resolution and/or the selected audio resolution of each client device of the groups that were not identified by the one or more policies.

Example 33 includes the method of example 32, wherein the one or more policies include a policy to change streaming quality based on a priority list, a first client device is higher on the priority list than a second client device, and in response to a determination to decrease the overall streaming quality of the local network, the method further includes editing manifest files to decrease audio resolutions and/or video resolutions of the second client device before the first client device.

Example 34 includes the method of example 33, further including generating the priority list based on one or more of which media streams the client devices are requesting, which content providers the client devices are requesting media streams from, which Content Delivery Network (CDN) the client devices are requesting media stream from, or a role of a client device in the local network.

Example 35 includes the method of example 32, further including applying the one or more policies by, in response to a determination to decrease the overall streaming quality of the network, editing manifest files to decrease audio resolutions and/or video resolutions of one or more of the client devices in a manner that includes a fewest number of downgrades, negatively affects a fewest number of the client devices, or minimizes a user perceived impact.

Example 36 includes the method of example 27, wherein the manifest file is a first manifest file, and the method further includes deciding to decrease the overall streaming quality of the local network, editing, after the decision, the first manifest file by applying a first of the one or more policies, evaluating a status of the local network after editing the first manifest files, deciding, based on the status, to decrease the overall streaming quality of the local network further, and in response the decision to decrease the overall streaming quality further, editing a second manifest file by applying a second of the one or more policies.

Example 37 includes the method of example 27, wherein the manifest file is a first manifest file, and the method further includes editing the first manifest file by applying a first of the one or more policies, determining whether a logical condition is true or false, in response to a determination that the logical condition is true, editing a second manifest file by applying a second of the one or more policies, and in response to a determination that the logical condition is false, editing a third manifest file by applying a third of the one or more policies.

Example 38 includes the method of example 37, further including determining whether the logical condition is true or false based on one or more of environment information, client information, streaming information, or timing information.

Example 39 includes the method of example 27, wherein the request is formatted using HyperText Transfer Protocol (HTTP) Live Streaming (HLS), and the method further includes providing the edited manifest file to the requesting client device using HLS.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to manage media streams, the apparatus comprising:
- interface circuitry;
- machine-readable instructions; and
- programmable circuitry to at least one of instantiate or execute the machine-readable instructions to:
  - obtain a request for a manifest file from a client device within a local network, the local network including a plurality of client devices;
  - obtain an original version of a manifest file that supports Adaptive Bit Rate (ABR), the manifest file identifying at least one of (a) two or more audio resolutions or (b) two or more video resolutions;
  - organize the plurality of client devices into one or more groups based on one or more policies, wherein a group is associated with a streaming quality profile defining an assigned audio resolution and an assigned video resolution;
  - determine whether to increase, decrease, or maintain an overall streaming quality of media based on a collective assessment of streaming activity of the plurality of client devices within the local network;
  - select one of the audio resolutions and one of the video resolutions for the client device based on the determination and the group to which the client device belongs, the selected audio resolution and the selected video resolution to correspond to the streaming quality profile associated with the group;
  - remove ABR support by editing the manifest file to remove any audio resolution or video resolution except those selected for the client device; and
  - provide the edited manifest file to the client device.

2. The apparatus of claim 1, wherein:
- the request is a second request;
- the edited manifest file is a second edited manifest file;
- the programmable circuitry is to:
  - obtain instructions that the group to which the client device belongs is a variable group such that a streaming quality of the client device can vary;
  - obtain a first request from the client device before the second request;
  - send a first edited manifest file to the client device in response to the first request; and
  - in response to the second request, select at least one of a video resolution or an audio resolution for the second edited manifest file that is different than the selections in the first edited manifest file, wherein the difference is based on the determination.

3. The apparatus of claim 1, wherein:
- the request is a second request;
- the edited manifest file is a second edited manifest file;
- the programmable circuitry is to:
  - obtain instructions that a streaming quality of the group to which the client device belongs is a fixed group such that the streaming quality of the client device is fixed;
  - obtain a first request from the client device before the second request;
  - send a first edited manifest file to the client device in response to the first request; and
  - send a second edited manifest file in response to the second request, wherein the selected video resolution and the selected audio resolution is the same in both the first edited manifest file and the second edited manifest file regardless of the determination.

4. The apparatus of claim 1, wherein the programmable circuitry is to make the determination based on one or more of:
- a throughput of a connection between the apparatus and one or more content providers;
- a latency of the connection between the apparatus and one or more content providers;
- a total number of media streams being requested within the local network;
- a total number of client devices in the local network;
- a throughput of the local network; or
- buffering statuses of the plurality of client devices.

5. The apparatus of claim 1, wherein:
- the request is a first request;
- the edited manifest file is a first edited manifest file;
- the client device is a first client device; and
- the programmable circuitry is to:
  - obtain a second request from a second client device in the local network, wherein the second client device belongs to a different group than the first client device; and
  - provide a second edited manifest file to the second client device, wherein the second edited manifest file also removes support for ABR but selects at least one of a different audio resolution or a different video resolution than the first edited manifest file.

6. The apparatus of claim 1, wherein:
- the programmable circuitry is to:
  - in response to the determination to decrease the overall streaming quality of media within the local network, apply the one or more policies to identify one or more of the groups;
  - edit manifest files to decrease at least one of video resolutions or audio resolutions of each client device within the identified groups; and
  - edit manifest files to maintain at least one of the selected video resolution or the selected audio resolution of each client device of the groups that were not identified by the one or more policies.

7. The apparatus of claim 6, wherein:
- the one or more policies include a policy to change streaming quality based on a priority list;
- a first client device is higher on the priority list than a second client device; and
- in response to a determination to decrease the overall streaming quality of the local network, the programmable circuitry is to edit manifest files to decrease at least one of audio resolutions or video resolutions of the second client device before the first client device.

8. The apparatus of claim 7, wherein the programmable circuitry is to generate the priority list based on one or more of: which media streams the client devices are requesting, which content providers the client devices are requesting media streams from, which Content Delivery Network (CDN) the client devices are requesting media stream from, or a role of a client device in the local network.

9. The apparatus of claim 6, wherein the programmable circuitry is to apply the one or more policies by, in response to a determination to decrease the overall streaming quality of the network, editing manifest files to at least one of decrease audio resolutions or video resolutions of one or more of the client devices in a manner that:

includes a fewest number of downgrades;

negatively affects a fewest number of the client devices; or minimizes a user perceived impact.

10. The apparatus of claim 1, wherein:

the manifest file is a first manifest file; and the programmable circuitry is to:

decide to decrease the overall streaming quality of the local network;

edit, after the decision, the first manifest file by applying a first of the one or more policies;

evaluate a status of the local network after editing the first manifest files;

decide, based on the status, to decrease the overall streaming quality of the local network further; and in response the decision to decrease the overall streaming quality further, edit a second manifest file by applying a second of the one or more policies.

11. The apparatus of claim 1, wherein:

the manifest file is a first manifest file; and the programmable circuitry is to:

edit the first manifest file by applying a first of the one or more policies;

determine whether a logical condition is true or false;

in response to a determination that the logical condition is true, edit a second manifest file by applying a second of the one or more policies; and in response to a determination that the logical condition is false, edit a third manifest file by applying a third of the one or more policies.

12. The apparatus of claim 11, wherein the programmable circuitry is to determine whether the logical condition is true or false based on one or more of: environment information, client information, streaming information, or timing information.

13. The apparatus of claim 1, wherein:

the request is formatted using HyperText Transfer Protocol (HTTP) Live Streaming (HLS); and the programmable circuitry is to provide the edited manifest file to the client device using HLS.

14. A non-transitory machine-readable storage medium comprising instructions to cause programmable circuitry to at least:

obtain a request for a manifest file from a client device within a local network, the local network including a plurality of client devices;

obtain an original version of a manifest file that supports Adaptive Bit Rate (ABR), the manifest file identifying at least one of (a) two or more audio resolutions or (b) two or more video resolutions;

organize the plurality of client devices into one or more groups based on one or more policies, wherein a group is associated with a streaming quality profile defining an assigned audio resolution and an assigned video resolution;

determine whether to increase, decrease, or maintain an overall streaming quality of media based on a collective assessment of streaming activity of the plurality of client devices within the local network;

select one of the audio resolutions and one of the video resolutions for the client device based on the determination and the group to which the client device belongs, the selected audio resolution and the selected video resolution to correspond to the streaming quality profile associated with the group;

remove ABR support by editing the manifest file to remove any audio resolution or video resolution not selected for the client device; and provide the edited manifest file to the client device.

15. The non-transitory machine-readable storage medium of claim 14, wherein:

the request is a second request;

the edited manifest file is a second edited manifest file;

the programmable circuitry is to:

obtain instructions that the group to which the client device belongs is a variable group such that a streaming quality of the client device can vary;

obtain a first request from the client device before the second request;

send a first edited manifest file to the client device in response to the first request; and in response to the second request, select at least one of a video resolution or audio resolution for the second edited manifest file that is different than the selections in the first edited manifest file, wherein the difference is based on the determination.

16. The non-transitory machine-readable storage medium of claim 14, wherein:

the request is a second request;

the edited manifest file is a second edited manifest file;

the programmable circuitry is to:

obtain instructions that a streaming quality of the group to which the client device belongs is a fixed group such that the streaming quality of the client device is fixed;

obtain a first request from the client device before the second request;

send a first edited manifest file to the client device in response to the first request; and send a second edited manifest file in response to the second request, wherein the selected video resolution and the selected audio resolution is the same in both the first edited manifest file and the second edited manifest file regardless of the determination.

17. The non-transitory machine-readable storage medium of claim 14, wherein the programmable circuitry is to make the determination based on one or more of:

a throughput of a connection between the programmable circuitry and one or more content providers;

a latency of the connection between the programmable circuitry and one or more content providers;

a total number of media streams being requested within the local network;

a total number of client devices in the local network;

a throughput of the local network; or buffering statuses of the plurality of client devices.

18. The non-transitory machine-readable storage medium of claim 14, wherein:

the request is a first request;

the edited manifest file is a first edited manifest file;

the client device is a first client device; and the programmable circuitry is to:

obtain a second request from a second client device in the local network, wherein the second client device belongs to a different group than the first client device; and provide a second edited manifest file to the second client device by applying the one or more policies, wherein the second edited manifest file also removes support for ABR but selects at least one of a different audio resolution or a different video resolution than the first edited manifest file.

19. A method comprising:

obtaining a request for a manifest file from a client device within a local network, the local network including a plurality of client devices;

obtaining an original version of a manifest file that supports Adaptive Bit Rate (ABR), the manifest file identifying at least one of (a) two or more audio resolutions or (b) two or more video resolutions;

organizing the plurality of client devices into one or more groups based on one or more policies, wherein a group is associated with a streaming quality profile defining an assigned audio resolution and an assigned video resolution;

determining whether to increase, decrease, or maintain an overall streaming quality of media based on a collective assessment of streaming activity of the plurality of client devices within the local network;

selecting one of the audio resolutions and one of the video resolutions for the client device based on the determination and the group to which the client device belongs, the selected audio resolution and the selected video resolution to correspond to the streaming quality profile associated with the group;

removing ABR support by editing the manifest file to remove any audio resolution or video resolution except those selected for the client device; and providing the edited manifest file to the client device.

20. The method of claim 19, wherein:

the request is a second request;

the edited manifest file is a second edited manifest file;

the method further includes:

obtaining instructions that the group to which the client device belongs is a variable group such that a streaming quality of the client device can vary;

obtaining a first request from the client device before the second request;

sending a first edited manifest file to the client device in response to the first request; and in response to the second request, selecting at least one of a video resolution or an audio resolution for the second edited manifest file that is different than the selections in the first edited manifest file, wherein the difference is based on the determination.

* * * * *